(12) United States Patent
Arakawa et al.

(10) Patent No.: US 7,594,086 B2
(45) Date of Patent: Sep. 22, 2009

(54) STORAGE SYSTEM FOR COPYING DATA AND STORING IN A PLURALITY OF STORAGE DEVICES

(75) Inventors: Hiroshi Arakawa, Sagamihara (JP); Kenta Ninose, Yokohama (JP); Akira Deguchi, Yokohama (JP); Hisao Homma, Odawara (JP); Katsuhiro Okumoto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 813 days.

(21) Appl. No.: 11/251,212

(22) Filed: Oct. 17, 2005

(65) Prior Publication Data

US 2007/0050573 A1    Mar. 1, 2007

(30) Foreign Application Priority Data

Sep. 1, 2005  (JP)  ............................... 2005-253352

(51) Int. Cl.
G06F 12/00 (2006.01)
G06F 13/00 (2006.01)
G06F 13/28 (2006.01)

(52) U.S. Cl. ..................... 711/161; 711/162; 711/203

(58) Field of Classification Search .................. 711/203
See application file for complete search history.

(56) References Cited

U.S. PATENT DOCUMENTS

| 5,742,792 | A * | 4/1998 | Yanai et al. ................. 711/162 |
| 7,330,948 | B2 * | 2/2008 | Deguchi et al. ............ 711/162 |
| 7,526,618 | B2 * | 4/2009 | Ozaki et al. ................. 711/154 |
| 2006/0047930 | A1 * | 3/2006 | Takahashi et al. .......... 711/162 |
| 2006/0069865 | A1 * | 3/2006 | Kawamura et al. ........ 711/114 |
| 2006/0212669 | A1 * | 9/2006 | Uchida et al. ............... 711/162 |
| 2006/0224845 | A1 * | 10/2006 | Hiraiwa et al. .............. 711/162 |
| 2006/0236047 | A1 * | 10/2006 | Shitomi ...................... 711/162 |
| 2006/0236048 | A1 * | 10/2006 | Deguchi et al. ............ 711/162 |
| 2006/0236049 | A1 * | 10/2006 | Iwamura .................... 711/162 |
| 2006/0259722 | A1 * | 11/2006 | Watanabe ................... 711/162 |
| 2008/0140966 | A1 * | 6/2008 | Deguchi et al. ............ 711/162 |

FOREIGN PATENT DOCUMENTS

| JP | 2000-242437 | 9/2000 |
| JP | 2004-5370 | 1/2004 |
| JP | 2005-078453 A | 3/2005 |

OTHER PUBLICATIONS

"Using Asynchronous Replication for Business Continuity between Two or More Sites" Dec. 2004. pp. 1-20.

* cited by examiner

Primary Examiner—Matt Kim
Assistant Examiner—Matthew R Chrzanowski
(74) Attorney, Agent, or Firm—Brundidge & Stanger, P.C.

(57) ABSTRACT

A storage system comprises a primary storage device having a primary storage area, a first secondary storage device having a first secondary storage area, and a second secondary storage device having a second secondary storage area. Responsive to host request from a host computer, the primary storage device writes requested host data to the primary storage area. Furthermore the primary storage device sends a first and second copy request to the first and second secondary storage devices, respectively, to store copy data in the first and second secondary storage areas, the first and second copy request containing the copy data which is a copy of the host data. Here the second secondary storage area is identified by a virtual identifier used to identify the second secondary storage area as the virtual storage area within the primary storage device.

22 Claims, 33 Drawing Sheets

| Copy source volume | | Copy destination volume | | Copy type | Pair status |
|---|---|---|---|---|---|
| Storage device identifier | Volume identifier | Storage device identifier | Volume identifier | | |
| P | VOL1 | L | VOL1 | Synchronous | Pair | ← CP1
| - | VOL1 | - | VOL3 | Asynchronous | Pair | ← CP2

| Internal volume identifier | External device identifier | External volume identifier |
|---|---|---|
| VOL3 | R | VOL1 |

Fig.24

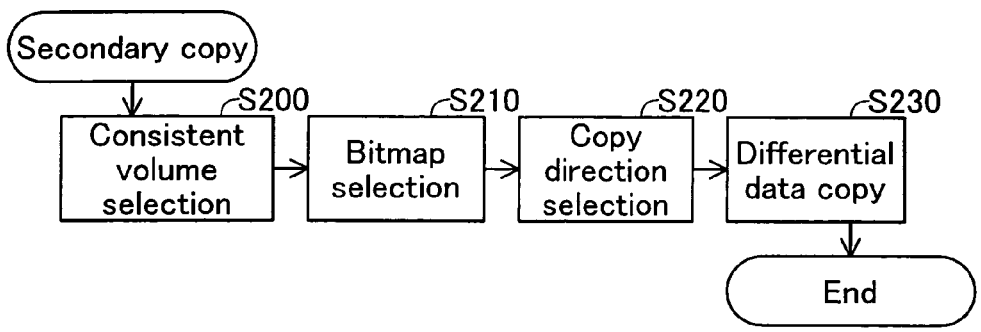

Fig.25(A)

| | Condition | Consistent volume |
|---|---|---|
| V1 | CP2 (VOL1-R) split | VOL1-R |
| V2 | CP2 (VOL1-R) not split and BCP (VOL1-R, VOL2-R) split | VOL2-R |

Fig.25(B)

| | Condition | | Differential bitmap | |
|---|---|---|---|---|
| B1 | C undetermined | BM of different generation from C determined | Of AB, BM with same generation as C | (1) |
| B2 | | BM of different generation from C undetermined | AB | (2) |
| B3 | C determined | BM of same generation as C determined | Of AB, BM newer than C and undetermined | (1) |

Fig.34

| | Condition | | | Differential bitmap |
|---|---|---|---|---|
| B1 | One of AB the same generation as C | C undetermined | BM of different generation from C determined | Of AB, BM of same generation as C (1) |
| B2 | | | BM of different generation from C undetermined | AB (2) |
| B3 | | C determined | BM of same generation as C determined | Of AB, BM newer than C and undetermined (1) |
| B4 | | | BM of same generation as C undetermined | Of AB, undetermined BM and C (2 or 3) |
| B5 | C generation number newer than either AB | | | C (1) |

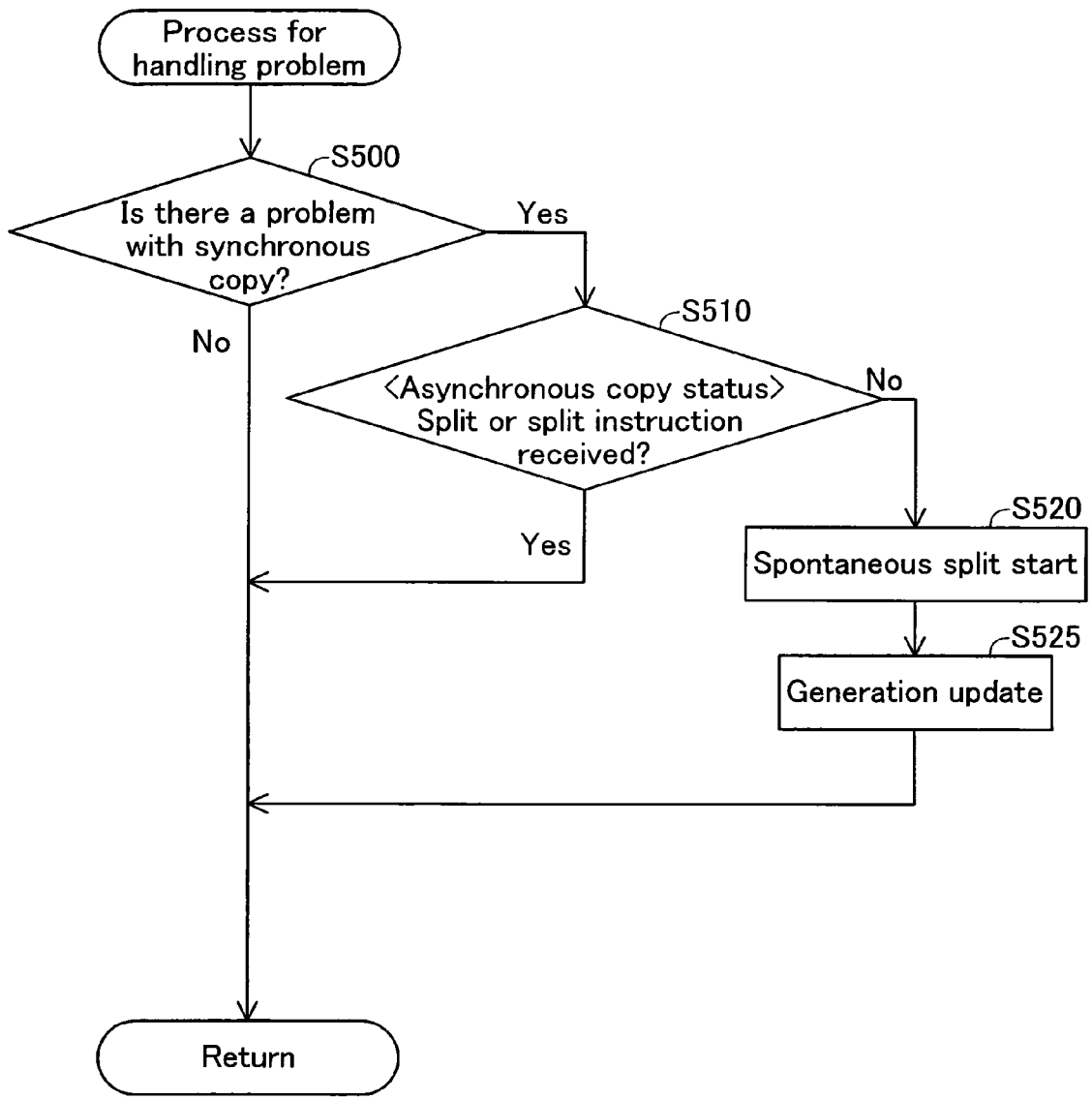

Fig.40(A)

| | Condition | | | Consistent volume |
|---|---|---|---|---|
| V11 | 280R<br>Determined | | | VOL1-R |
| V12 | 280R<br>Undetermined | and | BCP<br>(VOL1-R : VOL2-R)<br>split | VOL2-R |

Fig.40(B)

| | Condition | | Differential bitmap |
|---|---|---|---|
| B11 | 280R<br>Determined<br>Undetermined | Copy all | - |
| B12 | 280R<br>Determined | - | Of A and B,<br>BM that is<br>undetermined (1) |
| B13 | 280R<br>Undetermined | - | AB<br>(2) |

Comparative example

STORAGE SYSTEM FOR COPYING DATA AND STORING IN A PLURALITY OF STORAGE DEVICES

CROSS-REFERENCE TO RELATED APPLICATIONS

The present application claims the priority based on Japanese Patent Application No. 2005-253352 filed on Sep. 1, 2005, the disclosure of which is hereby incorporated herein by reference in its entirety.

BACKGROUND

1. Field of the Invention

The present invention relates to a storage system for copying data and storing in a plurality of storage devices.

2. Description of the Related Art

Remote copy technology is known for a data processing system comprising a storage system having a plurality of storage devices, and a host computer (See, for example, JP2005-78453A, JP2004-5370A, and JP2000-242437A). Remote copy is technology for copying data stored in a storage area included in one storage device to a storage area included in another storage device within the storage system. By using this remote copy technology, it is possible to continue work on the data processing system by using the data stored in the other storage device, even when a problem occurs with the one storage device.

Meanwhile, setting of the copy destination storage area is performed by specifying the storage device having the storage area and that storage area respectively. However, the settings in many cases require a great deal of effort by the user. Also, not enough study had been done for improving the convenience when using a plurality of storage devices for storing copy data.

SUMMARY

An object of the present invention is to provide technology capable of reducing the effort of users required for setting the copy destination storage area. Another object is to provide a technology capable of improving convenience when using a plurality of storage devices for storing copy data.

In an aspect of the present invention, there is provided a storage system for providing a host computer with a data storage area. The storage system comprises a primary storage device, a first secondary storage device, and a second secondary storage device. The primary storage device is connected to the host computer and has a primary storage area for the host computer. The first secondary storage device is connected to the primary storage device and has a first secondary storage area. The second secondary storage device is connected to the primary storage device and has a second secondary storage area. Furthermore, the primary storage device comprises a virtualization unit, a primary writing unit, and a copy control unit. The virtualization unit is configured to set a correlation between the second secondary storage area and a virtual identifier used to identify the second secondary storage area as a virtual storage area within the primary storage device. The primary writing unit is configured to execute a primary write process, the primary write process including a process of receiving from the host computer a host request which is a data write request of host data, and a process of writing the host data to the primary storage area. The copy control unit is configured to send a first and second copy request to the first and second secondary storage devices, respectively, to store copy data in the first and second secondary storage areas, the copy data being a copy of the host data, the first and second copy request containing the copy data. Furthermore, the copy control unit, regardless of whether or not receiving a completion notification of the second copy request from the second secondary storage device, sends a completion notification of the host request to the host computer responsive to receiving a completion notification of the first copy request from the first secondary storage device. The copy control unit identifies the second secondary storage area using the virtual identifier in the second copy request.

With this storage system, copy data is stored in the first secondary storage device, and the primary storage device sends to the host computer the completion notification of the host request responsive to receiving the first copy request completion notification from the first secondary storage device, so it is possible to increase the data redundancy. Also, copy data is stored in the second secondary storage device, and the primary storage device sends to the host computer the host request completion notification, regardless of whether or not the second copy request completion notification has been received from the second secondary storage device, so regardless of the distance from the primary storage device to the second secondary storage device, it is possible to suppress the excess lengthening of the response time for the host computer. Furthermore, the copy control unit identifies the second secondary storage area using the virtual identifier used to identify the second secondary storage area as the virtual storage area within the primary storage device. Therefore, once the virtual identifier is allocated to the second secondary storage area, by using the virtual identifier after that, it is possible to identify the second secondary storage area as the internal area. So it is possible to decrease the effort of the user required for setting the copy destination storage area.

The copy control unit comprises a copy instruction unit and an access control unit. The copy instruction unit is configured to create the first and second copy request, wherein the copy instruction unit creates the second copy request identifying the second secondary storage area using the virtual identifier. The access control unit is configured to send the first and second copy requests to the first and second secondary storage devices, respectively. Furthermore, the access control unit, by referencing the correlation set by the virtualization unit, replaces the virtual identifier within the second copy request with an actual identifier of the second secondary storage area, and sends the second copy request after the replacement to the second secondary storage device.

In this case, the first secondary storage device and the second secondary storage device may be connected to each other. Furthermore the primary storage device may comprise a generation setting unit, and a generation information sending unit. The generation setting unit is configured to allocate a generation to the host request and to update the generation according to specified conditions, the generation representing a time range in which the primary write process is executed. The generation information sending unit is configured to send first generation information to the first secondary storage device, the first generation information representing the generation of the host request that is a source of the first copy request Furthermore the first secondary storage device may comprise a first history creation unit and a secondary copy unit. The first history creation unit is configured to create first history information for each generation of host requests which are sources of the first copy requests by using the first generation information, the first history information representing a write history according to the first copy requests. The secondary copy unit is configured to execute a secondary copy process of copying data between a storage area within the first secondary storage device and a storage area within the second secondary storage device to match data stored in each storage area which is a subject of the copying. Then responsive to generation update by the generation setting unit, the copy control unit postpones sending of the second copy request corresponding to the host request belonging to a new generation, and sends to the second secondary storage device all the second copy requests corresponding to the host requests belonging to the old generation which is one generation previous to the new generation. Furthermore, the secondary copy unit has a first secondary copy mode. The first secondary copy mode includes: specifying a different part where data is different between the first secondary storage area and the second secondary storage area by using only the newest first history information representing the history of the new generation; and copying only differential data to match data respectively stored in the first secondary storage area and the second secondary storage area, the differential data being data of the different part.

With this constitution, in the first secondary copy mode, by copying only the differential data specified by using only the newest first history information, the data stored in the respective storage areas of the first secondary storage device and the second secondary storage device match. So it is possible to improve the convenience when using a plurality of storage devices for storing copy data.

This invention may be embodied in various ways, for example, a storage area providing method and storage area providing device, a storage system control method and storage system control device, a data processing system control method and data processing system control device, a computer program for realizing the functions of such a method or device, a storage medium having such a computer program stored thereon, a data signal embedded in a carrier wave containing such a computer program, or the like.

These and other objects, features, aspects, and advantages of the present invention will become more apparent from the following detailed description of the preferred embodiments with the accompanying drawings.

BRIEF DESCRIPTION OF THE DRAWINGS

FIG. 3 is an explanatory drawing showing an example of the pair information 248P;

FIG. 4 is an explanatory drawing showing an example of the volume information 246P;

FIG. 9 is a sequence drawing showing the procedure of the data writing process by the data processing system 10a;

FIG. 10 is a sequence drawing showing the procedure of the data writing process by the data processing system 10a;

FIG. 11 is a sequence drawing showing the procedure of the data writing process by the data processing system 10a;

FIG. 15 is an explanatory drawing showing the status 1 of the data processing system 10a;

FIG. 24 is a flow chart showing the procedure of the secondary copy process;

FIGS. 25(A) and 25(B) are explanatory drawings showing the conditions used for the secondary copy process;

FIG. 27 is a sequence drawing showing the procedure of the data write process by the data processing system 10a;

FIG. 28 is a sequence drawing showing the procedure of the data write process by the data processing system 10a;

FIG. 34 is an explanatory drawing showing the conditions for selecting the differential bitmap;

FIG. 35 is a flow chart showing the procedure of the process for handling a problem with the synchronous copy executed by the primary device 200P for the fourth embodiment;

FIGS. 40(A) and 40(B) are explanatory drawings showing the conditions for selecting the consistency volume and the conditions for selecting the differential bitmap;

DESCRIPTION OF THE PREFERRED EMBODIMENT

Next, the present invention is described based on embodiments in the following sequence.
A. First embodiment:
B. Second embodiment:
C. Third embodiment:
D. Fourth embodiment:
E. Fifth embodiment:
F. Sixth embodiment:
G. Seventh embodiment:
H. Eighth embodiment:
I. Variation examples:

A. First Embodiment

A1. Device Constitution

Figure 1:
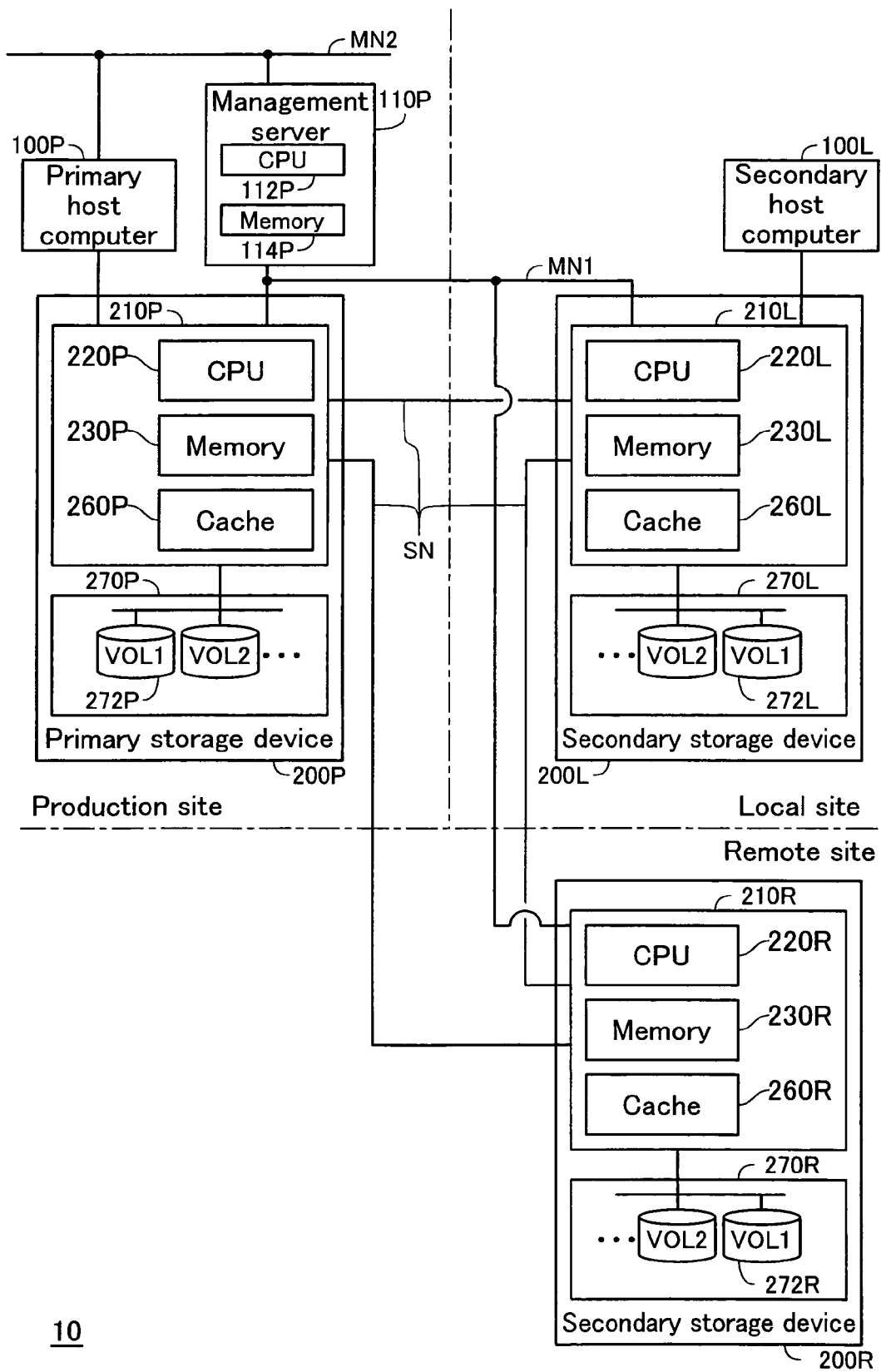
FIG. 1 is an explanatory drawing showing the hardware constitution of the data processing system as one embodiment of the present invention.

FIG. 1 is an explanatory drawing showing the hardware constitution of the data processing system as an embodiment of the present invention. This data processing system 10 comprises two host computers 100 (100P, 100L), three storage devices 200 (200P, 200L, and 200R), and a management server 110P. Note that the overall three storage devices 200 (200P, 200L, and 200R) and the management server 110P correspond to the "storage system."

The primary host computer 100P, the primary storage device 200P, and the management server 110P are installed at the production site for performing the data processing operation. The secondary host computer 100L and the secondary storage device 200L are installed at the local site near the production site. The secondary storage device 200R is installed at a remote site that is distant from the production site. Hereafter, the production site is also called the "primary site."

With this specification, a code identifying the site at which an item exists is added to the end of the code representing the host computer and storage device, each structural element, and each type of information and program. Specifically, at the end of the codes representing each of these, the code "P" is added to items existing at the production site, the code "L" is added to items at the local site, and the code "R" is added to items at the remote site. Also, with the description in this specification, when it is not necessary to distinguish the individual host computers, the individual storage devices, or the like, and the code for identifying sites is omitted.

The storage device 200 comprises the control device 210 and the disk array 270 connected to the control device 210. The control device 210 controls data transfer between the disk array 270 and other devices (for example, the host computer 100 and the other storage device 200). The control device 210 comprises the CPU 220, the memory 230, and the cache memory 260. The cache memory 260 is semiconductor memory for temporarily storing data transferred between the control device 210 and the disk array 270, and is separate from the CPU 220 exclusive cache memory (not illustrated).

The disk array 270 is a device using a plurality of disk devices, and comprises at least one volume 272. The volume 272 is a logical storage area for storing data used for data processing of the host computer 100 and the like. For example, one volume 272 is formed by logically dividing one logical storage area formed by a plurality of disk devices.

The primary host computer 100P of the primary site is connected to the primary storage device 200P (control device 210P) of the primary site. At normal times, this primary host computer 100P executes a specified data process while using storage areas provided by the primary storage device 200P. Data processes include, for example, a process as a file server for providing data files to the client device (not illustrated), or a process as a database server for managing various kinds of data.

The local site secondary host computer 100L is connected to the local site secondary storage device 200L (control device 210L). This secondary host computer 100L is able to execute specified data processes instead of the primary host computer 100P. For example, the secondary host computer 100L normally doesn't execute anything, but when a problem occurs with the primary host computer 100P, it executes specified data processes.

The storage devices 200 of each site (control device 210) are mutually connected via the storage network SN. Used as the storage network SN is a fiber channel or an IP network, for example. The data stored in the primary storage device 200P by the primary host computer 100P is copied into each secondary storage device 200L and 200R via this storage network SN. By using this kind of copying, it is possible for three geographically separated storage devices 200 to store the same data.

Also, the storage devices 200 of each site (control device 210) are connected to the management server 110P via the management network MN1. The management server 110P controls the operation of each storage device 200 via this management network MN1. Also, the management server 110P comprises the CPU 112P and the memory 114P. The user of the data processing system 10 can establish setting of the operation of each storage device 200 by operating this management server 110P.

The management server 110P and the primary host computer 100P are mutually connected via another management network MN2. The primary host computer 100P is able to fetch information relating to the storage area (an identifier for identifying the volume 272, for example) from the management server 110P. Note that as each of the management networks MN1 and MN2, an IP network or the like is used.

Figure 2:
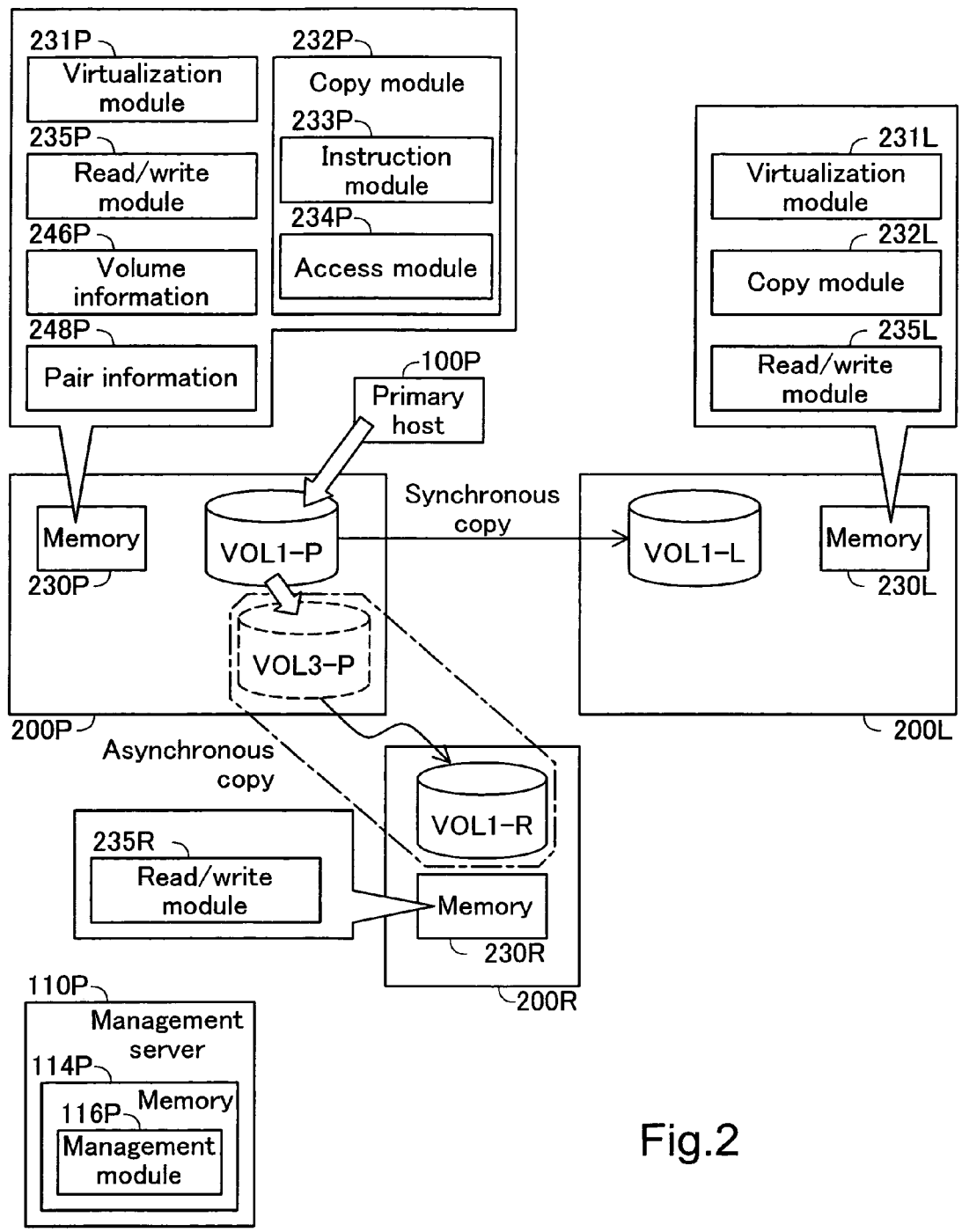
FIG. 2 is a schematic diagram showing the constitution of the data processing system 10.

FIG. 2 is a schematic drawing showing the constitution of the data processing system 10. The memory 230 of the storage device 200 of each site stores the read/write module 235. The read/write module 235 executes the write process and the read process for the volume (also called the "internal volume" hereafter) within its own storage device according to a request from outside. With the example in FIG. 2, the primary storage device 200P comprises an internal volume VOL1-P, the secondary storage device 200L comprises an internal volume VOL1-L, and the secondary storage device 200R comprises the internal volume VOL1-R. The volume VOL3-P of the primary storage device 200P is described later.

The memories 230P and 230L of the storage devices 200P and 200L of the primary site and the local site further store the virtualization module 231 and the copy module 232. The virtualization module 231 allocates to another storage device volume 272 (FIG. 1) a virtual identifier used for specifying as its own virtual internal volume. The copy module 232 executes data copy processing between the two volumes. Note that the copy module 232 comprises the instruction module 233 and the access module 234 (with the copy module 232L, the illustration is omitted). Furthermore, the memory 230P of the primary storage device 200P of the primary site stores the volume information 246P and the pair information 248P. The details of these are described later.

The memory 114P of the management server 110P stores the management module 116P. The management module 116P executes the process of controlling each storage device 200.

Note that the functions of each module are realized by the CPU 112 and 220 (FIG. 1) executing the programs (modules).

FIG. 3 is an explanatory drawing showing an example of the pair information 248P. The pair information 248P includes the information for defining a copy pair. A copy pair means a combination of two volumes on which data copying is performed. Data stored in one volume constituting the copy pair (called "the copy source volume" or simply the "source volume") is copied to the other volume (called the "copy destination volume" or simply the "destination volume").

As shown in FIG. 3, the source volume and the destination volume are specified by an identifier for identifying the storage device 200 (device identifier) and an identifier for identifying the volume (volume identifier). The device identifier is specific to each storage device 200 (more precisely, the interface (not illustrated) for connecting to the storage network SN). The volume identifier is an identifier that can be set independently for each storage device 200. Furthermore the volume identifier, within one storage device 200, is specific to each volume. With the storage network SN (FIG. 1), one volume is identified by this kind of combination of the device identifier and the volume identifier.

In FIG. 3, the storage device identifier "P" represents the primary storage device 200P, the storage device identifier "L" represents the secondary storage device 200L, and the storage device identifier "R" represents the secondary storage device 200R. Also, with the description below, for example, the volume for which the volume identifier is "VOL1" comprised by the primary storage device 200P for which the storage device identifier is "P" is called "volume VOL1-P." The same is also true for other volumes.

In FIG. 3, with the first copy pair CP1, the source volume is the volume VOL1-P of the primary storage device 200P (FIG. 2), and the destination volume is volume VOL1-L of the secondary storage device 200L. With the second copy pair CP2, the storage device identifier is omitted. This means that both volumes are internal volumes of the primary storage device 200P. Specifically, with the second copy pair CP2, the source volume is the volume VOL1-P, and the destination volume is the volume VOL3-P. Note that as described later, the volume VOL3-P is a virtual internal volume for which the actual entity is the volume VOL1-R of the secondary storage device 200R.

The pair information 248P (FIG. 3) includes the copy type and the pair status of each copy pair. The copy type is set as one of "synchronous" and "asynchronous." Details regarding synchronous copying and asynchronous copying are described later. The pair status indicates the status of the copy pair. The pair status is set to one of "pair," "split," or "resynchronize." "Pair" represents the status that the update to the source volume is also reflected in the destination volume. "Split" represents the status that the update to the source volume is not reflected in the destination volume. The split status is used in cases of backing up data of the destination volume to another volume, for example. "Resynchronize" represents the status of shifting from the split status to the pair status. With this resynchronize status, the update to the source volume performed during splitting is reflected in the destination volume. After this reflection is completed, the pair status becomes "pair."

The pair information 248P is set by the instruction module 233P. The instruction module 233P sets the pair information 248P according to the instructions from the management server 110P, for example. It is possible to have the instruction module 233P allow the user to determine each setting of the pair information 248P. For example, it is possible to have the user operate the management server 110P or the operating panel (not illustrated) of the primary storage device 200P, and for the instruction module 233P to receive the user instructions from the management server 110P or the operating panel (not illustrated). This is also the same for information used by other modules described later, and is the same for other embodiments described later.

FIG. 4 is an explanatory drawing showing an example of the volume information 246P. This volume information 246P stores the correlation of the internal volume identifier, the external device identifier, and the external volume identifier. The external device identifier and the external volume identifier are identifiers for specifying the volumes of another storage device 200 (also called an "external volume"). The internal volume identifier is a virtual identifier for specifying this external volume as a virtual internal volume. The external volume is handled as an internal volume specified by the internal volume identifier. With the example in FIG. 4, the volume VOL1-R of the secondary storage device 200R is handled as the virtual internal volume VOL3-P (details described later). This volume information 246P is set by the virtualization module 231P. The virtualization module 231P sets the volume information 246P according to instructions from the management server 110P, for example. It is also possible to have the virtualization module 231P allow the user to set each setting value of the volume information 246P.

A2. Data Write Process

Figure 5:
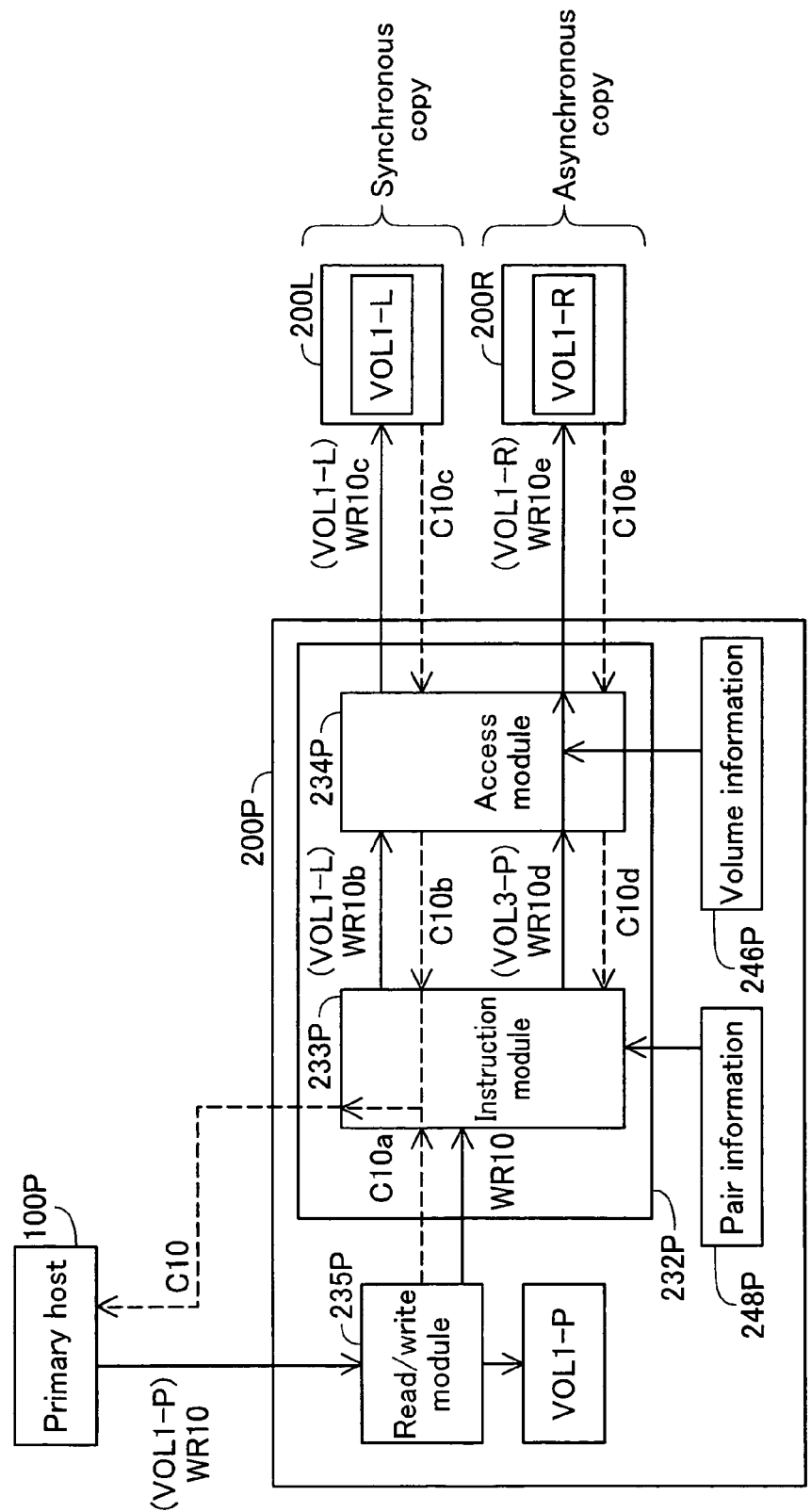
FIG. 5 is a block diagram showing the overview of the data writing process by the data processing system 10.

FIG. 5 is a block diagram showing the summary of the data write process by the data processing system 10. Note that with the description below, the primary host computer 100P is also called simply the "primary host 100P." The primary storage device 200P is also called simply the "primary device 200P." The secondary storage device 200L is called the "synchronous secondary storage device 200L" or simply the "synchronous secondary device 200L." The secondary storage device 200R is also called the "asynchronous secondary storage device 200R" or simply the "asynchronous secondary device 200R."

First, the primary host 100P sends to the primary device 200P the write request WR10 whose subject is the volume VOL1-P. The read/write module 235P that receives this request WR10 writes the request data to the volume VOL1-P and supplies a completion notification C10a to the instruction module 233P. Following, the write request from the primary host 100P is also called the "host request." The data for which write is requested by the host request is also called the "host data." Note that the instruction module 233P may also be activated during writing of data based on the request WR10 by the read-write module 235P. In this case, the read-write module notifies the instruction module 233P of the activation of the instruction module 233P instead of the completion notification C10a when the request WR10 is received. By doing this, in this case, execution of remote copying is performed in parallel with data storage by the primary storage device 200P.

The instruction module 233P references the host request WR10 received by the read-write module 235P, and detects the copy pair whose source volume is the same as the subject volume VOL1-P of this host request WR10 from the pair information 248P. With the example in FIG. 3, two copy pairs CP1 and CP2 are detected. For the purposes of the following description it is assumed that these pairs CP1 and CP2 are detected.

Next, the instruction module 233P creates a copy (write) request WR10b according to the detected synchronous copy pair CP1, and supplies the created request WR10b to the access module 234P. This request WR10b comprises the same host data as the host request WR10 and the identifier of the VOL1-L (identifier of the device and the volume) which is the destination volume of the synchronous copy pair CP1. The access module 234P sends a request WR10c including the same information as the request WR10b to the synchronous secondary device 200L identified by the device identifier "L" specified by the request WR10b. The read-write module 235L (FIG. 2) of the synchronous secondary device 200L sends the completion notification C10c of the request WR10c to the primary device 200P when the received host data is written to the specified volume VOL1-L. The access module 234P supplies the completion notification C10b of the request WR10b to the instruction module 233P responsive to receiving of the completion notification C10c.

Furthermore, the instruction module 233P creates the copy (write) request WR10d according to the detected asynchronous copy pair CP2, and supplies the created request WR10d to the access module 234P. This request WR10d comprises the same host data as the host request WR10 and the identifier of the VOL3-P (virtual internal volume identifier) which is the destination volume of the asynchronous copy pair CP2. By referencing the volume information 246P (FIG. 4), the access module 234P converts the virtual identifier of the volume VOL3-P within the request WR10d to the volume VOL1-R identifier (identifier of the device and volume). Then, the access module 234P sends the request WR10e after conversion to the asynchronous secondary device 200R identified by the device identifier "R" after conversion. The read-write module 235R (FIG. 2) of the asynchronous secondary device 200R sends the completion notification C10e of the request WR10e to the primary device 200P when the received host data is written to the specified volume VOL1-R. The access module 234P supplies the completion notification C10d of the request WR10d to the instruction module 233P responsive to receiving of the completion notification C10e.

Also, the instruction module 233P sends the completion notification C10 of the host request WR10 to the primary host 100P responsive to receiving of the completion notification C10a of writing to the source volume VOL1-P and receiving of the completion notification C10c (C10b) of the request WR10c of the synchronous copy pair CP1. Also, when sending this completion notification C10, there is no consideration of whether or not the instruction module 233P receives the completion notification C10e (C10d) of the request WR10e of the asynchronous copy pair CP2.

In this way, with the synchronous copying, at the point that the primary host 100P receives the completion notification C10, the host data is stored in both the primary device 200P (source volume VOL1-P) and the synchronous secondary device 200L (destination volume VOL1-L). Therefore, by using synchronous copying, it is possible to increase the redundancy of data. However, to prevent excessive lengthening of the response time for the primary host 100P, it is preferable to install the destination volume storage device 200L in an area close to the source volume storage device 200P (within an area of a distance of up to about 100 km, for example).

Meanwhile, with asynchronous copying, at the point that the primary host 100P receives the completion notification C10, there is no guarantee that the host data is stored in the asynchronous secondary device 200R (destination volume VOL3-P (VOL1-R)). However, the completion notification is sent to the primary host 100P without waiting for the copy request completion notification, so it is possible to shorten the response time for the primary host 100P. Therefore, it is possible to install the destination volume storage device 200R without restricting the distance from the source volume storage device 200P.

Note that the instruction module 233P is able to execute sending of the asynchronous copy request at any time. For example, the instruction module 233P is able to regularly send asynchronous copy requests. In this case, the instruction module 233P stores an update history (not illustrated) of the source volume VOL1-P in a memory (the memory 230P or the cache memory 260P, for example), and requests are supplied to the access module 234P according to this update history.

Figure 6:
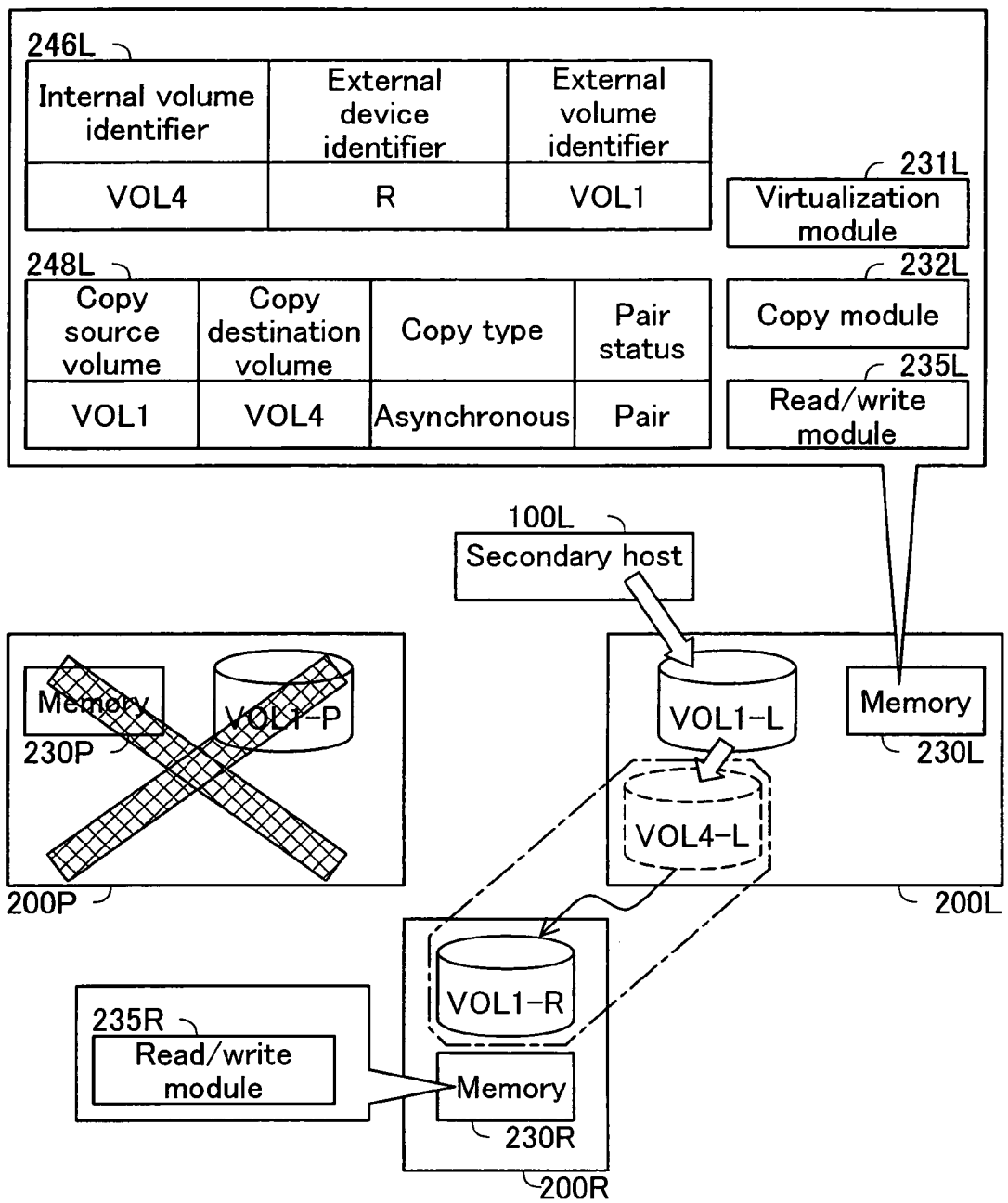
FIG. 6 is a schematic diagram showing the data processing system 10 when a problem occurs with the primary device 200P.

FIG. 6 is a schematic diagram showing the data processing system 10 when a problem occurs with the primary device 200P. In this case, a copy of the data stored in the volume VOL1-P is stored in the volume VOL1-L. The secondary host 100L can restart data processing quickly by using this volume VOL1-L.

Also, the synchronous secondary device 200L comprises the same virtualization module 231L and the same copy module 232L as the primary device 200. Therefore, the same as with the primary device 200P, the virtualization module 231L sets the volume information 246L for virtualizing the volume VOL1-R, and the copy module 232L can set the pair information 248L using this virtual internal volume (with the example in FIG. 6, the volume VOL4-L). As a result, the synchronous secondary device 200L, the same as with the primary device 200P, is able to store in the volume VOL1-R a copy of the data stored in the volume VOL1-L. However, it is also possible to omit these modules 231L and 232L.

Furthermore, when a problem occurs in the synchronous secondary device 200L as well, the host computer (not illustrated) can be connected to the asynchronous secondary device 200R. This host computer can restart the data process using the data stored in the volume VOL1-R.

As described above, with the data processing system 10 of the first embodiment, a copy of the data stored in the primary device 200P is also stored in the two secondary storage devices 200L and 200R, so it is possible to increase the redundancy of the data. Furthermore, the synchronous copying is executed to the synchronous secondary device 200L which is relatively close to the primary device 200P, and the asynchronous copying is executed to the asynchronous secondary device 200R which is relatively far from the primary device 200P. Therefore, it is possible to prevent excessive lengthening of the response time for the primary host 100P.

Furthermore, with the data processing system 10 of the first embodiment, the access module 234P (FIG. 2, FIG. 5) receives the copy request for the virtual internal volume (the request WR10d, for example), and can send the copy request (the request WR10e, for example) for the actual entity volume. Therefore, the instruction module 233P is able to determine the copy pair (FIG. 3) without specifying the asynchronous secondary device 200R. For example, once the volume information 246P is set, after that, even if the user does not know the identifier to identify the secondary storage device 200R, it is possible for the user to set the pair information 248P. Therefore, it is possible to decrease the effort by the user for constructing a storage system using the asynchronous secondary device 200R installed at a remote location. Furthermore, it is preferable that the instruction module 233P present to the user a list of usable internal volumes (including virtual internal volumes) via the operating panel (not illustrated) or the management server 110P. By doing this, it is possible for the user to easily determine the copy pair.

Note that among the storage devices 200 (read-write module 235), some devices issue the completion notification of copy (write) request when the write requested data is stored in the cache memory 260, and after that, write the data to the volume. When using this kind of storage device 200, it is possible to use this kind of completion notification as the completion notifications C10a, C10c, and C10e (FIG. 5). In this way, the completion notification of the copy request (write request) is not restricted to a notification that the actual writing is completed to the volume, but rather has a broad meaning including the notification that the writing is completed to temporarily used memory such as the cache memory 260.

Also, sending of the completion notification C10 to the primary host 100P is not limited to the instruction module 233P, but rather it is also possible for this to be executed by the access module 234P or by another module (not illustrated) that the copy module 232P has.

B. Second Embodiment

Figure 7:
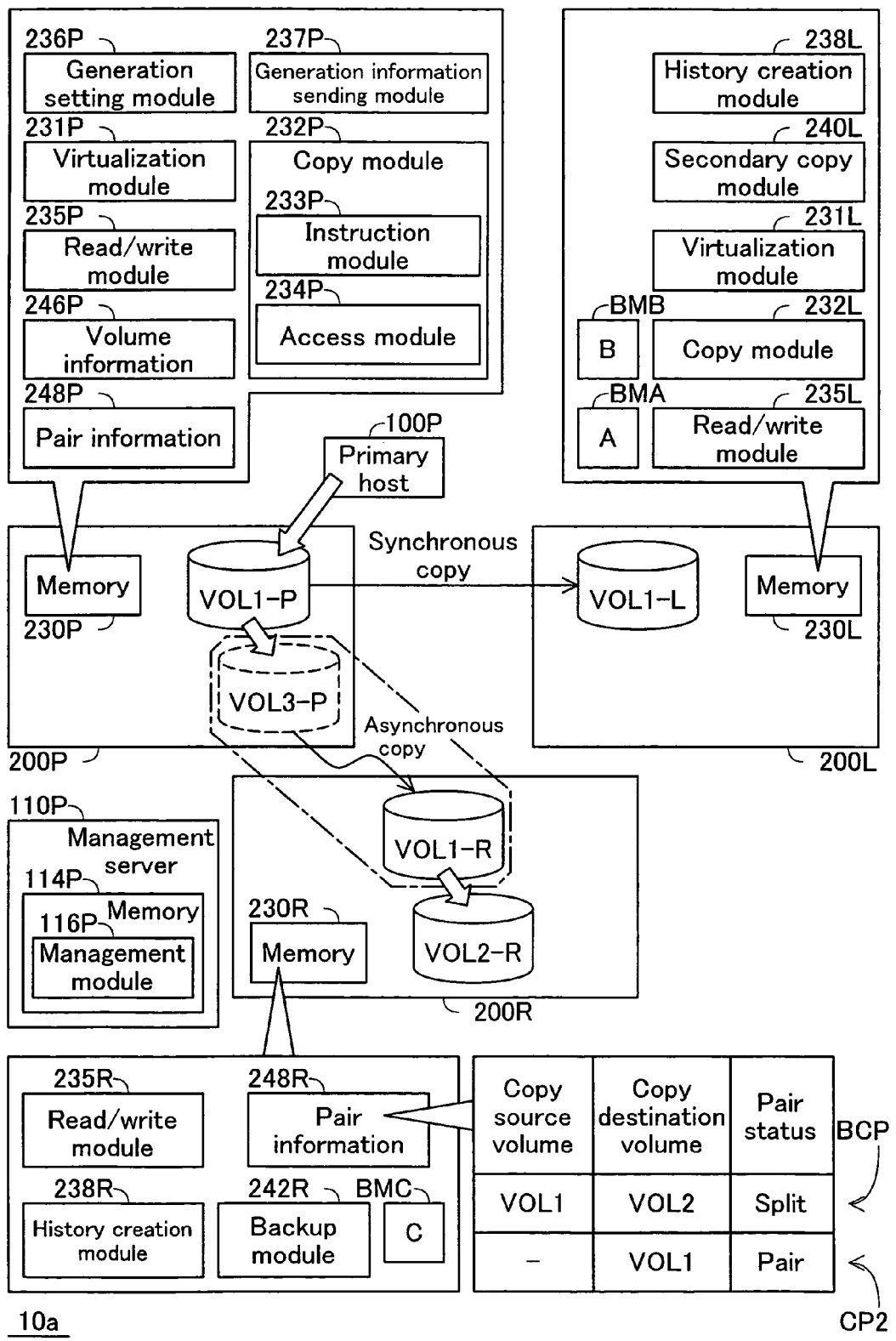
FIG. 7 is an explanatory drawing showing the constitution of the data processing system 10a for the second embodiment.

FIG. 7 is an explanatory drawing showing the constitution of the data processing system 10a of the second embodiment. The hardware constitution of the data processing system 10a is the same as that of the data processing system 10 shown in FIG. 1. However, the functional constitution of each storage device 200 is different from that of the data processing system 10 shown in FIG. 2. The difference for each storage device 200 is as follows.

(1) Difference for the Primary Storage Device 200P:

The memory 230P further stores the generation setting module 236P and the generation information sending module 237P.

(2) Difference for the Synchronous Storage Device 200L:

The memory 230L further stores the history creation module 238L, the secondary copy module 240L, the first bitmap BMA, and the second bitmap BMB.

(3) Difference for the Asynchronous Secondary Storage Device 200R:

The memory 230R further stores the history creation module 238R, the backup module 242R, the pair information 248R, and the third bitmap BMC. Also, the disk array 270R (FIG. 1) of the secondary storage device 200R comprises the volume VOL2-R in addition to the volume VOL1-R.

The history of updating for the volume VOL1-L is stored in the two bitmaps BMA and BMB of the synchronous secondary device 200L. Meanwhile, the history of updating for the volume VOL1-R is stored in the third bitmap BMC of the asynchronous secondary device 200R. These three bitmaps BMA to BMC are used when a problem occurs with the primary storage device 200P (details are described later).

FIG. 7 shows an example of the pair information 248R. The backup copy pair BCP is defined with this pair information 248R. With this backup copy pair BCP, the source volume is the VOL1-R and the destination volume is the VOL2-R (both volumes are internal volumes). The backup module 242R copies the data of the source volume VOL1-R to the destination volume VOL2-R according to this backup copy pair BCP. Following, the destination volume VOL2-R is also called the "backup volume VOL2-R." Also, the pair information 248R includes the asynchronous copy pair CP2 destination volume and the pair status (regarding the source volume is omitted). Note that the backup module 242R sets this pair information 248R the same as the instruction module 233P sets the pair information 248P. However, the information relating to the asynchronous copy pair CP2 is set according to the instructions of the copy module 232P.

B1. Host Consistency

Figure 8:
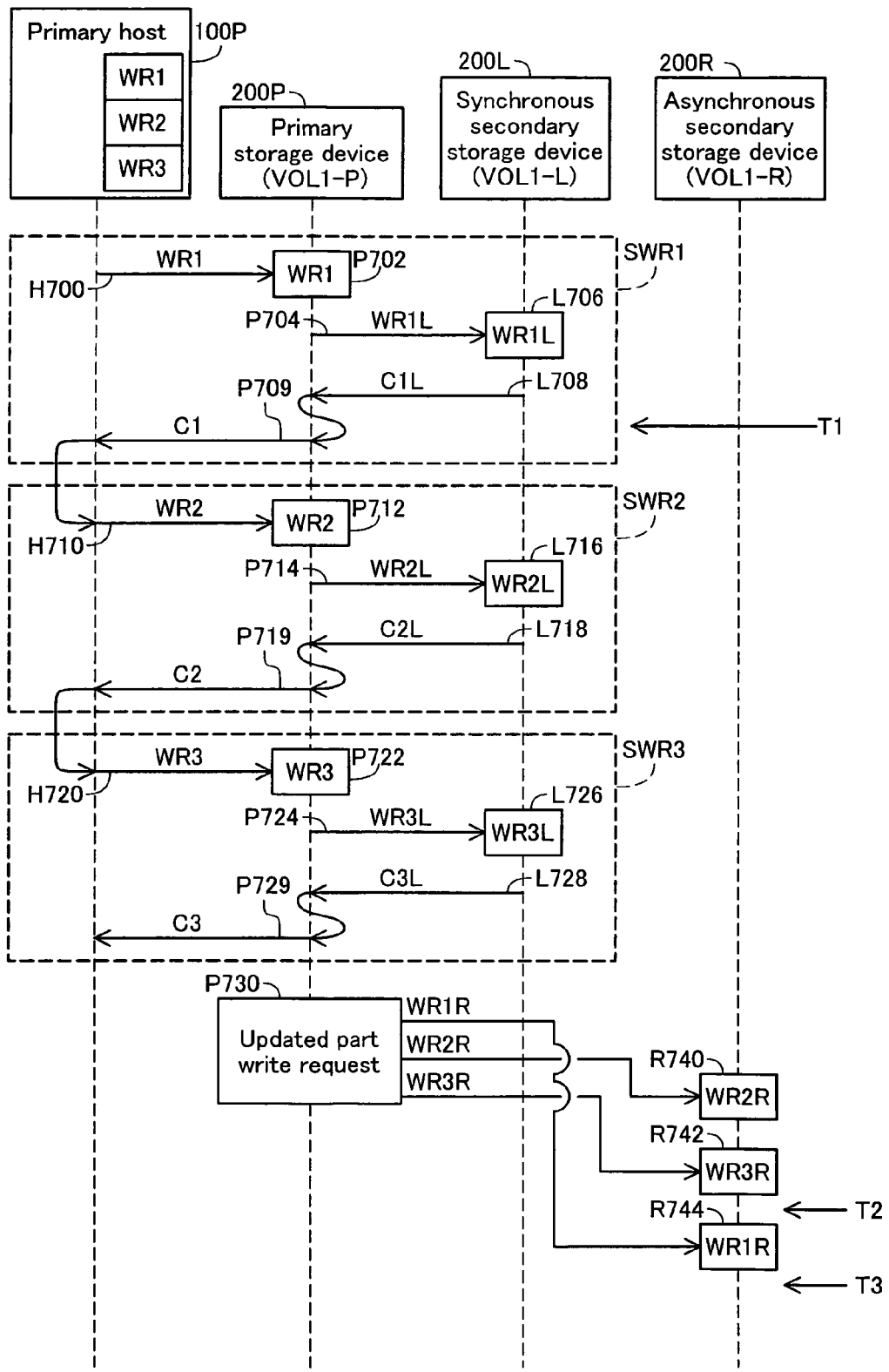
FIG. 8 shows the process flow when the primary host 100P sends the three host requests WR1, WR2, and WR3.
Figure 9:
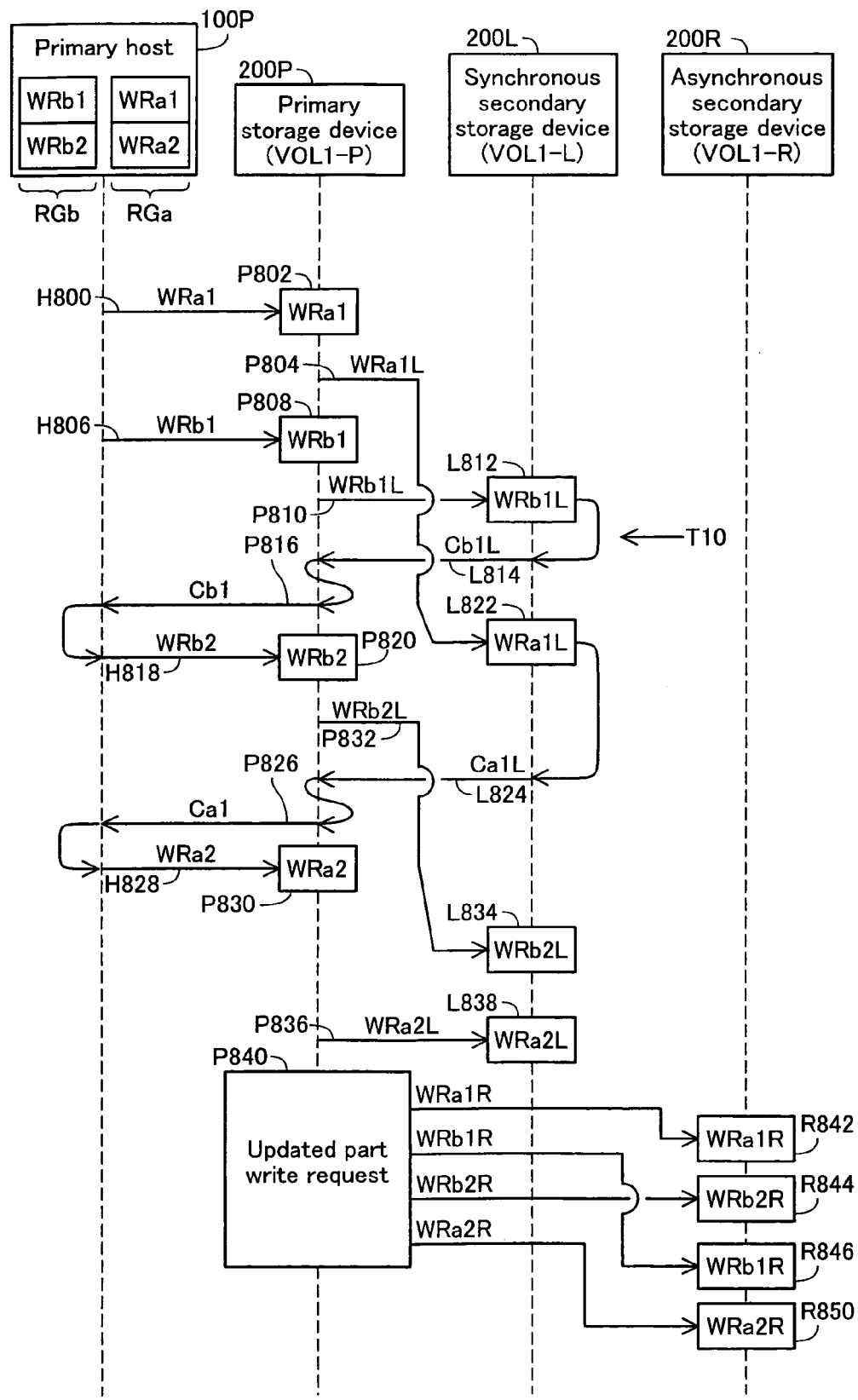

With the second embodiment, the process of asynchronous copying from the volume VOL1-P to the volume VOL3-P (VOL1-R) and the process of backup copying from the volume VOL1-R to the volume VOL2-R while the asynchronous copying is in a suspended state are alternately repeated. The reason that asynchronous secondary device 200R does a backup copy of data of the volume VOL1-R to the separate volume VOL2-R is to secure at least one volume having consistency with the host 100. FIG. 8 and FIG. 9 are sequence drawings showing the procedure of the data write process by the data processing system 10a. These sequence drawings are for describing the "consistency with the host 100," and the backup process is omitted.

FIG. 8 shows the flow of the process when the primary host 100 sends the three host requests WR1, WR2, and WR3. The three host requests WR1, WR2, and WR3 are sent in this sequence to the primary device 200P. With the example in FIG. 8, it is assumed that changing of the data write sequence of these three requests WR1, WR2, and WR3 is prohibited. The prohibition of the write sequence occurs, for example, when a plurality of host requests repeatedly update the same data file, or when a plurality of host requests include a host request for "income processing" for a financial database and a host request for "expense processing after that income processing".

With the description below, the simplified description "the storage device 200 executes processing," is used, but the process of writing data to volumes, the process of sending copy requests, the process of sending copy request completion notification, and the like, are executed by each module of the storage device 200, the same as the example shown in FIG. 5. Furthermore, with the description below, a code for identifying the site of the secondary storage device is added at the end of the code representing the copy request (write request) sent to each secondary storage device 200 by the primary device 200P according to the host request. For example, the request WR1L sent to the synchronous secondary device 200L by the primary device 200P is a copy request according to the host request WR1. Similarly, a code for identifying the site of the secondary storage device 200 is also added to the end of the code representing the completion notification sent to the primary device 200P by each secondary storage device 200. This is also the same for other embodiments described later.

With the example in FIG. 8, first, the primary host 100P sends the host request WR1 to the primary device 200P (step H700). When this is done, the same as with the example in FIG. 5, the primary device 200P and the synchronous secondary device 200L execute the processing based on synchronous copying. In specific terms, the primary device 200P executes write processing according to this request WR1 (P702), and sends the copy request WR1L to the synchronous secondary device 200L (P704). The synchronous secondary device 200L executes write processing according to this request WR1L (L706) and sends the completion notification C1L to the primary storage device 200P (L708). The primary storage device 200P that receives the completion notification C1L sends the completion notification C1 to the primary host 100P (P709).

The primary host 100P sends to the primary device 200P the next host request WR2 responsive to receiving the completion notification C1 of the request WR1 (step H710). The series of processes SWR2 (H710 to P719) according to this request WR2 is the same as the series of processes SWR1 (H700 to P709) according to the request WR1. Similarly, the primary host 100P sends the next host request WR3 to the primary device 200P responsive to receiving the completion notification C2 of the request WR2 (step H720). The series of processes SWR3 (H720 to P729) according to the request WR3 is also the same as the series of processes SWR1 and SWR2 according to each request WR1 and WR2.

As described above, the primary host 100P sends the next host request to the primary device 200P responsive to receiving the completion notification of the previous host request from the primary device 200P. As a result, for both the primary device 200P and the synchronous secondary device 200L, there is no changing of the sequence of writing the requests WR1, WR2, and WR3. As a result, even if there is a case when a problem occurs with the primary device 200P during processing according to these requests WR1, WR2, and WR3, the secondary host 100L (FIG. 1) is able to restart the data processing by using the synchronous secondary device 200L. For example, when a problem occurs at the timing T1 (FIG. 8) between the step L708 and the step P709, the secondary host 100L is able to restart the data processing from the status at the timing T1 by using the synchronous secondary device 200L (volume VOL1-L). Hereinafter, the fact that the volume is in the state in which the data processing can be started by the host 100 using that volume as is, is called "that volume has consistency with the host 100." Following, "consistency with the host" is also called "host consistency."

Meanwhile, the primary device 200P and the asynchronous secondary device 200R execute processing based on the asynchronous copy. The primary device 200P sends to the storage device 200R (step P730) the copy (write) request for the updated part according to the request from the primary host 100P among the data stored in the volume VOL1-P. As a result, the requests WR1R, WR2R, and WR3R are sent to the asynchronous secondary device 200R. Here, the sequence for receiving of the requests WR1R, WR2R, and WR3R by the asynchronous secondary device 200R may sometimes be different from the sequence in which the requests were sent by the primary device 200P. This is because there is a plurality of communication paths between the primary device 200P and the asynchronous secondary device 200R, and furthermore, because there are cases when the amount of communication delay is different for each communication path (this kind of data transfer using a plurality of paths is also called "multiplex transfer"). Also, with the second embodiment, the asynchronous secondary device 200R writes the data of each request to the volume VOL1-R in the sequence the requests are received. Therefore, before the asynchronous secondary device 200R issues completion notifications for all of these requests WR1R, WR2R, and WR3R, it is possible that the volume VOL1-R does not have host consistency.

For example, with the example in FIG. 8, the primary device 200P sends each request WR1R, WR2R, and WR3R in sequence, but the asynchronous secondary device 200R receives in the sequence WR2R, WR3R, and WR1R (steps R740, R742, and R744). Let us assume that at the timing T2 between the step R742 and the step R744, a problem occurs with the communication path between the primary device 200P and the asynchronous secondary device 200R. When this is the case, the volume VOL1-R is in the state of storing the data of the request WR2 and the request WR3 without storing the data of the request WR1. Here, the secondary host 100L cannot go back to the past and send the request WR1, so it is not possible to restart data processing by using the asynchronous secondary device 200R (volume VOL1-R) as is. Specifically, the volume VOL1-R does not have host consistency. Meanwhile, at the timing T3 after issuing of the completion notification of all the requests WR1, WR2, and WR3, the volume VOL1-R has host consistency.

Note that the copy module 232P (FIG. 7) performs update status management of the volume VOL1-P by dividing the volume VOL1-P into a plurality of blocks for asynchronous copying. The copy module 232P stores the information for identifying updated blocks in a memory (e.g. the memory 230P or the cache memory 260P). Then, the copy module 232P sends to the asynchronous secondary device 200R the write request whose subject is only the updated block data. When each of the requests WR1, WR2, and WR3 have the same blocks as subjects, only one write request using the newest data is sent for common blocks. Also, when a plurality of write requests with the same block as the subject are sent to the asynchronous secondary device 200R, the copy module 232P sends the later request after receiving the completion notification of the previous request. Therefore, even when the request arrival sequence is irregular at the asynchronous copy destination volume VOL1-R, overwriting of the relatively new update data by relatively old update data is prevented. Note that this kind of update status management is performed by the instruction module 233.

FIG. 9 is a sequence drawing showing another example of the data writing process. With the example in FIG. 9, the primary host 100P sends to the primary device 200P the four host requests WRa1, WRa2, WRb1, and WRb2. With the example in FIG. 9, it is assumed that changing of the write sequence of the two requests WRa1 and WRa2 of the first request group RGa is not allowed. Similarly, changing of the write sequence of the two requests WRb1 and WRb2 of the second request group RGb is not allowed. However, changing of the write sequence between the two groups RGa and RGb is allowed. As a case of allowing changing of the write sequence, for example, there is the case that the plurality of requests updates different data files respectively, or the case that the plurality of requests updates different databases respectively.

First, the primary host 100P sends the request WRa1 to the primary device 200P (step H800). The primary device 200P executes the write processing according to this request WRa1 (P802), and sends the request WRa1L to the synchronous secondary device 200L (P804). Here, when changing of the data write sequence is allowed, the primary host 100P sends the next host request before receiving the completion notification of the previous host request. In light of this, the primary host 100P sends the next request WRb1 to the primary device 200P without waiting to receive the completion notification of the previous request WRa1 (H806). The primary device 200P executes the write process according to this request WRb1 (P808), and sends the request WRb1L to the synchronous secondary device 200L (P810).

Here, the sequence in which the synchronous secondary device 200L receives these requests WRa1L and WRb1L may differ from the sequence in which the requests WRa1L and WRb1L are sent. This is because there are cases when the data transfer between the primary device 200P and the synchronous secondary device 200L is performed by multiplex transfer. With the example in FIG. 9, the synchronous secondary device 200L receives the request WRb1L sent later before receiving the request WRa1L sent earlier. Also, with the second embodiment, the synchronous secondary device 200L writes the requested data to the volume VOL1-L in the sequence in which the requests are received. In light of this, the synchronous secondary device 200L executes the write process according to the request WRb1L (L812), and sends the completion notification Cb1L of the request WRb1L to the primary device 200P (L814). The primary device 200P which has received the completion notification Cb1L sends the completion notification Cb1 of the request WRb1 to the primary host 100P (P816). The primary host 100P sends the next request WRb2 to the primary device 200P responsive to receiving this completion notification Cb1 (H818). This request WRb2 is sent without waiting for the completion notification Ca1 of the request WRa1. The primary device 200P executes write processing according to this request WRb2 (P820) and sends the copy request WRb2L to the synchronous secondary device 200L (P832). The synchronous secondary device 200L executes the write processing according to the received request WRb2L (L834).

Also, the synchronous secondary device 200L executes write processing according to the request WRa1L (L822), and sends the completion notification Ca1L of the request WRa1L to the primary device 200P (L824). The primary device 200P that receives the completion notification Ca1L sends the completion notification Ca1 of the request WRa1 to the primary host 100P (P826). The primary host 100P sends the next request WRa2 to the primary device 200P after receiving this completion notification Ca1 (H828). The primary device 200P executes write processing according to this request WRa2 (P830), and sends the copy request WRa2L to the synchronous secondary device 200L (P836). The synchronous secondary device 200L executes the write processing according to the received request WRa2L (L838).

As described above, the primary host 100P sends the next host request before receiving the completion notification of the previous host request for a plurality of host requests for which changing of the data write sequence is allowed. As a result, with the synchronous secondary device 200L, there are cases when the write sequence of the requests is changed. However, the primary host 100P sends the next host request after receiving the completion notification of the previous host request for a plurality of host requests for which changing of the data write sequence is not allowed (for example, a combination of the requests WRa1 and WRa2 or a combination of the requests WRb1 and WRb2). Therefore, the volume VOL1-L of the storage device 200L always has host consistency. For example, let us assume that a problem occurred at the communication path between the primary device 200P and the synchronous secondary device 200L at the timing T10 between the step L812 and the step L822 of FIG. 9. In this case, the volume VOL1-L is in the state of storing the later request WRb1 data without storing the previous request WRa1 data. However, the changing of the write sequence of these requests WRa1 and WRb1 is allowed. Therefore, the secondary host 100L (FIG. 1) is able to restart data processing by using the synchronous secondary device 200L (volume VOL1-L) as is.

Note that the primary device 200P and the asynchronous secondary device 200R execute processing based on asynchronous copying (steps P840, R842 to R850). These processes are performed in the same way as the processes described with FIG. 8 (P730, R740 to R744).

As described using FIG. 8 and FIG. 9 above, the synchronous copy destination volume VOL1-L always has host consistency. Meanwhile, the asynchronous copy destination volume VOL1-R has host consistency at the point that the asynchronous copying is completed, but it is possible not to have host consistency during asynchronous copying. In light of this, with the second embodiment, backup of the volume VOL1-R is performed using the volume VOL2-R for the asynchronous secondary device 200R to secure at least one volume having host consistency.

B2. Data Write Processing

Figure 10:
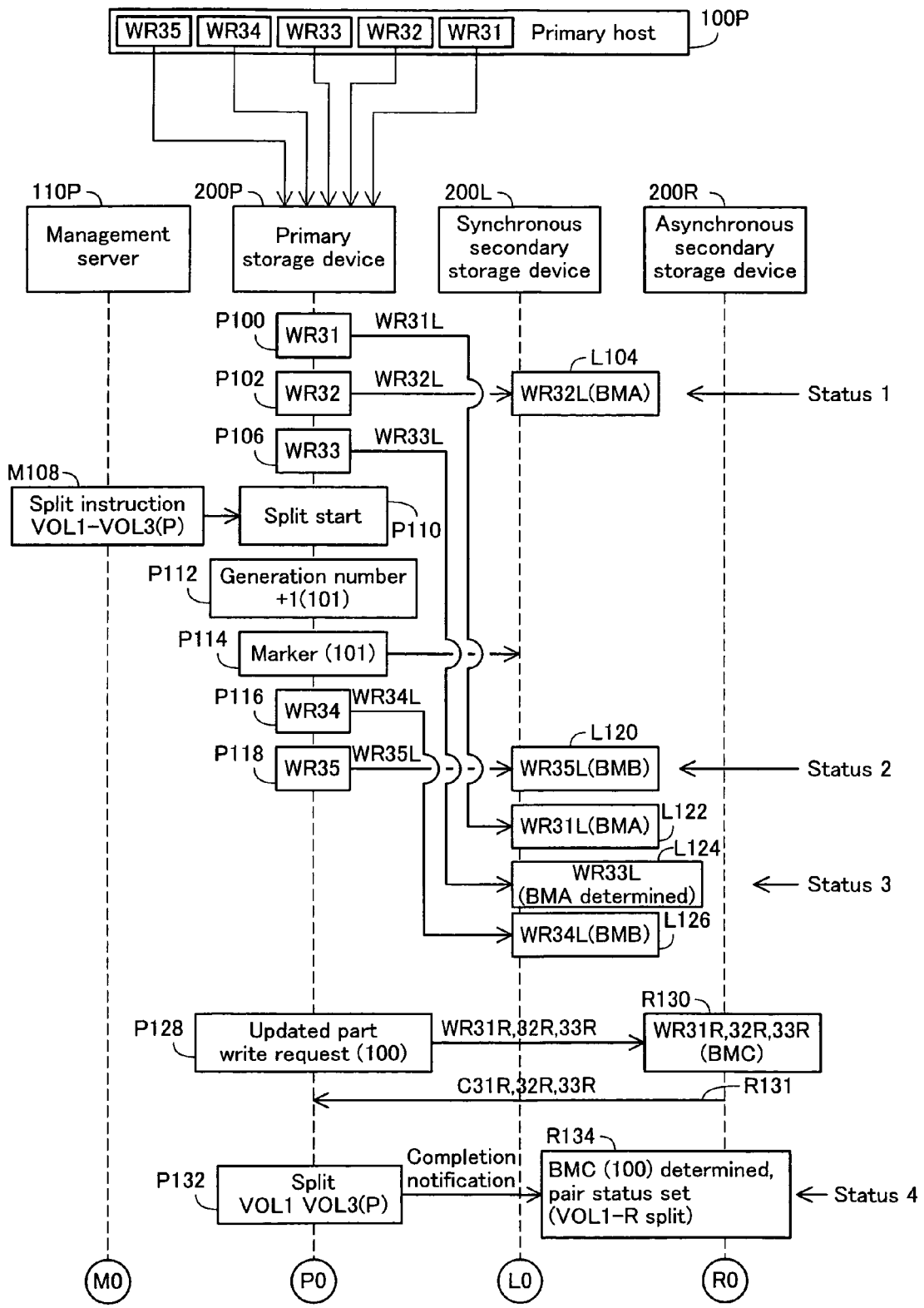
Figure 11:
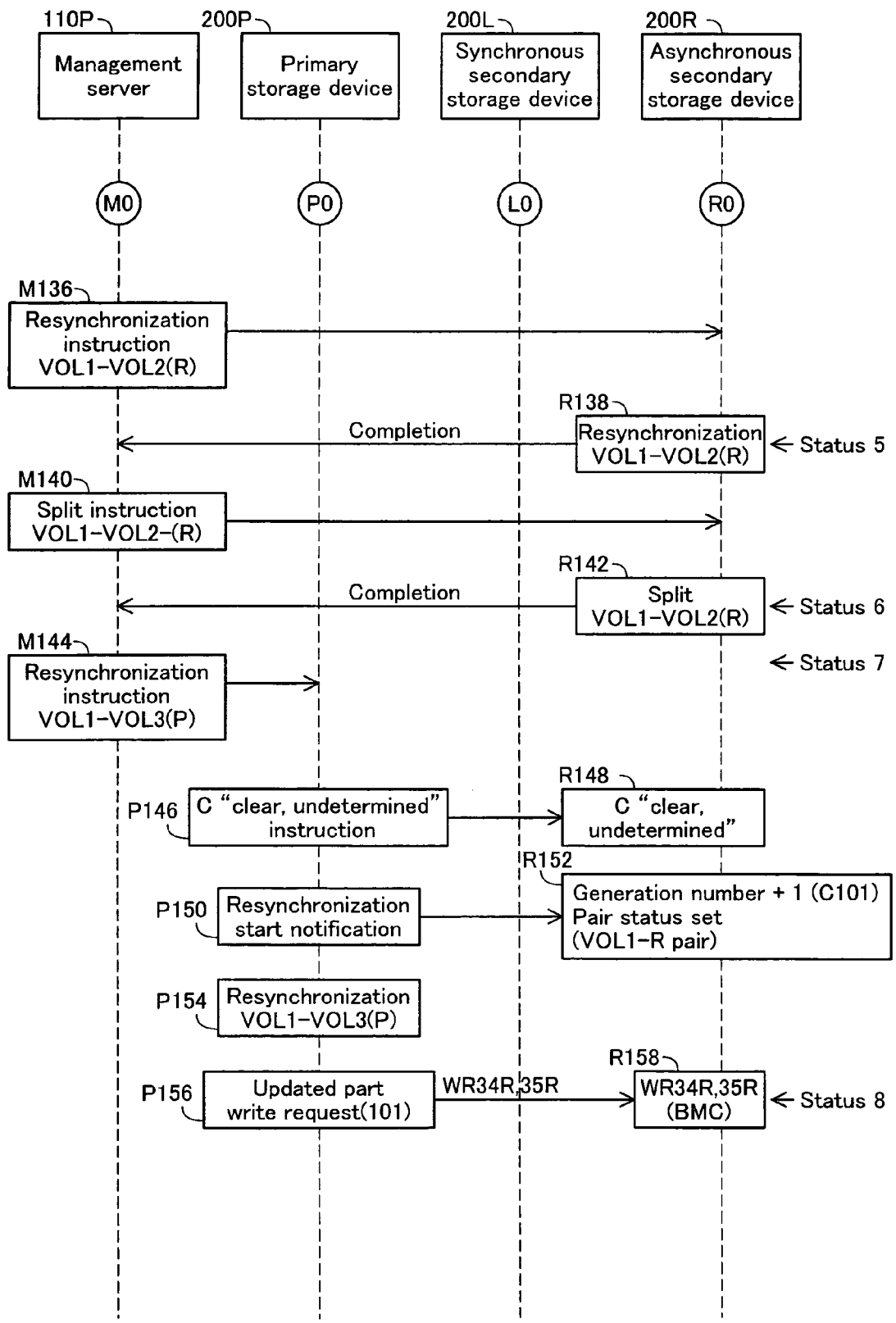

FIG. 10 and FIG. 11 are sequence drawings showing the procedure of the data write process by the data processing system 10a. FIG. 11 shows the latter half after the procedure of FIG. 10. These sequence drawings include the volume VOL1-R backup process. Furthermore, with this example, the primary host 100P sends the five host requests WR31 to WR35 to the primary device 200P. Here, changing of the write sequence of these requests WR31 to WR35 is allowed. Also, the same as with the example in FIG. 5, each storage device 200 sends the copy (write) request completion notification, but with the description below, the figure and description of this is omitted.

The primary host 100P sends the requests WR31 to WR35 in this sequence to the primary device 200P. The primary device 200P executes the write processing and the process of sending copy requests to the synchronous secondary device 200L according to the requests in the sequence in which the requests were received (the same as the sent sequence) (steps P100 to P106, P116, P118).

Figure 12:
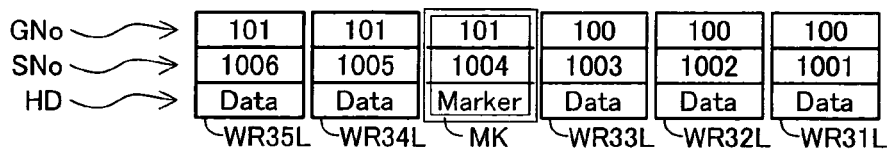
FIG. 12 is an explanatory drawing showing the copy requests sent to the synchronous secondary device 200L by the primary device 200P.

FIG. 12 is an explanatory drawing showing the copy requests sent to the synchronous secondary device 200L by the primary device 200P. Each of the copy requests WR31L to WR35L includes a generation number GNo, a sequence number SNo, and a host data HD. The sequence number SNo is a number indicating the sequence in which the source host request is received by the read/write module 235P (FIG. 7), and are allocated to the requests WR31L to WR35L by the instruction module 233P. Note that a marker MK is sent between the two requests WR33L and WR34L (FIG. 10: step P114). This marker MK is described later.

The generation number GNo is a number representing a time range in which the read/write module 235P (FIG. 5, FIG. 7) receives the source host request and executes the host data write processing. The generation setting module 236P allocates the generation number GNo to the host request by using the receiving time as the reference for each receiving of a host request by the read/write module 235P. Also, the generation setting module 236P switches this generation number to a new number responsive to each receiving of the split instruction (details described later) from the management server 110P. The generation information sending module 237P adds this generation number GNo to each of the requests WR31L to WR35L prepared by the access module 234P to send the generation number GNo to the synchronous secondary device 200L. With the example in FIG. 12, the generation number of the first three requests WR31L to WR33L is set to 100. The generation number of the next two requests WR34L and WR35L is set to one newer 101. This is because the primary device 200P received a split instruction between the two requests WR33 and WR34 (FIG. 10, step P110, details described later). Note that the read/write module 235P executes the host data write process in the sequence in which the host requests were received. Therefore, the generation setting module 236P can use the time of the start of the write process or the time that the write process completion notification is issued as a reference time for allocating generation numbers.

Figure 13:
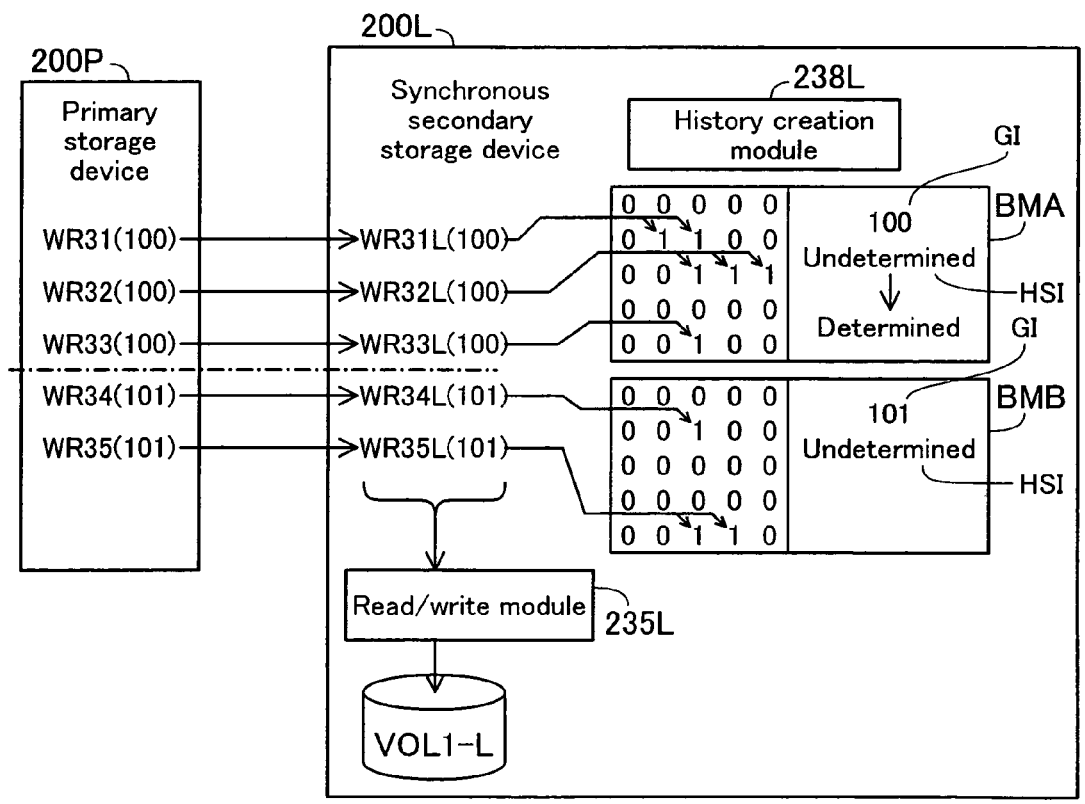
FIG. 13 is an explanatory drawing showing the bitmaps BMA and BMB.
Figure 14A:
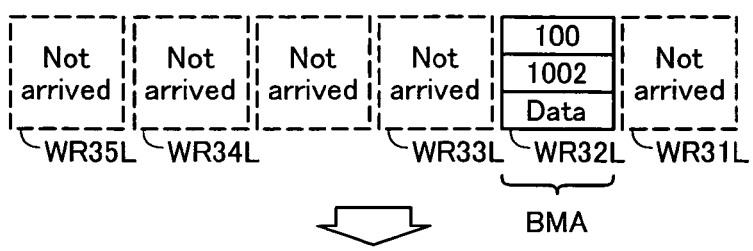
FIGS. 14(A)-14(F) are explanatory drawings showing the sequence in which the synchronous secondary device 200L receives the requests WR31L to WR35L and the marker MK.
Figure 14B:
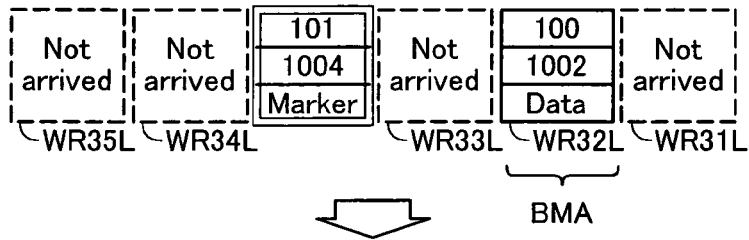
Figure 14C:
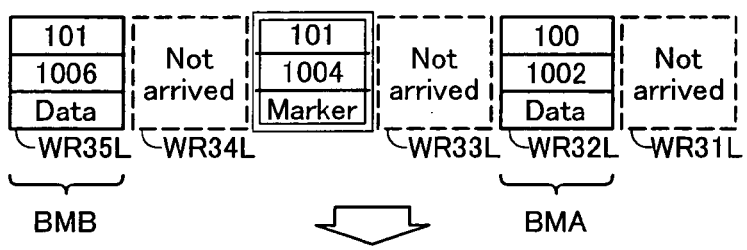
Figure 14D:
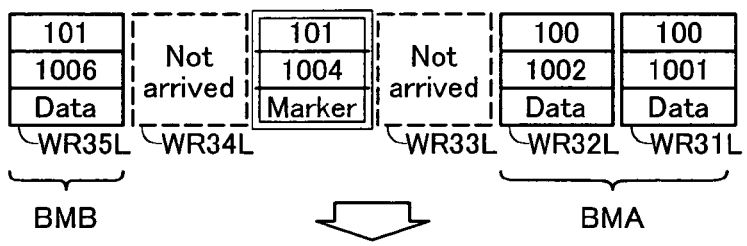
Figure 14E:
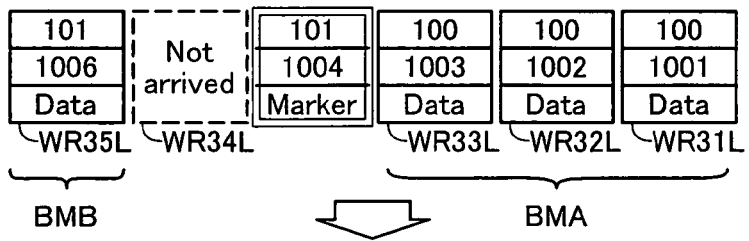
Figure 14F:
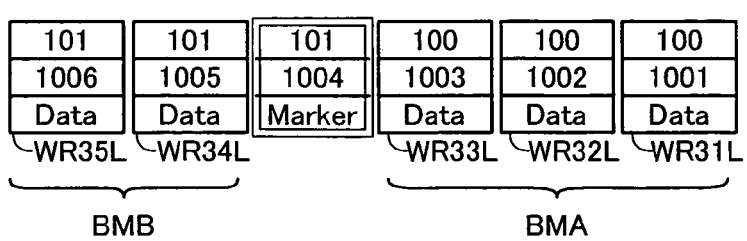

FIG. 13 is an explanatory drawing showing the bitmaps BMA and BMB. The history creation module 238L (FIG. 7) of the synchronous secondary device 200L manages update history by dividing the volume VOL1-L into a plurality of blocks. Each bitmap BMA and BMB contains bits representing the presence or absence of updates for each block. With the example in FIG. 13, the history creation module 238L first sets all the bits to 0, and after that, sets the bits of the updated blocks to 1. Bit setting of the updated blocks is performed with each execution of the synchronous copy write processing by the read/write module 235L. Note that the number of blocks updated by one request is value that varies according to the host data.

Furthermore, each bitmap BMA and BMB contains generation information GI and history status information HSI. The generation information GI indicates the bitmap generation number GNo (FIG. 12). The history creation module 238L creates a bitmap for each generation number GNo. Furthermore, the history creation module 238L secures only the newest two generation bitmaps for the bitmaps BMA and BMB. With the example in FIG. 13, the generation number of the first bitmap BMA is 100, and the generation number of the second bitmap BMB is 101. Note that before the synchronous secondary device 200L receives the request of the generation number 101, the update history of the generation number 99 is stored in the second bitmap BMB (details described later).

The history status information HSI is information indicating the presence or absence of the possibility of future updates. The history creation module 238L switches the history status information HSI from "undetermined" to "determined" responsive to issuing of the completion notification for all the copy requests of the corresponding generation number GNo (details described later).

Above, the bitmaps BMA and BMB of the synchronous secondary device 200L are described, the constitution of the third bitmap BMC (FIG. 7) of the asynchronous secondary device 200R also is the same as that of these bitmaps BMA and BMB. The history creation module 238R updates the third bitmap BMC with each execution of the asynchronous copy write processing by the read/write module 235R.

Note that as will be described later, for the generation information of the third bitmap BMC, an update is done one at a time according to the instructions of the primary device 200P copy module 232P. The initial value of the third bitmap BMC generation may be set in advance by various methods. For example, it is possible to have the generation information sending module 237P send the initial value of the generation to the asynchronous secondary device 200R (history creation module 238R) in advance. It is also possible to have the initial value set according to management server 110P instructions or user instructions.

Next, using the examples in FIG. 10 and FIG. 11, the changing of the status of the data processing system 10a (FIG. 7) is described. When the management server 110P (management module 116P) sends the split instruction to the primary device 200P (step M108), the primary device 200P starts the split processing according to the instruction (P110). The generation number is switched to just one newer number responsive to this split instruction. Furthermore, data copying according to the new generation host request is postponed for the asynchronous copy pair (VOL1-P, VOL3-P). With the example in FIG. 10, this split instruction is received at the primary device 200P between the two requests WR33 and WR34. The copy module 232P holds the new generation host requests (WR34, 35) received after this split instruction in the cache memory 260P to send these requests later to the asynchronous secondary device 200R.

The split instruction is sent to back up the asynchronous copy destination volume VOL3-P (VOL1-R). The management server 110P is able to send this instruction at any time. For example, the split instruction can be sent periodically. It is also possible to have the split instruction sent at a timing according to user instructions.

The generation setting module 236P (FIG. 7) switches (step P112) the generation number (100) to one newer number (101) responsive to receiving the split instruction. Next, the generation information sending module 237P sends the marker MK representing the generation switching to the synchronous secondary device 200L (P114).

FIG. 12 shows an example of the marker MK. The marker MK has the same constitution as the other requests WR31L to WR35L. The generation number GNo is set to a new generation number (101). The part correlating to the host data HD is set to a specified value indicating that this is a marker. The sequence number SNo is set to a number indicating the receiving sequence of the split instructions by the primary device 200P the same as with the write requests WR31L to WR35L. The marker MK sequence number SNo is set to one newer number (1004) than the final request (WR33L) before receiving of the split instruction. Also, the first request (WR34L) sequence number SNo after receiving of the split instruction is set to one newer number (1005) than the marker MK. Setting of the sequence number SNo is performed by the instruction module 233P.

The sequence number SNo given to the marker MK is used for judging whether or not the completion notification has been issued for all the requests of one generation previous to the generation of the marker MK. For example, with the example in FIG. 12, the sequence number SNo of the marker MK is 1004. Therefore, if the completion notification is issued for all the request up to the one prior 1003 by the synchronous secondary device 200L, it is possible to judge that the completion notification has been issued for all the requests of the generation one prior. This judgment is performed by the history creation module 238L (FIG. 7) (described later).

FIG. 14 is an explanatory drawing showing the sequence of receiving each request WR31L to WR35L and the marker MK by the synchronous secondary device 200L. With the example in FIG. 10, the synchronous secondary device 200L receives the data in the sequence of WR32L, marker MK, WR35L, WR31L, WR33L, and WR34L (L104 to L126). FIG. 14(A) to FIG. 14(F) indicate the data receiving situation in that sequence. This receiving sequence is different from the sending sequence because data transfer is performed by multiplex transfer. The synchronous secondary device 200L (FIG. 7, read/write module 235L) writes each request host data to the volume VOL1-L in the sequence in which each request was received (steps L104 to L126). The history creation module 238L also updates the bitmaps BMA and BMB in the same sequence.

Figure 15:
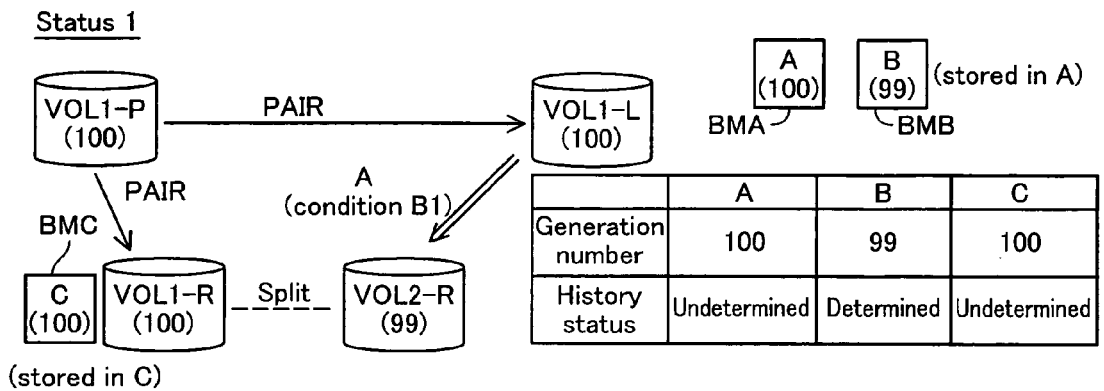

FIG. 15 is an explanatory drawing showing the status of the data processing system 10a at the stage at which the request WR32 write process (L104) is executed by the synchronous secondary device 200L. Shown in FIG. 15 are the four volumes VOL1-P, VOL1-L, VOL1-R, and VOL2-R, and the three bitmaps BMA, BMB, and BMC. The numbers in parentheses attached to each volume indicate the generation number GNo of the request reflected in that volume. For example, the generation number 99 request is reflected in the backup volume VOL2-R, but the generation number 100 request is not reflected.

Also, the numbers in parentheses added to each bitmap indicate the generation number of that bitmap. Also, in the drawing, a table is shown indicating the generation number and history status of each bitmap. Note that in the drawing, each of the bitmaps BMA, BMB, and BMC is indicated using a code with the code "BM" omitted. For example, the code "A" indicates the first bitmap BMA. The same is also true for the other drawings described later.

Note that the double line arrow in the figure indicates the secondary copy process executed when a problem occurs with the primary device 200P (details described later).

With this status 1, the pair status of the synchronous copy pair CP1 "VOL1-P, VOL1-L" is "pair." The pair status of the asynchronous copy pair CP2 "VOL1-P, VOL1-R" is also "pair." The pair status of the backup copy pair BCP "VOL1-R, VOL2-R" is "split." For the second bitmap BMB, the generation number is "99," and the history status is "determined." Meanwhile, for the first bitmap BMA and the third bitmap BMC, the generation number is "100," and the history status is "undetermined."

Figure 16:
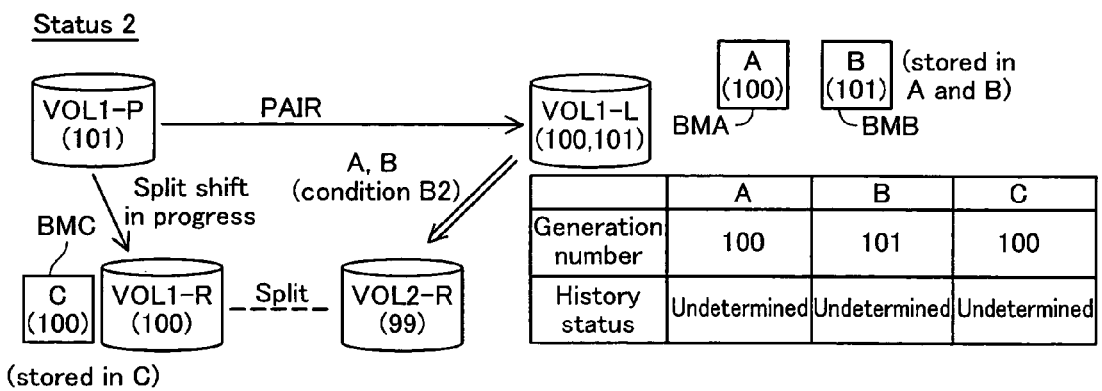
FIG. 16 is an explanatory drawing showing the status 2.

FIG. 16 is an explanatory drawing showing the status 2. When the primary device 200P receives the split instruction (FIG. 10, P110), and the synchronous secondary device 200L executes the write process of the request WR35L of the new generation 101 (FIG. 10, L120), the system 10a status changes to status 2. The history creation module 238L references the generation number of the copy request received by the read/write module 235L. When the referenced generation number is newer than the generation number of both the two bitmaps BMA and BMB, the history creation module 238L clears the older bitmap, and stores this new generation history in the cleared bitmap. Also, the history status of the cleared bitmap is set to "undetermined." With the example in FIG. 16, the update of the new generation number 101 is stored in the second bitmap BMB.

Figure 17:
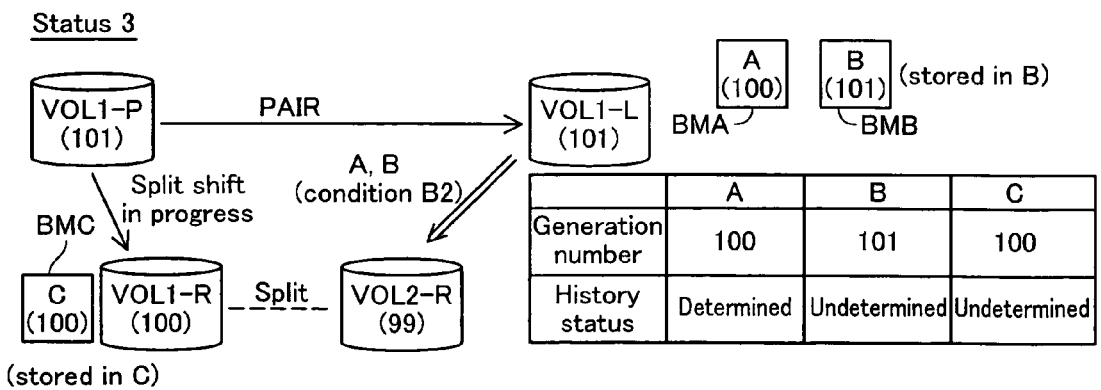
FIG. 17 is an explanatory drawing showing the status 3.

FIG. 17 is an explanatory drawing showing the status 3. When the synchronous secondary device 200L executes the write process of the requests WR31L and WR33L (FIG. 10, L122, L124), the system 10a status changes to status 3. The history creation module 238L finds out that the sequence number SNo of the copy request of the generation number 100 is up to 1003 by referencing the marker MK received by the synchronous secondary device 200L. Also, the synchronous secondary device 200L issues a completion notification for all the requests up to sequence number SNo 1003 at step L124. In light of this, the history creation module 238L judges that the completion notification was issued for all the copy requests of the generation number 100 at this step L124, and sets the history status of the bitmap BMA of the generation number 100 to "determined."

After that, the copy module 232P (FIG. 7) of the primary device 200P sends the copy request based on the asynchronous copy to the asynchronous secondary device 200R (FIG. 10, P128). The requests sent here are only items based on all the requests WR31, WR32, and WR33 of the generation number 100 before the split instruction. The asynchronous secondary device 200R executes the write processing according to these requests (R130), and sends the completion notification to the primary device 200P (R131). Note that hereafter, the description is of all the asynchronous remote copy data (here, WR31, 32, and 33) being sent to the asynchronous secondary storage device 200R at the time of the split instruction, but the data transfer timing is not limited to this. For example, it is also possible to execute asynchronous remote copying at any time. Furthermore, when a split instruction is received, the primary storage device 200P may confirm the presence or absence of requests WR for which generation numbers have been allocated before the split instruction, and send the applicable requests WR to the asynchronous secondary device 200R.

Figure 18:
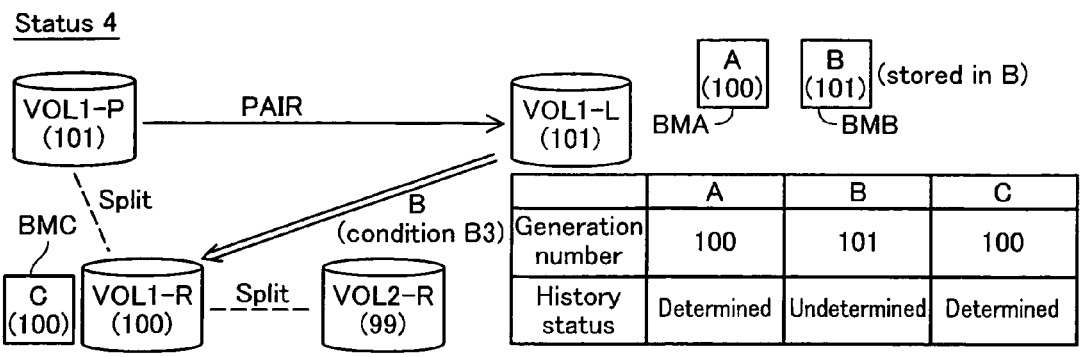
FIG. 18 is an explanatory drawing showing the status 4.

After issuing of the completion notification for all the copy requests based on the asynchronous copy, the system 10a status changes to status 4. FIG. 18 is an explanatory drawing showing the status 4. The copy module 232P sets the pair status of the asynchronous copy pair CP2 for the pair information 248P to "split" (P132) responsive to receiving the completion notification of all the copy requests based on the asynchronous copy from the asynchronous secondary device 200R. Then, the copy module 232P sends the split completion notification to the asynchronous secondary device 200R. Next, at step R143, at the asynchronous secondary device 200R, the history creation module 238R that received the split completion notification sets the history status of the third bitmap BMC to "determined." Also, the backup module 242R that received the split completion notification sets the pair status of the asynchronous copy pair CP2 for the pair information 248R (FIG. 7) to "split." As a result, the system 10a status becomes status 4 for which the split is completed. With this status 4, the asynchronous cop destination volume VOL1-R has host consistency.

Figure 19:
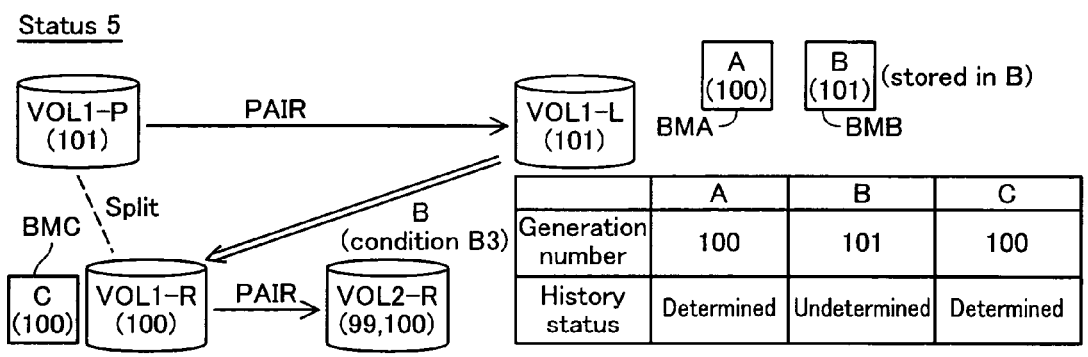
FIG. 19 is an explanatory drawing showing the status 5.

After completion of the split, the system 10a status changes to status 5. FIG. 19 is an explanatory drawing showing the status 5. With step M136 of FIG. 11, the management server 110P (management module 116P) sends resynchronization instructions to the asynchronous secondary device 200R. The backup module 242R which has received the resynchronization instructions copies the data of the source volume VOL1-P to the destination volume VOL2-R (backup copy), and matches the data of the destination volume VOL2-R to the data of the source volume VOL1-P (FIG. 11, R138). At this time, the backup module 242R copies only the data of the updated blocks specified by the third bitmap BMC. Also, the backup module 242R sets the pair status of the backup copy pair BCP of the pair information 248R to "resynchronization." After copy completion, the backup module 242R sets this pair status to "pair," and furthermore, sends the resynchronization completion notification to the management server 110P (status 5).

Meanwhile, it is possible that during the time from the start of this backup copy until completion, the backup volume VOL2-R does not have host consistency. However, the copy source volume VOL1-R has host consistency.

Also, when the resynchronization instructions are received, there are cases when the pair status of the second copy pair CP2 for the pair information 248R (FIG. 7) is not "split." In this case, the backup module 242R sends to the management server 110P notification that execution is impossible for the resynchronization instructions (not illustrated) instead of backing up (FIG. 11, R138). The management server 110P (management module 116P) repeatedly sends the resynchronization instructions to the asynchronous secondary device 200R until resynchronization is possible.

Figure 20:
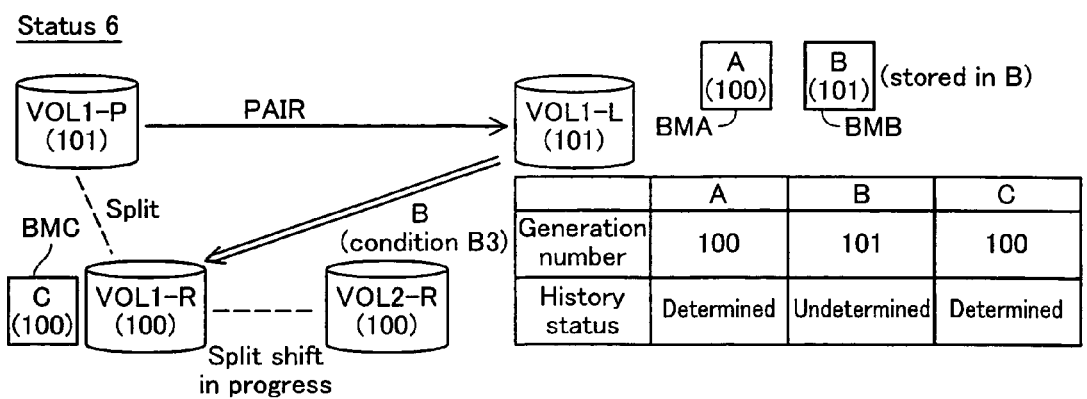
FIG. 20 is an explanatory drawing showing the status 6.

After resynchronization completion, the system 10a status changes to status 6. FIG. 20 is an explanatory drawing showing the status 6. The management server 110P (management module 116P) sends the split instruction to the asynchronous secondary device 200R responsive to the resynchronization completion notification (FIG. 11, M140). The backup module 242R of the asynchronous secondary device 200R sets the pair status of the backup copy pair BCP for the pair information 248R (FIG. 7) to "split" (status 6).

Figure 21:
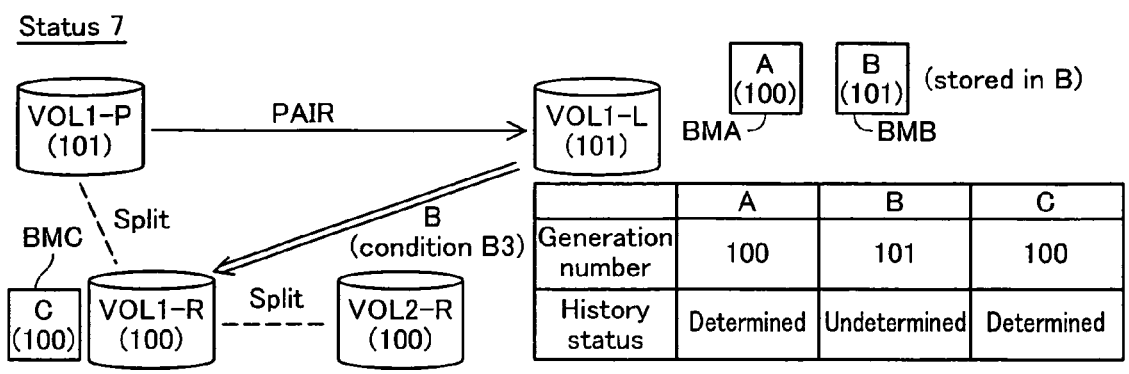
FIG. 21 is an explanatory drawing showing the status 7.

After split completion, the backup module 242R sends the split completion notification to the management server 110P (FIG. 11, R142). When this is done, the system 10a status changes to status 7. FIG. 21 is an explanatory drawing showing the status 7.

Figure 22:
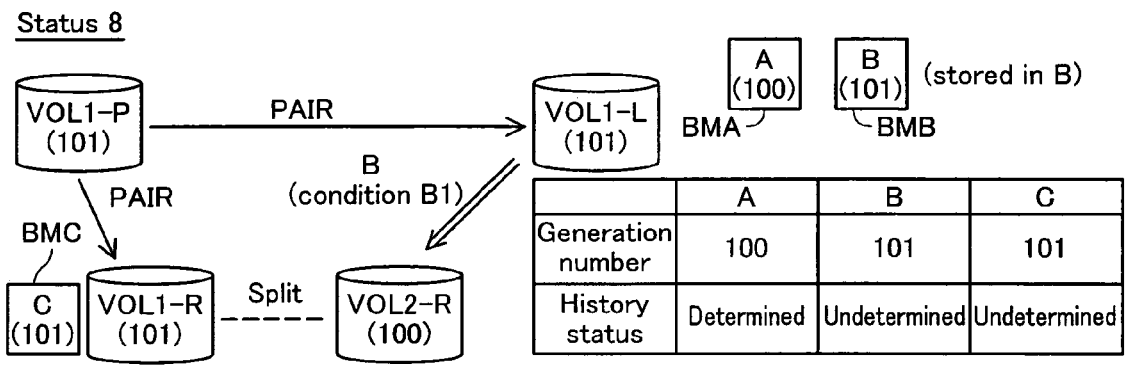
FIG. 22 is an explanatory drawing showing the status 8.

Furthermore, after the split completion, the system 10a status changes to status 8. FIG. 22 is an explanatory drawing showing the status 8. The management server 110P (management module 116P), when a split completion notification is received, sends the resynchronization instruction to the primary device 200P (FIG. 11, M144). The copy module 232P which has received the resynchronization instruction sends to the asynchronous secondary device 200R (FIG. 11, P146) the instruction to clear the third bitmap BMC and the instruction for setting the history status of the third bitmap BMC to "undetermined." The history creation module 238R which received these instructions clears the third bitmap BMC and sets its history status to "undetermined" (FIG. 11, R148).

Furthermore, the copy module 232P notifies the start of resynchronization to the asynchronous secondary device 200R (FIG. 11, P150). Next, at step R152, the history creation module 238R which received the notification sets the generation number of the third bitmap BMC to one newer number (101). Furthermore, the backup module 242R which received the notification sets the pair status of the asynchronous copy pair CP2 for the pair information 248R (FIG. 7) to "pair."

Next, the copy module 232P executes resynchronization processing (P154). The copy module 232P sets the pair status of the asynchronous copy pair CP2 for the pair information 248P to "resynchronization." Then, the copy module 232P sends (P156) the copy requests WR34R and WR35R to the asynchronous secondary device 200R according to the new generation (101) requests (WR34, 35) saved in the cache memory 260P. The asynchronous secondary device 200R executes the write processing according to the request. Also, the history creation module 238R updates the third bitmap BMC according to this write process. As a result, the system 10a status becomes the status 8 shown in FIG. 22.

This status 8 is the same as the status 1 shown in FIG. 15 except for the point that the two bitmaps BMA and BMB positions are switched and the point that the generation number is updated. Hereafter, the data processing system 10a, the same as with the procedure in FIG. 10 and FIG. 11, repeatedly executes the split and resynchronization processing.

Note that with the examples in FIG. 10 and FIG. 11, described is a case when the five host requests WR31 to WR35 for which write sequence changing is allowed are sent to the primary host 100P, and even in a case when a different number of requests are sent at a different timing, the system 10a status change is the same. Furthermore, even when a plurality of requests for which changing is not allowed are sent, the system 10a status change is the same simply by changing the timing at which later host requests are sent.

As described above, with the second embodiment, the backup volume VOL2-R stores a backup of the primary device 200P volume VOL1-P at the point when the primary device 200P receives the last split instruction (FIG. 10, P110). Furthermore, the third bitmap BMC is cleared before the execution of writing of the new generation copy request (FIG. 11, R148). Therefore, the update history according to the new generation request is stored in the third bitmap BMC. Meanwhile, the synchronous secondary device 200L stores the new generation bitmap and the bitmap of the generation one prior to the new generation.

B3. Secondary Copy Process

Figure 23:
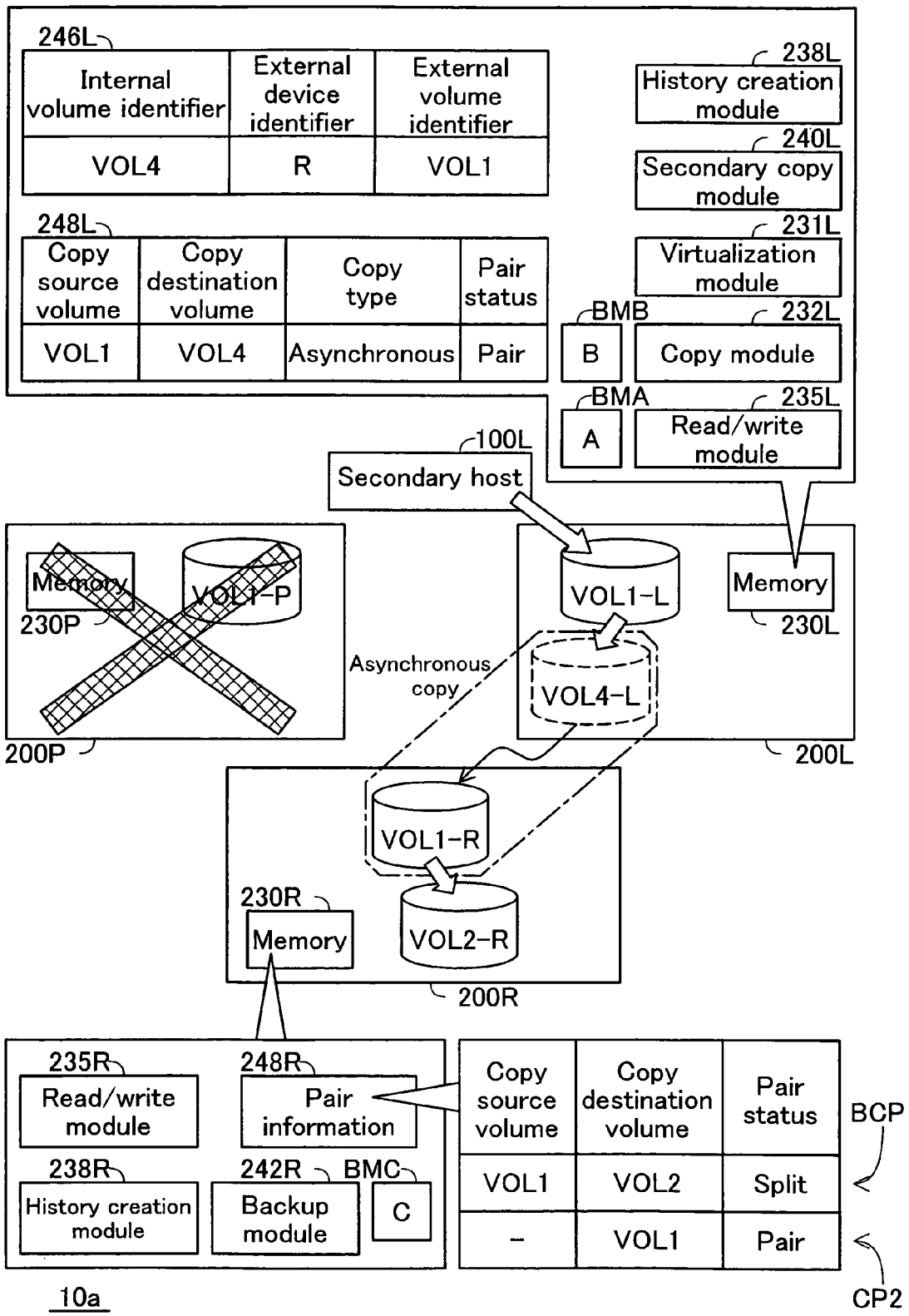
FIG. 23 is an explanatory drawing showing the data processing system 10a when a problem occurs with the primary device 200P.

FIG. 23 is an explanatory drawing showing the data processing system 10a when a problem occurs in the primary device 200P. In this case as well, the same as with the first embodiment shown in FIG. 6, the secondary host 100L restarts the data processing by using the synchronous secondary device 200L. However, before restarting data processing, the secondary copy module 240L executes the secondary copy processing for matching the data of the volume of the synchronous secondary device 200L and the data of the volume of the asynchronous secondary device 200R. The reason that this secondary copy process is executed is that after restarting of the data processing by the secondary host 100L, the same as in normal times, the data stored in the volume VOL1-L is copied to the asynchronous secondary device 200R. Here, the secondary copy module 240L, instead of copying the whole of one volume into another volume, uses the bitmaps BMA, BMB, and BMC to specify parts between two volumes for which data is different, and copies only the data of this different part (hereafter also called "differential data").

FIG. 24 is a flow chart showing the procedure of the secondary copy process. With the first step S200, the secondary copy module 240L selects the volume having host consistency (hereafter the selected volume is also called the "consistent volume") from among the two volumes VOL1-R and VOL2-R of the asynchronous secondary device 200R. FIG. 25 (A) shows the condition for selecting the consistent volume. This condition is determined based on the pair status of the pair information 248R. The secondary copy module 240L can fetch the pair information 248R by sending a fetch request to the backup module 242R.

When the pair status of the asynchronous copy pair CP2 is "split" (condition V1), the secondary copy module 240L selects the volume VOL1-R. Meanwhile, when the pair status of the asynchronous copy pair CP2 is not "split," and when the pair status of the backup copy pair BCP is "split" (condition V2), the secondary copy module 240L selects the backup volume VOL2-R. Note that normally, if the pair status of the asynchronous copy pair CP2 is not "split," then the pair status of the backup copy pair BCP is "split."

With the next step S210 (FIG. 24), the secondary copy module 240L selects the bitmap for specifying the difference (also called the "differential bitmap"). Here, the differential bitmap means 1 or more bitmaps for which it is possible to specify the part for which data differs between the volume VOL1-L and the consistent volume. FIG. 25(B) shows the conditions for selecting the differential bitmap. The numbers in the parentheses added to the differential bitmap indicate the number of selected bitmaps. This condition is determined based on the generation number and the history status of each bitmap BMA, BMB, and BMC. Note that the secondary copy module 240L is able to fetch information relating to the third bitmap BMC by sending the fetch request to the backup module 242R. Details of the differential bitmap selection process are described later.

Also, following, the two bitmaps BMA and BMB of the synchronous secondary device 200L are also called the "synchronous bitmaps BMA and BMB." Also, the third bitmap BMC of the asynchronous secondary device 200R is also called the "asynchronous bitmap BMC."

With the next step S220 (FIG. 24), the secondary copy module 240L selects the copy direction. Normally, the secondary copy module 240L copies the volume in which relatively new data is stored to another volume. This is because restarting of the data process is done by using relatively new host data.

Here, of the copy request generation numbers reflected in the volume, the newest number is called the "volume generation number." The secondary copy module 240L selects as the copy direction the direction from the volume for which the generation number is relatively new to the volume for which the generation number is relatively old. The generation number of the synchronous copy destination volume VOL1-L is the same as that of the newer bitmap between the synchronous bitmaps BMA and BMB. The generation number of the asynchronous copy destination volume VOL1-R is the same as the generation number of the asynchronous bitmap BMC. Also, when the backup volume VOL2-R is selected as the consistent volume, the pair status of the second copy pair CP2 is "not split." In this case, the generation number of the backup volume VOL2-R is just one older than the generation number of the asynchronous bitmap BMC.

Note that the secondary copy module 240L may also select the copy direction according to the user instructions. The secondary copy module 240L can fetch this kind of instruction using the operating panel (not illustrated) of the synchronous secondary device 200L or from the management server that is able to communicate with the synchronous secondary device 200L.

With the next step S230 (FIG. 24), the secondary copy module 240L performs copying of the differential data between the volume VOL1-L and the consistent volume, and matches the data of these volumes. With this step S230, the secondary copy module 240L sends the read/write request for the consistent volume to the asynchronous secondary device 200R. The reading and writing according to this request is executed by the read/write module 235R.

When the differential data copying is completed, the secondary copying process ends. After that, the secondary host 100L uses the secondary storage device 200L (VOL1-L) to restart the data processing.

Next, the details of the differential bitmap selection conditions are described. Following, that bitmap within the synchronous bitmaps BMA and BMB whose generation is the same as that of the asynchronous bitmap BMC is also called simply "same generation bitmap." Similarly, that bitmap within the synchronous bitmaps BMA and BMB whose generation is different from that of the asynchronous bitmap BMC is also called simply "different generation bitmap."

(1) Condition B1:

When the status of the asynchronous bitmap BMC is "undetermined," and the status of the different generation bitmap is "determined," only the same generation bitmap is selected. As a status that establishes this condition B1, for example, there is the status 1 of FIG. 15. When a problem occurs with the primary device 200P with this status 1, the data of the updated block specified by the first bitmap BMA are copied from the volume VOL1-L to the backup volume VOL2-R.

When the status of the asynchronous bitmap BMC is undetermined, normally, the backup volume VOL2-R is selected as the consistent volume. Also, the generation of this backup volume VOL2-R is one older than that of the asynchronous bitmap BMC. Furthermore, when the status of the different generation bitmap is "determined", normally, the generation of this different generation bitmap is one older than that of the asynchronous bitmap BMC. With the status 1, the generation number of the asynchronous bitmap BMC is 100, the generation number of the different generation bitmap (BMB) is 99. In this way, when the condition B1 is established, the generation of the same generation bitmap is one newer than that of the consistent volume (backup volume VOL2-R). Therefore, by using this same generation bitmap, it is possible to specify the part of the data that is different between the volume VOL1-L and the consistent volume (VOL2-R). Note that the same is true for the status 8 shown in FIG. 22.

(2) Condition B2:

When the asynchronous bitmap BMC status is "undetermined," and the status of the different generation bitmap is "undetermined," both of the synchronous bitmaps BMA and BMB are selected. As a status that fulfills this condition B2, for example, there is the status 2 shown in FIG. 16. When a problem occurs with the primary device 200P with this status 2, the data of the updated block shown by the bitmap selected by the OR operation of the two bitmaps BMA and BMB is copied from the volume VOL1-L to the backup volume VOL2-R.

When the asynchronous bitmap BMC is undetermined, and the different generation bitmap is undetermined, normally, the generation of this different generation bitmap is one newer than that of the asynchronous bitmap BMC. With the status 2, the generation number of the asynchronous bitmap BMC is 100, and the generation number of the different generation bitmap (BMB) is 101. In this way, when the condition B2 is established, the generation (100, 101) of both the synchronous bitmaps BMA and BMB are newer than the generation (99) of the consistent volume (backup volume VOL2-R). Furthermore, the generation numbers (100, 101) of the synchronous bitmaps are continuous with the generation number (99) of the consistent volume. Therefore, by using the bitmaps obtained by the OR operation of both the synchronous bitmaps BMA and BMB, it is possible to specify the part of the data that is different between the volume VOL1-L and the consistent volume (VOL2-R). Note that the same is true for the status 3 in FIG. 17 as well.

(3) Condition B3:

When the status of the asynchronous bitmap BMC is "determined," and the status of the same generation bitmap is "determined," that bitmap is selected from among the synchronous bitmaps BMA and BMB whose status is "undetermined" and whose generation is newer than that of the asynchronous bitmap BMC. As a status that establishes this condition B3, for example, there is the status 4 of FIG. 18. When a problem occurs with the primary device 200P with this status 4, the data of the updated block specified by the second bitmap BMB is copied from the volume VOL1-L to the volume VOL1-R.

When the status of the asynchronous bitmap BMC is determined, normally, the asynchronous copy destination volume VOL1-R is selected as the consistent volume. Furthermore, when the same generation bitmap status is "determined", normally, the different generation bitmap status is "undetermined". In this case, the generation of the different generation bitmap is one newer than that of the asynchronous bitmap BMC (specifically, the generation of the consistent volume VOL1-R). With the status 4, the generation number (101) of the different generation bitmap (BMB) is one newer than the generation (100) of the asynchronous bitmap BMC. In this way, when the condition B3 is established, the generation of that bitmap out of the synchronous bitmaps BMA and BMB whose generation is newer than that of the asynchronous bitmap BMC and whose status is "undetermined" is one newer than that of the consistent volume (VOL1-R). Therefore, by using this bitmap, it is possible to specify the part of the data that is different between the volume VOL1-L and the consistent volume (VOL1-R). Also, the bitmap selected here is the bitmap representing the history of the relatively new generation out of the two synchronous bitmaps BMA and BMB. Note that the same is true for the status 5 shown in FIG. 19, the status 6 shown in FIG. 20, and the status 7 shown in FIG. 21.

Note that depending on the status of the data processing system 10*a*, there are cases when none of the conditions B1 to B3 are established. In such a case, the secondary copy module 240L may also copy all of one volume to another volume instead of copying only the differential data.

As described above, with the second embodiment, the secondary copy module 240L selectively uses the two synchronous bitmaps BMA and BMB according to the conditions shown in FIG. 25(B). As a result, compared to a case of always using the OR calculation results of the two synchronous bitmaps BMA and BMB, it is possible to reduce the time required for bitmap calculation and the amount of differential data to be copied. As a result, even when a problem occurs with the primary storage device 200P, it is possible to quickly match the data of the volume VOL1-L of the secondary storage device 200L and the data of the volume (consistent volume) of the secondary storage device 200R. As a result, by using the two storage devices 200L and 200R, it is possible to increase the redundancy of data and to quickly restart data processing.

Also, with the second embodiment, the backup copying while the asynchronous copying is suspended and the asynchronous copying are alternately executed repeatedly. Therefore, the asynchronous secondary device 200R is able to secure at least one volume having host consistency. As a result, even when a problem occurs with the primary device 200P, it is possible to quickly restart the data processing by using the asynchronous secondary device 200R.

C. Third Embodiment

Figure 26:
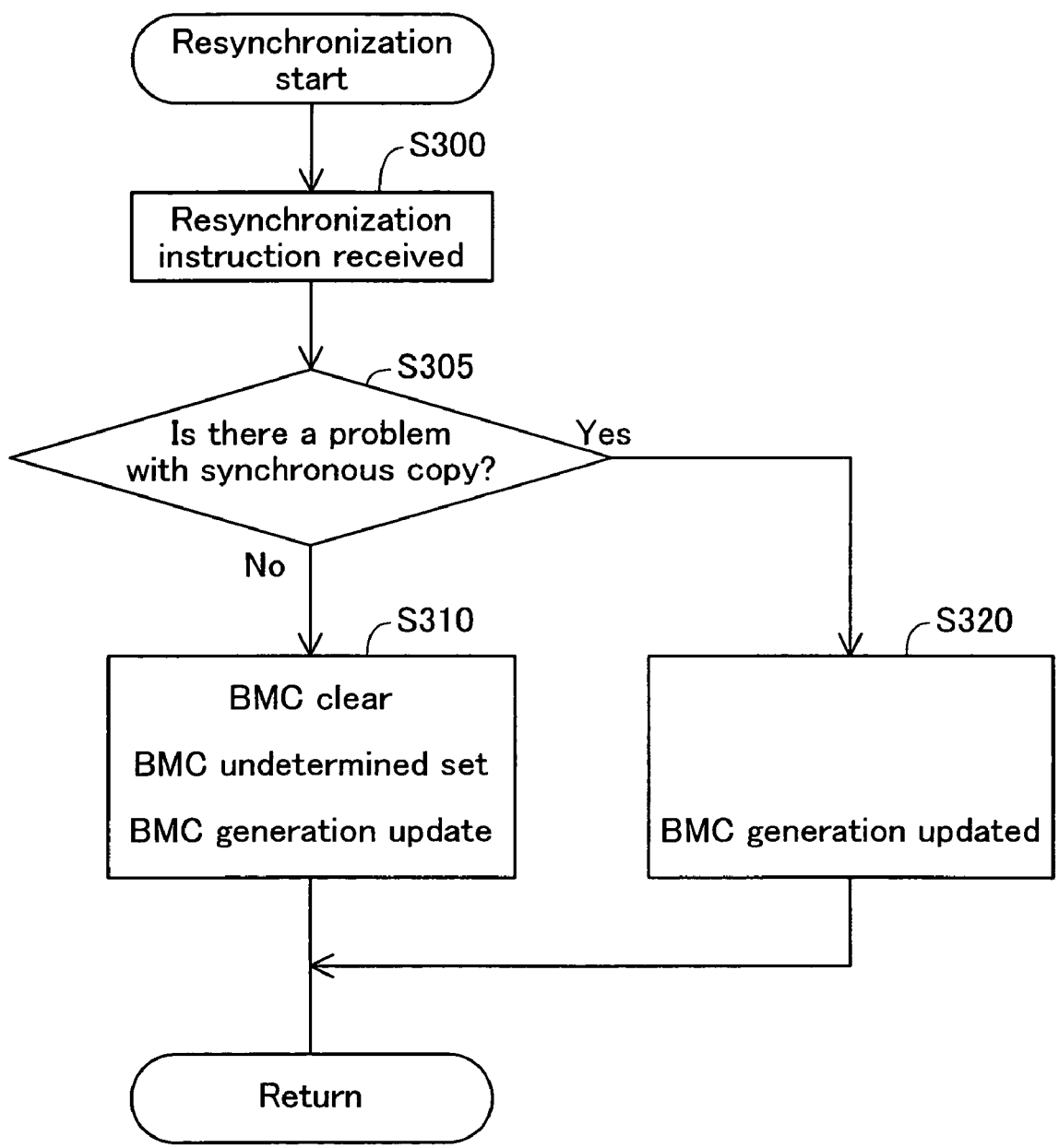
FIG. 26 is an explanatory drawing showing the process executed by the copy module 232P of the third embodiment when starting the resynchronization of the asynchronous copy pair CP2.

FIG. 26 is an explanatory drawing showing the process that the copy module 232P executes at the start of resynchronization of the asynchronous copy pair CP2 for the third embodiment. There are two differences from the second embodiment described above. The first difference is that the process at the start of this resynchronization is switched according to the presence or absence of problems with the synchronous copying. The other procedures of the writing process are the same as the example shown in FIG. 10 and FIG. 11. The second difference is that a new condition is added to the conditions for selecting the differential bitmap. The constitution of the data processing system is the same as the data processing system 10*a* shown in FIG. 7.

When the copy module 232P (FIG. 7) receives the resynchronization instructions from the management server 110P at step S300 (FIG. 11, step M144), a judgment is made of whether or not there is a problem with synchronous copying (S305). The copy module 232P can detect the presence or absence of problems using various methods. For example, when the copy module 232P is not able to receive completion notification even when the time elapsed from sending of the copy request to the synchronous secondary device 200L exceeds the specified time, it is judged that there is a problem. Also, when the copy module 232P receives an error notification from the interface (not illustrated) connected to the communication path for synchronous copying, it is judged that there is a problem. The copy module 232P is able to judge the presence or absence of a problem by comprehensively using these kinds of various conditions.

The process (step S310) when it is judged that there is no problem with synchronous copying is the same as the process described with FIG. 10 and FIG. 11. As shown with step P146 of FIG. 11, the copy module 232P sends to the asynchronous secondary device 200R the instruction for clearing the third bitmap BMC (also simply called "clear instruction") and the instruction for setting the history status of the third bitmap BMC to "undetermined" (also simply called "undetermined setting instruction"). Furthermore, as shown with step P150, the copy module 232P sends to the asynchronous secondary device 200R the instruction that makes the third bitmap BMC one generation newer (the resynchronization start notification corresponds to this generation update instruction). Hereafter, the data processing system 10*a* executes the data write process according to the same procedure as in FIG. 10 and FIG. 11.

Meanwhile, when it is determined that there is a problem with synchronous copying, the copy module 232P shifts to step S320. In this case, the copy module 232P sends to the asynchronous secondary device 200R only the instruction for making the generation of the third bitmap BMC one newer without sending the clear instruction and the undetermined setting instruction.

C1. Data Write Process Details

Figure 27:
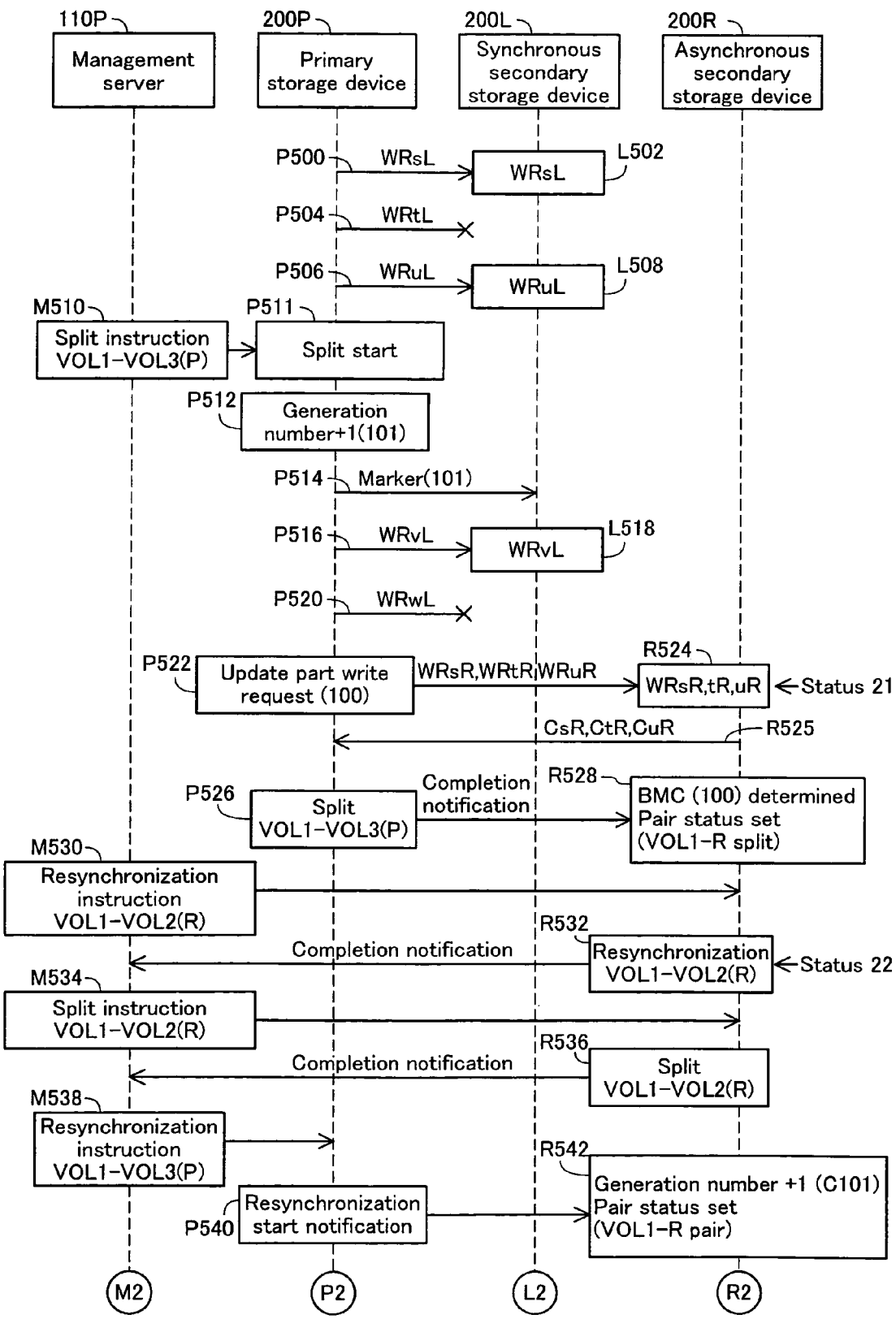
Figure 28:
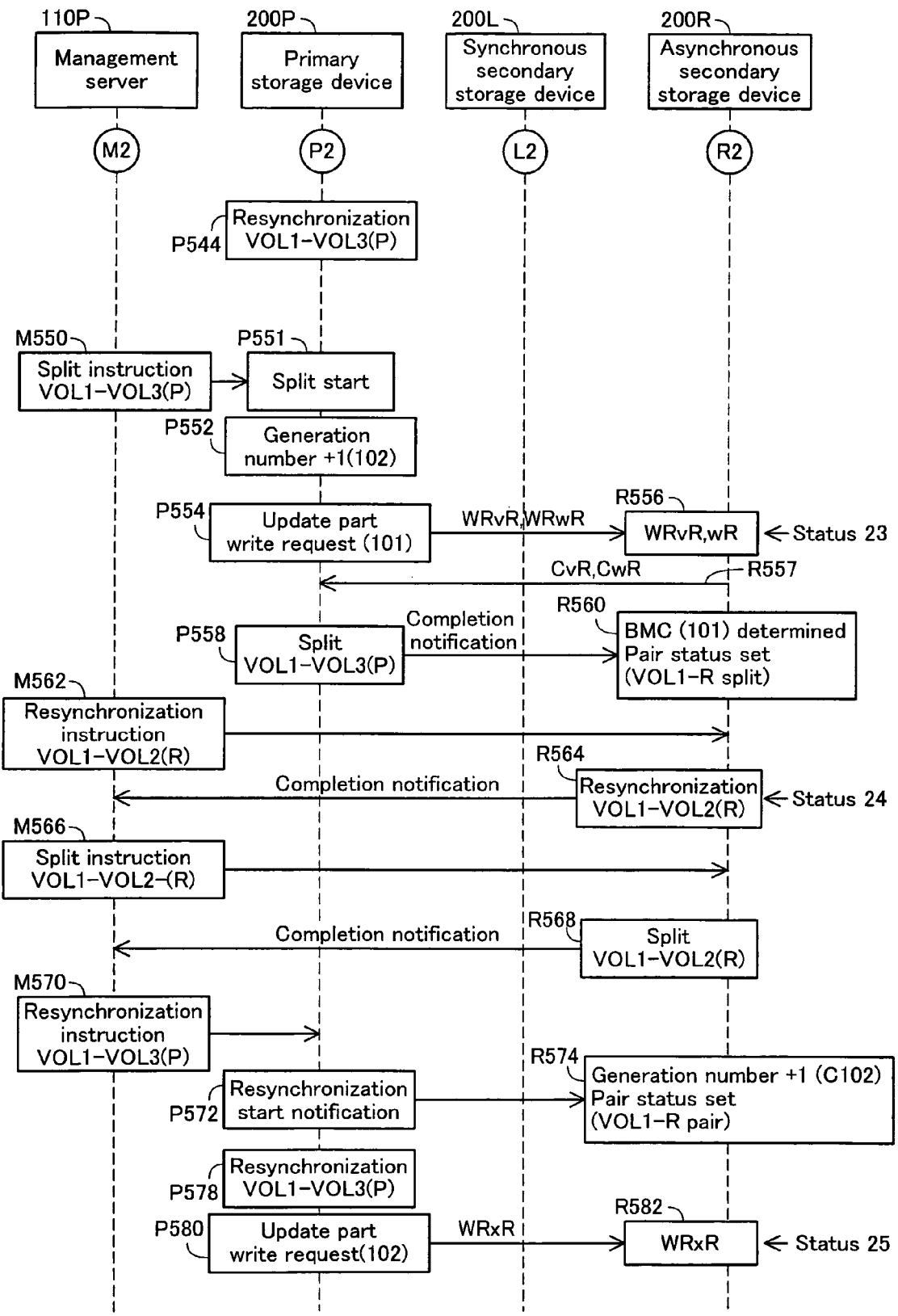

FIG. 27 and FIG. 28 are sequence drawings showing the procedure of the data write process by the data processing system 10*a*. FIG. 28 shows the latter half after the procedure of FIG. 27. The difference with the procedures shown in FIG. 10 and FIG. 11 is only that the process is switched at the time of starting resynchronization of the asynchronous copy pair CP2 with a problem in the communication path of the synchronous copy.

With this example, even when a problem occurs with synchronous copying, the data processing continues using the primary device 200P and the asynchronous secondary device 200R. Also, in this case, the copy request is no longer sent to the synchronous secondary device 200L. Furthermore, the completion notification of the host request to the primary host 100P is sent according to receiving of the write completion notification to the source volume VOL1-P (for example, the completion notification C10*a* of FIG. 5). At this time, there is no consideration of whether or not the primary device 200P receives the copy request completion notification of the asynchronous copy pair CP2 (for example, the request C10*e* (C10*d*) of FIG. 5).

Also, with this example, the primary host 100P sends to the primary device 200P the six hosts requests WRs to WRx. Here, changing of the write sequence of these requests WRs to WRx is allowed. Also, the generation number at the time that the first step P500 is executed is 100.

Note that each storage device 200, the same as with the example in FIG. 5, issues the copy (write) request completion notification, but with the description below and the other embodiments described later, the illustrated and description of this are omitted. Also, the primary device 200P executes the write processing according to the host request, but with the description below and the other embodiments described later, the illustrated and description of this are omitted.

First, the primary host 100P sends to the primary device 200P each request WRs to WRw in this order (not illustrated). The primary device 200P executes the write process and the sending of the copy requests WRsL to WRwL to the synchronous secondary device 200L according each request (steps P500, P504, P506, P516, P520). However, with the example in FIG. 27, a problem occurs with the communication path of the synchronous copying, and the request WRtL and the request WRwL are not delivered to the synchronous secondary device 200L. The synchronous secondary device 200L executes the write processing according to the received requests WRsL, WRuL, and WRvL (L502, L508, L518). For the purposes of the following description it is assumed that the communication between the primary device 200P and the synchronous secondary device 200L is stopped.

Meanwhile, the management server 110P (management module 116P) sends the split instruction to the primary device 200P (step M510). With the example in FIG. 27, the primary device 200P receives this split instruction between the request WRu and the request WRv. The primary device 200P which received the split instruction switches (P512) the current generation number to a new number (101), sends the marker (P514), and sends the write request based on the asynchronous copy to the asynchronous secondary device 200R (P522). These steps P512, P514, and P522 are respectively the same as the steps P112, P114, and P128 in FIG. 10. When this is done, the asynchronous secondary device 200R receives the requests WRsR, WRtR, and WRuR for which the generation number is 100, and executes the write processing according to these requests (R524). When this is done, the status of the data processing system 10a becomes status 21.

Figure 29:
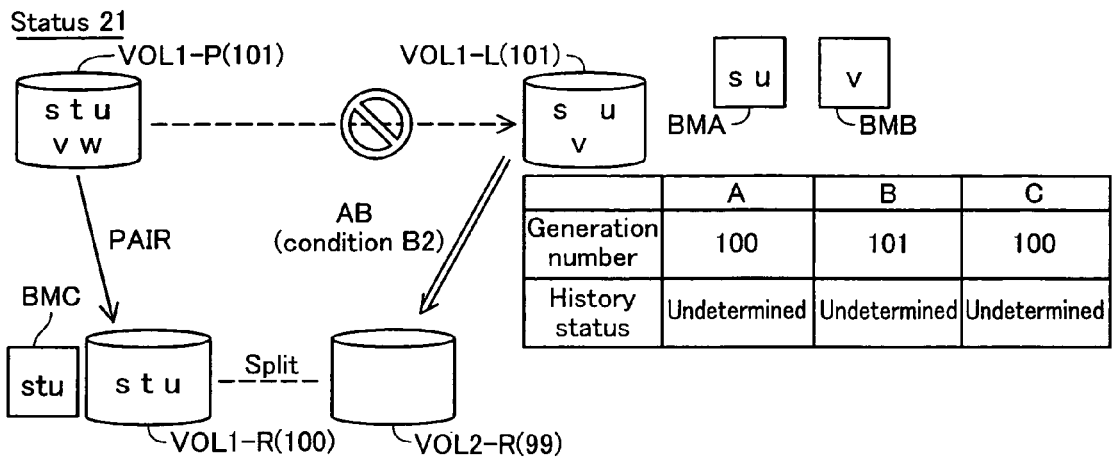
FIG. 29 is an explanatory drawing showing the status 21.

FIG. 29 is an explanatory drawing showing the status 21. In the drawing, the respective host data stored in the volume are shown using a code for which the code of the host request with the "WR" omitted. For example, the code "s" indicates the host data of the host request WRs. The same is also true for the other figures described later.

With this status 21, the synchronous copy destination volume VOL1-L stores three host data s, u, and v. Also, for the first bitmap BMA, the generation number is 100, and the history status is "undetermined." This first bitmap BMA stores the history of the host data s and u. Meanwhile, for the second bitmap BMB, the generation number is 101, and the history status is "undetermined." This second bitmap BMB stores the history of the host data v.

Meanwhile, the pair status of the asynchronous copy pair CP2 "VOL1-P, VOL1-R" is "pair." Also, the asynchronous copy destination volume VOL1-R stores the three host data s, t, and u for which the generation number is 100. For the third bitmap BMC, the generation number is 100, and the history status is "undetermined." This third bitmap BMC stores the history of the host data s, t, and u.

Next, the asynchronous secondary device 200R sends to the primary device 200P (FIG. 27, step R525) the completion notification according to the copy request by asynchronous copying. When the primary device 200P receives the completion notification of all the asynchronous copies, the primary device 200P and the asynchronous secondary device 200R execute the processes of making the asynchronous copy pair CP2 "script" (P526, R528). These steps P526 and R528 are respectively the same with the steps P132 and R134 of FIG. 10.

Next, the management server 110P (management module 116P) sends the resynchronization instructions and the split instructions to the asynchronous secondary device 200R (M530, M534). The asynchronous secondary device 200R backs up the asynchronous copy destination volume VOL1-R according to these instructions (R532, R536). These steps M530, R532, M534, and R536 are respectively the same as the steps M136, R138, M140, and R142 of FIG. 11.

Figure 30:
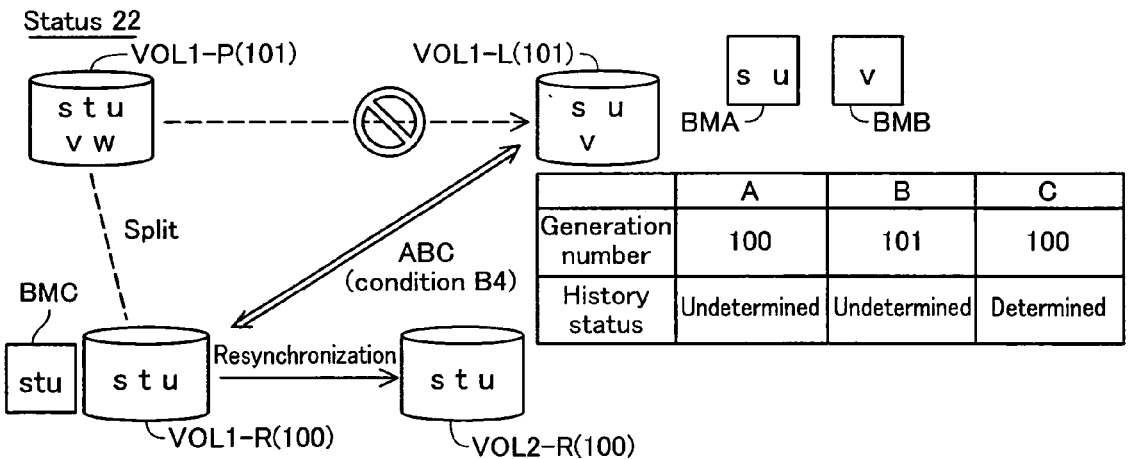
FIG. 30 is an explanatory drawing showing the status 22.

FIG. 30 is an explanatory drawing showing the status 22 of the asynchronous secondary device 200R executing the backup copy (resynchronization) process. With this status 22, the pair status of the asynchronous copy pair CP2 "VOL1-P, VOL1-R" is "split." Also, the history status of the third bitmap BMC is "determined."

Next, the management server 110P (management module 116P) sends the resynchronization instruction (M538) to the primary device 200P. With the example in FIG. 27, a problem occurs with the synchronous copy. Therefore, the copy module 232P executes the processing according to step S320 of FIG. 26. In specific terms, the copy module 232P sends the resynchronization start notification to the asynchronous secondary device 200R (P540) without sending the clear instruction or the undetermined setting instruction. The succeeding steps R542 and P544 (FIG. 28) are respectively the same as R152 and P154 of FIG. 11.

Next, the management server 110P (management module 116P) sends the new cycle split instruction to the primary device 200P (FIG. 28, M550). The data processing system 10a executes the new split processing (P551 to R560) according to this instruction. These steps P551 to R560 are respectively the same as the steps P511 to R528 (FIG. 27) of the previous cycle. Also, with this cycle, the primary device 200P sends the new generation (101) requests WRvR and WRwR to the asynchronous secondary device 200R (P554). The asynchronous secondary device 200R executes the write process according to the received request (R556). When this is done, the status of the data processing system 10a becomes the status 23.

Figure 31:
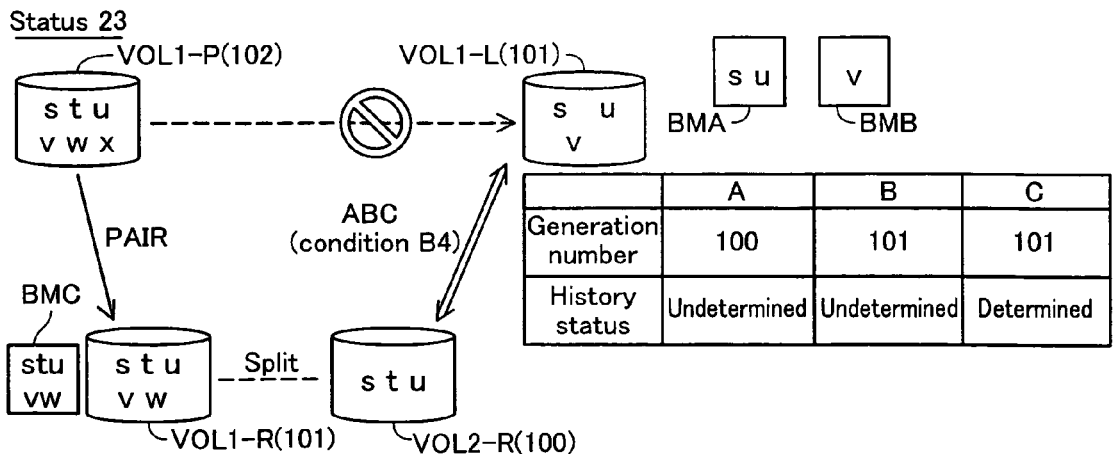
FIG. 31 is an explanatory drawing showing the status 23.

FIG. 31 is an explanatory drawing showing the status 23. The backup volume VOL2-R stores the generation number 100 data s, t, and u. The asynchronous copy source volume VOL1-R stores the generation number 101 data v and w in addition to the generation number 100 data s, t, and u. The third bitmap BMC is not cleared, so in addition to the generation number 101 history (v, w), it stores the generation number 100 history (s, t, and u). Note that with the example in FIG. 31, the volume VOL1-P stores the new data x. This data x is the data of the even newer generation (102).

Once the split of the asynchronous copy pair CP2 is completed, next, the management server 110P (management module 116P) sends the resynchronization instruction and the split instruction to the asynchronous secondary device 200R (M562, M566). The asynchronous secondary device 200R backs up (R564, R568) the asynchronous copy destination volume VOL1-R according to these instructions. These steps M562, R564, M566, and R568 are respectively the same as the steps M530, R532, M534, and R536 of FIG. 27.

Figure 32:
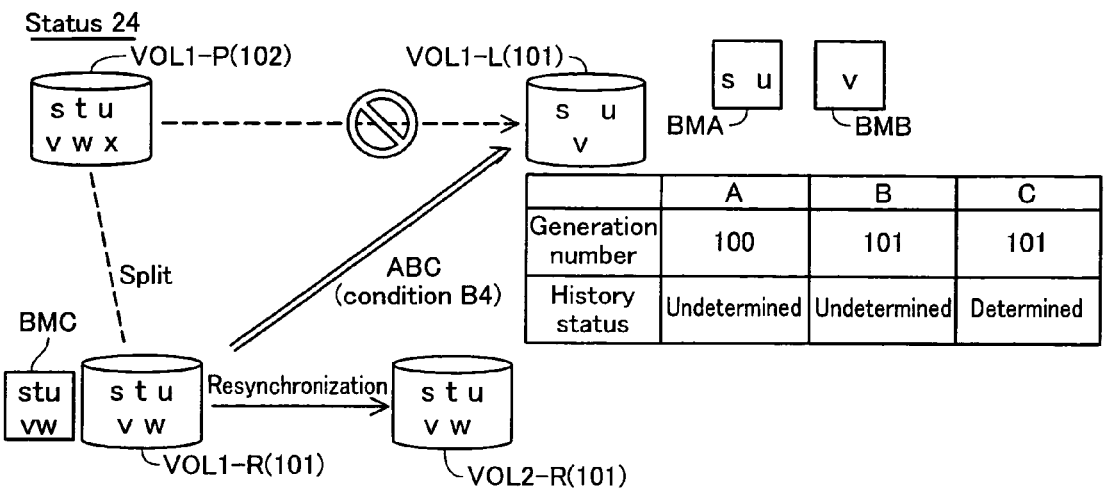
FIG. 32 is an explanatory drawing showing the status 24.

FIG. 32 is an explanatory drawing showing the status 24 for which the asynchronous secondary device 200R executes backup copy (resynchronization) processing. With this status 24, the pair status of the asynchronous copy pair CP2 "VOL1-P, VOL1-R" is "split."

Next, the management server 110P (management module 116P) sends the new cycle resynchronization instruction to the primary device 200P (M570). The primary device 200P and the asynchronous secondary device 200R execute the same processes (P572, R574, P578) as the processes when the resynchronization instruction is received previously (P540, R542, P544).

Next, the primary device 200P sends the write request based on the asynchronous copy to the asynchronous secondary device 200R (P580). With this step P580, the request WRxR for which the generation number is 102 is sent. The asynchronous secondary device 200R executes the write process (R582) according to this request WRxR. When this is done, the status of the data processing system 10a becomes the status 25.

Figure 33:
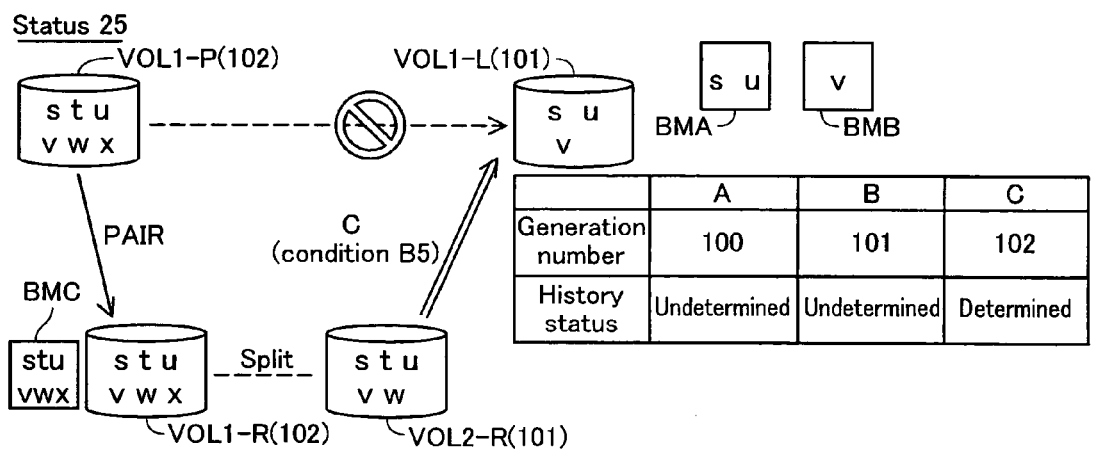
FIG. 33 is an explanatory drawing showing the status 25.

FIG. 33 is an explanatory drawing showing the status 25. With this status 25, the generation number of the third bitmap BMC is the number 102 which is newer than that of any of the synchronous bitmaps BMA and BMB. Also, the third bitmap BMC stores the history (x) of the generation number 102 in addition to the history (s, t, u, v, w) of the generation numbers 100 and 101.

As described above, with the third embodiment, after a problem occurs with the synchronous copy, the third bitmap BMC is not cleared, so the third bitmap BMC stores the history of all the generations from the point that the problem occurs.

C2. Secondary Copy Process

FIG. 34 is an explanatory drawing showing the conditions for selecting the differential bitmap. The difference from the embodiment shown in FIG. 25(B) is only that the conditions B4 and B5 are added. When a problem occurs with the primary device 200P (FIG. 7), the secondary copy module 240L executes secondary copy processing the same as with the second embodiment shown in FIG. 24. However, the selection of the differential bitmap (S210) is performed according to the condition of FIG. 34 instead of the condition in FIG. 25(B).

With the third embodiment, even when a problem occurs with the synchronous copy, the data processing continues using the primary 200P and the asynchronous secondary device 200R. As a result, it is possible for the generation number of the asynchronous bitmap BMC to be newer than the generation number of any of the synchronous bitmaps BMA and BMB. Therefore, to each of the conditions B1 to B3 described above, is added the condition that, "the generation number of one of the synchronous bitmaps BMA and BMB be the same as the generation number of the asynchronous bitmap BMC." However, the status of the data processing system 10a for which each condition has been established is the same as for the second embodiment described above. Also, the new conditions B4 and B5 indicate the status that can occur when a problem occurs with the synchronous copy.

(4) Condition B4:

When the status of the asynchronous bitmap BMC is "determined" and the status of the same generation bitmap is "undetermined," in addition to the asynchronous bitmap BMC, the undetermined bitmap within the synchronous bitmaps BMA and BMB is selected. As a status that establishes this condition B4, there is the status 22 of FIG. 30, for example. With this status 22, when a problem occurs with the primary device 200P, the three bitmaps BMA, BMB, and BMC are selected. Then, the data of the updated blocks shown by the bitmaps obtained by the OR operation of the three bitmaps BMA, BMB, and BMC are copied between the volume VOL1-L and the volume VOL1-R. In this case, the respective two volumes store data that are not mutually shared (data t and data v). Because of this, even when priority is given to relatively new data, the secondary copy module 240L cannot determine a desirable copy direction. In this kind of case, it is desirable for the secondary copy module 240L to select the copy direction according to the user instruction.

Normally, the undetermined synchronous bitmaps BMA and BMB have many cases of including update histories not stored in the consistent volume of the asynchronous secondary device 200R. Meanwhile, the asynchronous bitmap BMC continues to store history without being cleared in cases when a problem occurs with the synchronous copy. Therefore, it is possible that the asynchronous bitmap BMC will contain update histories that are not stored in the synchronous copy destination volume VOL1-L. Therefore, when the condition B4 is established (when none of the three previously described conditions B1, B2, and B3 are established), it is preferable that the undetermined bitmap within the synchronous bitmaps BMA and BMB and the asynchronous bitmap BMC be selected. Here, if the secondary copy module specifies differential data using the bitmap obtained by the OR operation of the selected bitmaps, it is possible to execute differential data copying without omission. Note that this is also the same for the status 23 shown in FIG. 31 and the status 24 shown in FIG. 32.

(5) Condition B5:

When the generation number of the asynchronous bitmap BMC is newer than the generation number of any of the synchronous bitmaps BMA and BMB, then only the asynchronous bitmap BMC is selected. As a status that establishes this condition B5, there is the status 25 of FIG. 33, for example. With this status, when a problem occurs with the primary device 200P, the data of updated blocks shown by the asynchronous bitmap BMC is copied from the backup volume VOL2-R to the volume VOL1-L.

When the condition B5 is established, even after a problem occurs with the synchronous copy, there are cases when the data processing continues using the asynchronous copy. In this kind of case, the newest data is stored in the consistent volume of the asynchronous secondary device 200R. Also, the asynchronous bitmap BMC stores all the history from after the generation at the point that the problem occurs with the synchronous copy. Therefore, by using the asynchronous bitmap BMC, it is possible to specify the part of the data that is different between the volume VOL1-L and the consistent volume.

Note that the asynchronous bitmap BMC stores the history of the asynchronous copy destination volume VOL1-R instead of the backup volume VOL2-R. However, the asynchronous bitmap BMC includes the history of updates already reflected in the backup volume VOL2-R. Therefore, even when the backup volume VOL2-R is selected as the consistent volume, by using the asynchronous bitmap BMC, it is possible to specify differential data without omission.

As described above, with the third embodiment, by using the asynchronous bitmap BMC for storing the updated history by the asynchronous copy, the secondary copy module 240L is able to specify the differential data (FIG. 34, conditions B4, B5). Therefore, even when a problem occurs with the primary device 200P after a problem occurred with the synchronous copy before that, by copying only the differential data, it is possible to quickly match the data of the volume VOL1-L of the secondary storage device 200L and the data of the volume (consistency volume) of the secondary storage device 200R.

D. Fourth Embodiment

FIG. 35 is a flow chart showing the procedure of the synchronous copy problem handling process executed by the primary device 200P for the fourth embodiment. In contrast to the third embodiment described above, when a problem occurs with the synchronous copy, the primary device 200P executes the split processing of the asynchronous copy pair CP2 spontaneously even when there is no split instruction from the management server 110P. The other procedures of the write process are the same as the examples shown in FIG. 26, FIG. 27, and FIG. 28. Also, the constitution of the data processing system is the same as the data processing system 10a of the FIG. 7.

The copy module 232P repeatedly executes the process of judging whether or not there is a problem with the synchronous copy (S500). When there is a problem, with the next step S510, the status of the asynchronous copy pair CP2 is confirmed. When the pair status is already "split," or when the "split instruction" is already received and splitting starts, the copy module 232P returns to the normal process without executing a spontaneous split process.

Next, the copy module 232P shifts to step S520, and starts the split process spontaneously. This spontaneous split process is the same as the split process executed according to instructions from the management server 110P. The generation setting module 236P receives instructions from the copy module 232P and updates the generation number (step S525). Thereafter, the same processes as in FIG. 26, FIG. 27, and FIG. 28 continue to be executed.

Also, the copy module 232P detects the host request for which the synchronous copy could not be completed at step S500. Furthermore the copy module 232P handles this host request as a new generation request after the spontaneous split when the spontaneous split is executed at step S520.

Note that the copy module 232P executes the spontaneous split process before the process of sending to the asynchronous secondary device 200R the copy request according to the host request for which a synchronous copy completion notification could not be received due to a problem. This is for the asynchronous secondary device 200R to secure a volume backup when a problem occurs. As a result, with the fourth embodiment, it is easy to restart the data process from the point that the problem occurs.

E. Fifth Embodiment

Figure 36:
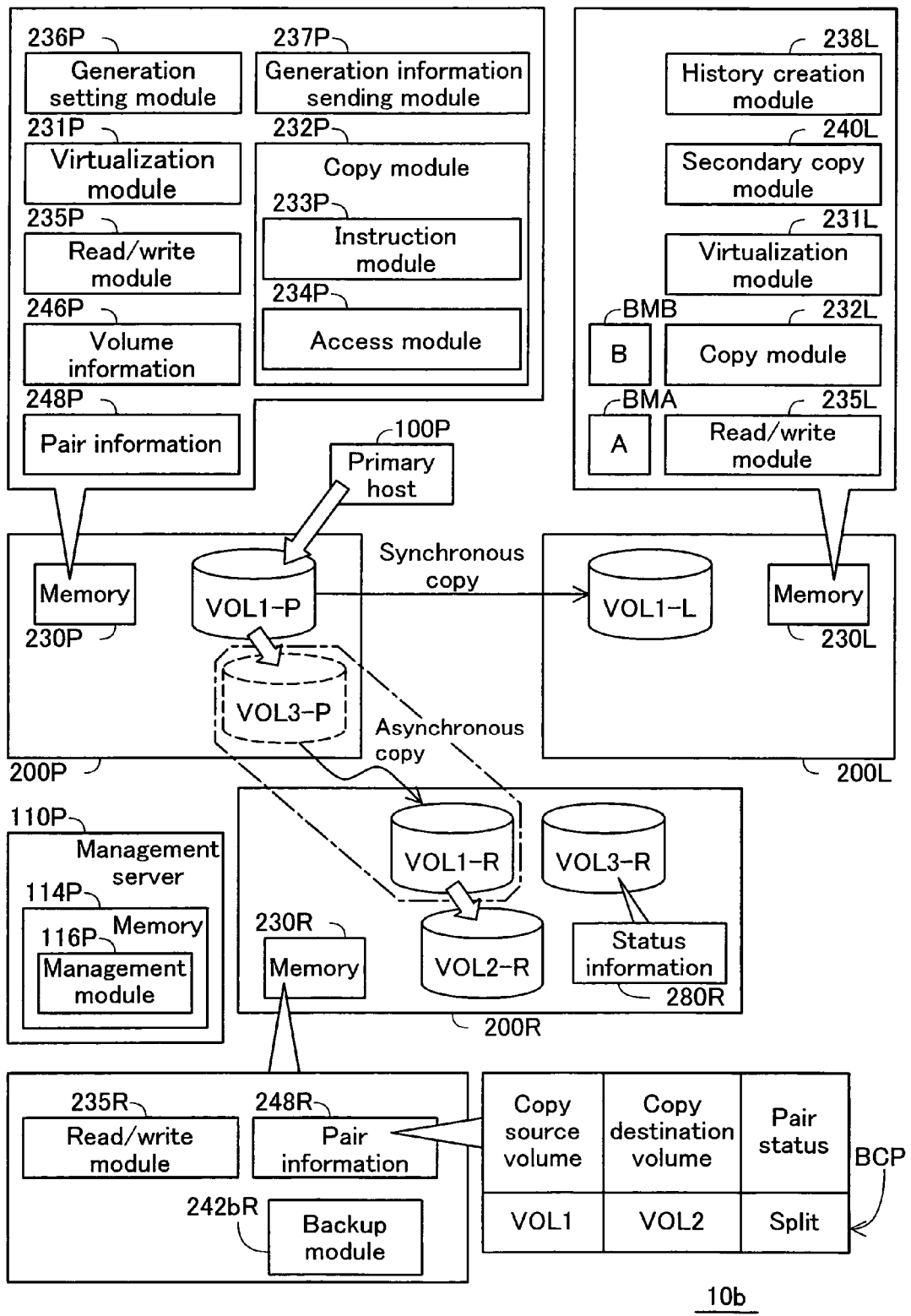
FIG. 36 is a schematic diagram showing the constitution of the data processing system 10b for the fifth embodiment.

FIG. 36 is a schematic drawing showing the constitution of the data processing system 10b for the fifth embodiment. There are three points of difference with the data processing system 10a shown in FIG. 7. The first difference is that at the asynchronous secondary device 200R, the history creation module 238R and the third bitmap BMC are omitted, and instead of these, provided is a volume VOL3-R for storing the status information 280R. The second difference is that the information relating to the second copy pair CP2 for the pair information 248R is omitted. The third difference is that the conditions used with the secondary copy process are different from the example shown in FIGS. 25(A) and (B). The other constitution is the same as the data processing system 10a of FIG. 7. Also, the procedure of the data write process by the data processing system 10b is the same as the procedure shown in FIG. 10 and FIG. 11 excluding the points below. Specifically, with the fifth embodiment, the process relating to setting the asynchronous bitmap BMC and the process relating to the setting of the asynchronous copy pair CP2 of the pair information 248R are omitted. Instead of these, the status information 280R write process is added.

E1. Data Write Process

Figure 37:
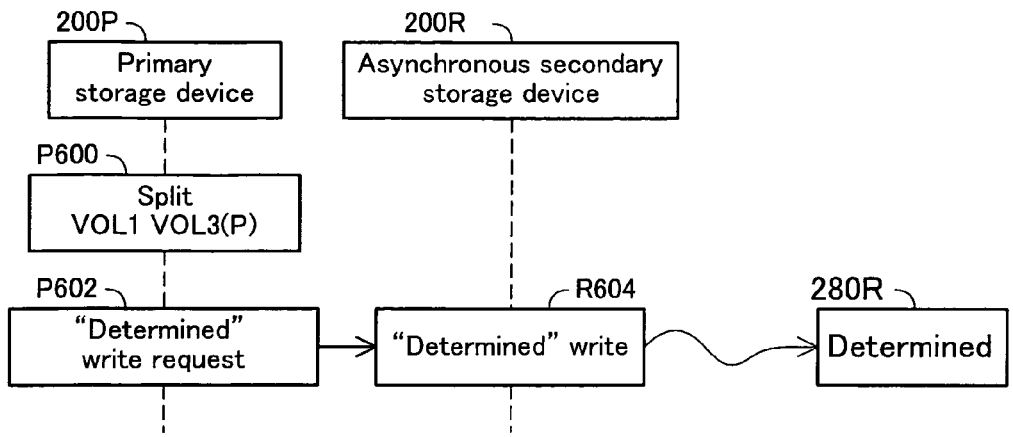
FIG. 37 is a sequence drawing showing the procedure of the write process of the status information 280R.

FIG. 37 is a sequence drawing showing the procedure of the write process of the status information 280R. This sequence drawing shows part of the data write process by the data processing system 10b, and shows the process that continues after the asynchronous copy is completed. The copy module 232P, after receiving completion notification of all the copy requests of the asynchronous copying, sets the pair status of the asynchronous copy pair CP2 for the pair information 248P to "split" (P600). This step P600 is the same as the step P132 of FIG. 10 (however, the completion notification is not sent). Next, the copy module 232P sends the write request for the volume VOL3-R to the asynchronous secondary device 200R (P602). The write data is data indicating "determined." The meaning of "determined" is described later. The read/write module 235R of the asynchronous secondary device 200R writes to the VOL3-R the data requested according to the received request (R604). The data written here corresponds to the status information 280R. Thereafter, the data processing system 10b executes the same processes as those in FIG. 10 and FIG. 11 until the management server 110P sends the resynchronization instruction of the asynchronous copy pair CP2 to the primary device 200P (e.g. FIG. 11, M144).

Figure 38:
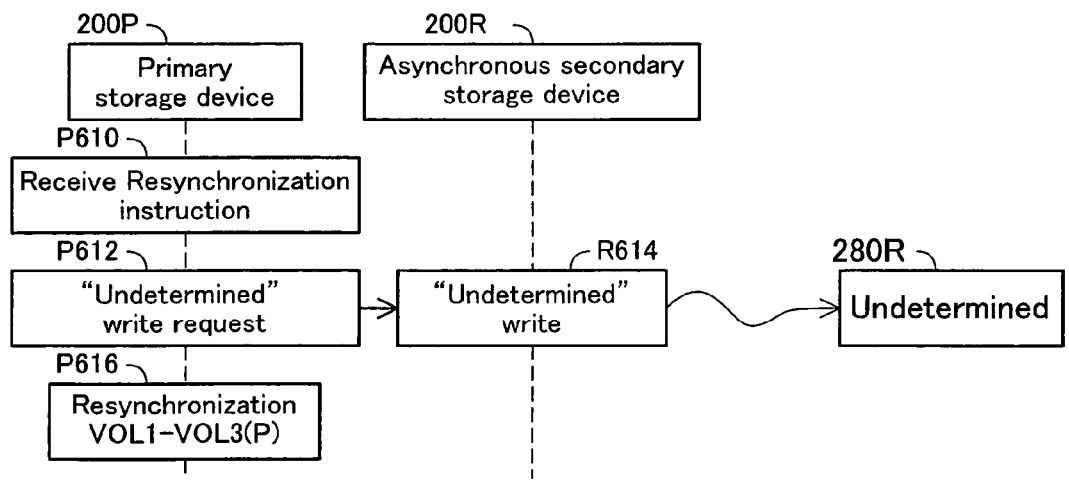
FIG. 38 is a sequence drawing showing the procedure of the write process of the status information 280R.

FIG. 38 is a sequence drawing showing the procedure of the writing process of the status information 280R. This sequence drawing shows part of the data writing process according to the data process system 10b and shows the process executed ahead of the execution of the resynchronization process of the asynchronous copy pair CP2. First, the copy module 232P receives resynchronization instructions from the management server 110P (P610). Next, before executing the resynchronization process, the copy module 232P sends the write request for the volume VOL3-R to the asynchronous secondary device 200R (P612). The requested write data is data indicating "undetermined." The meaning of "undetermined" is described later. The status information 280R is updated by this data. Next, the copy module 232P executes the resynchronization process (P616) with receiving of the completion notification (not illustrated) of write requests of the status information 280R from the read/write module 235R. This step P616 is the same as the step P154 of FIG. 11. Thereafter, the data processing system 10b executes the same processes as in FIG. 10 and FIG. 11 until the management server 110P sends the split instruction to the primary device 200P (e.g. FIG. 10, M108).

As described above, with the fifth embodiment, the status information 280R alternately indicates "determined" and "undetermined" according to the pair status of the asynchronous copy pair CP2. Here, the status information 280R is "determined" during the period from the time the asynchronous copying relating to one generation is completed until the time the asynchronous copying of the next generation starts. Specifically, the fact that the status information 280R is "determined" means that the asynchronous copy destination volume VOL1-R has host consistency. Meanwhile, the fact that the status information 280R is "undetermined" means that it is possible that the destination volume VOL1-R does not have host consistency. Note that in this case, normally, the backup volume VOL2-R has host consistency.

Figure 39:
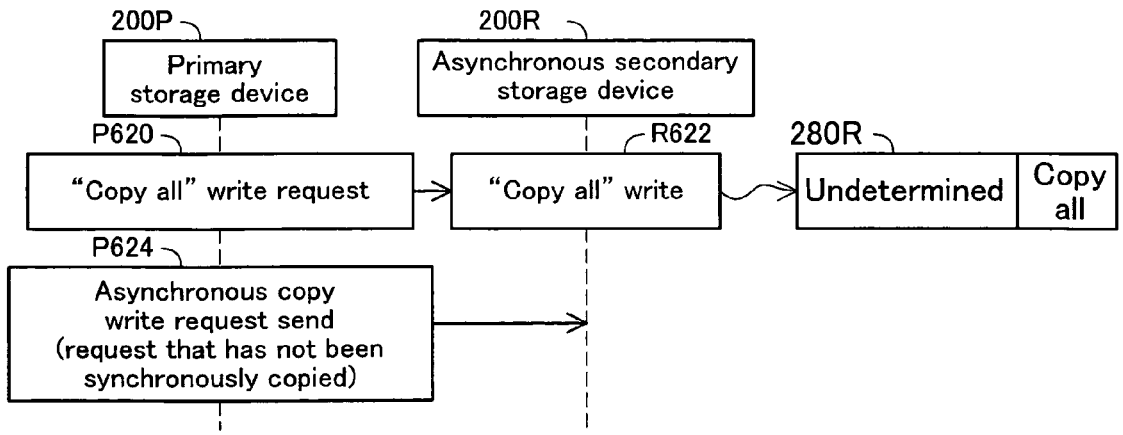
FIG. 39 is a sequence drawing showing the procedure of the write process of the status information 280R.

FIG. 39 is a sequence drawing showing the procedure of the status information 280R write process. This sequence drawing shows part of the data write process by the data processing system 10b, and shows the process executed when a problem occurs with the synchronous copy. When a problem occurs with the synchronous copy, the copy module 232P sends to the asynchronous secondary device 200R copy requests according to the host requests for which it is not possible to receive the completion notification of the synchronous copy. Before sending this kind of copy request to the asynchronous secondary device 200R, the copy module 232P sends to the asynchronous secondary device 200R (P620) the write request of data showing "copy all." The meaning of "copy all" is described later. The read/write module 235R writes the requested data to the VOL3-R (R622) according to the received request. Note that the status information 280R includes data indicating "copy all" in addition to data indicating "determined/undetermined."

Next, the copy module 232P sends to the asynchronous secondary device 200R (P624) the copy (write) request according to the asynchronous copy responsive to receiving of the completion notification (not illustrated) of the write requests of the status information 280R from the read/write module 235R. Included in this copy request are copy requests of host data for which synchronous copying is not done. Note that this step P624 is performed the same as step P128 of FIG. 10 and step P156 of FIG. 11. Thereafter, the data processing system 10b continues the data writing process the same as the examples in FIG. 10 and FIG. 11.

E2. Secondary Copy Process

With the fifth embodiment, when a problem occurs in the primary device 200P, the secondary copy module 240L executes the secondary copy process according to the procedure shown in FIG. 24. FIG. 40(A) shows the conditions for selecting the consistent volume. The difference with the conditions shown in FIG. 25(A) is that instead of the pair status of the second copy pair CP2, the status information 280R is used. As described above, when the status information 280R indicates "determined" (condition V11), the volume VOL1-R has host consistence, so the volume VOL1-R is selected. Meanwhile, when the status information 280R indicates "undetermined," and when the pair status of the backup copy pair BCP is "split" (condition V12), the backup volume VOL2-R is selected. Note that normally, when the status information 280R indicates "undetermined," the pair status of the backup copy pair BCP is "split." Also, the secondary copy module 240L is able to fetch the status information 280R by communication with the read/write module 235R.

FIG. 40(B) shows the condition for selecting the differential bitmap. The difference with the condition shown in FIG. 25(B) is that this condition is determined using the status information 280R.

(1) Condition B11:

When the status information 280R indicates "copy all," the secondary copy module 240L, instead of a differential copy, copies all of one volume to another volume. In this case, the asynchronous copy destination volume VOL1-R stores the data not stored in the synchronous copy destination volume VOL1-L. However, with the fifth embodiment, the asynchronous bitmap BMC is omitted, so specification of this differential data is not possible. In light of this, the secondary copy module 240L executes copying of the entire volume.

(2) Condition B12:

When the status information 280R does not indicate "copy all," and does indicate "determined," only one undetermined bitmap within the synchronous bitmaps BMA and BMB is selected. When this condition B12 is established, normally, of the two synchronous bitmaps BMA and BMB, the bitmap of the same generation as the consistent volume VOL1-R is determined. Meanwhile, the other synchronous bitmap is undetermined, and furthermore, stores a history of one newer generation than that of the consistent volume VOL1-R. Therefore, the secondary copy module 240L is able to specify the differential data by using this undetermined synchronous bitmap.

(3) Condition B13:

When the status information 280R does not indicate "copy all" and does indicate "undetermined," both the synchronous bitmaps BMA and BMB are selected. When this condition B13 is established, normally, the same as with the condition B2 shown in FIG. 25(B), the generation of both the synchronous bitmaps BMA and BMB is newer than the generation of the consistent volume (backup volume VOL2-R). Therefore, the secondary copy module 240L is able to specify the differential data using the bitmap obtained by the OR operation of the two bitmaps BMA and BMB.

As described above, with the fifth embodiment, in contrast to the example shown in FIG. 7, the third bitmap BMC is omitted. Furthermore, to store the information relating to the status of the asynchronous copy destination volume VOL1-R in the asynchronous secondary device 200R, the copy module 232P sends to the asynchronous secondary device 200R write requests including simple data (status information 280R) instead of various instructions (for example, notification that indicates request to set the pair status of the step P150 of FIG. 11). Therefore, while trying to simplify the functions of the asynchronous secondary device 200R, it is possible to do secondary copy processing using the volume having host consistency.

F. Sixth Embodiment

Figure 41:
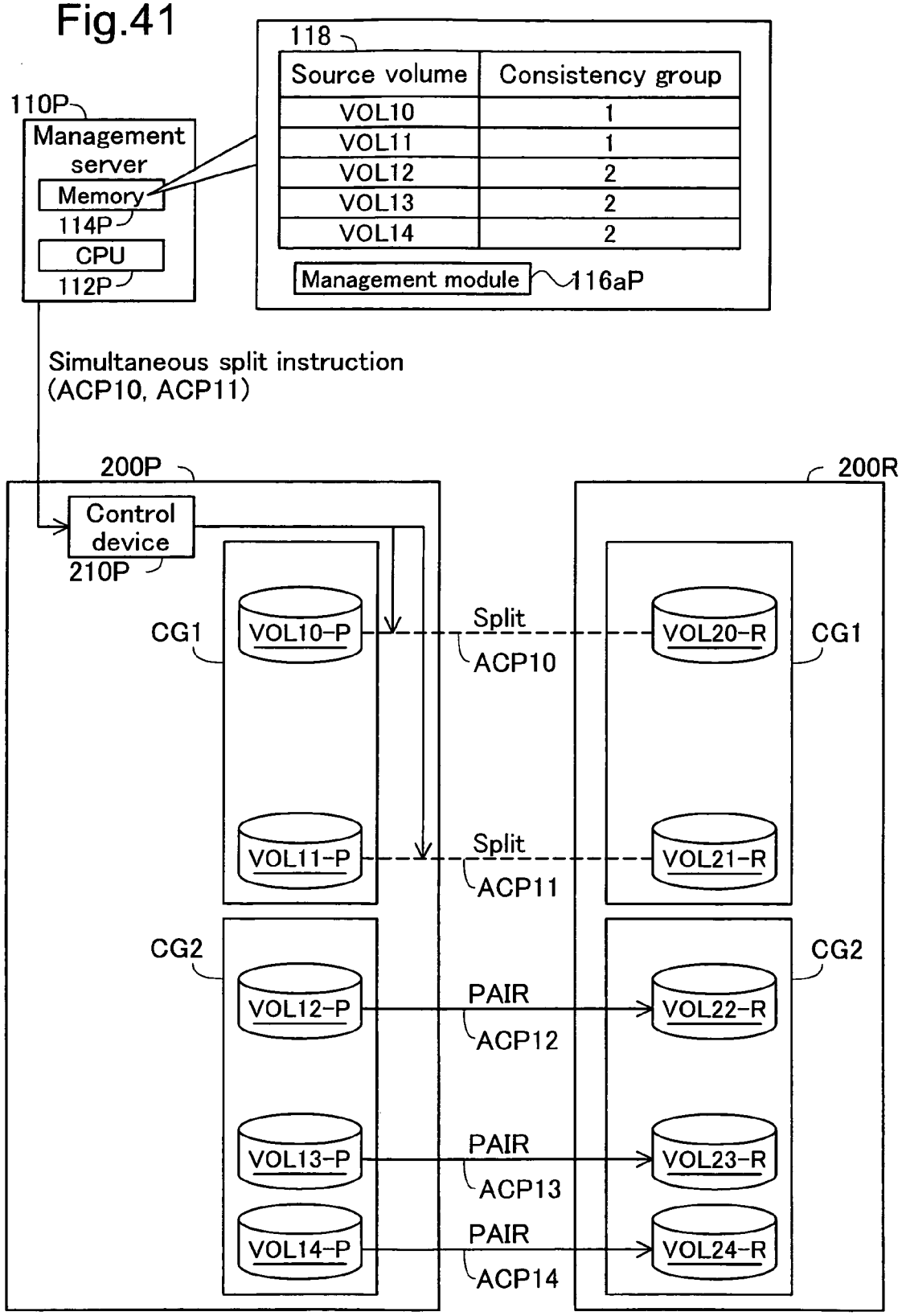
FIG. 41 is an explanatory drawing showing the constitution of the data processing system 10c for the sixth embodiment.

FIG. 41 is an explanatory drawing showing the constitution of the data processing system 10c for the sixth embodiment. The difference from the embodiments described above is that consistency groups CG1 and CG2 are set. Here, the consistency groups are groups of a plurality of copy pairs for which data write processing control is managed with a common generation. With this embodiment, the shift to split status is performed simultaneously for a plurality of copy pairs included in one consistency group. To say this another way, generation switching is performed simultaneously for this plurality of copy pairs. Also, a common generation number is used for the plurality of copy pairs of one consistency group.

The memory 114P of the management server 110P stores the management module 116aP and the consistency group information 118. The consistency group information 118 determines the correlation between the asynchronous copy source volume identifier and the group number. With the example in FIG. 41, two volumes VOL10-P and VOL11-P (two asynchronous copy pairs ACP10 and ACP11) constitute first group CG1 and the three volumes VOL12-P, VOL13-P, and VOL14-P (three asynchronous copy pairs ACP12, ACP13, and ACP14) constitute the second group CG2. Note that the plurality of source volumes VOL10-P to VOL14-P constituting the copy pairs ACP10 to ACP14 are specified by mutually different identifiers. The same is also true for the plurality of destination volumes VOL20-R to VOL24-R. Also, the other constitution of the data processing system 10c is the same (not illustrated) as the embodiments described above (e.g., the data processing system 10a in FIG. 7 and the data processing system 10b in FIG. 36).

Figure 42:
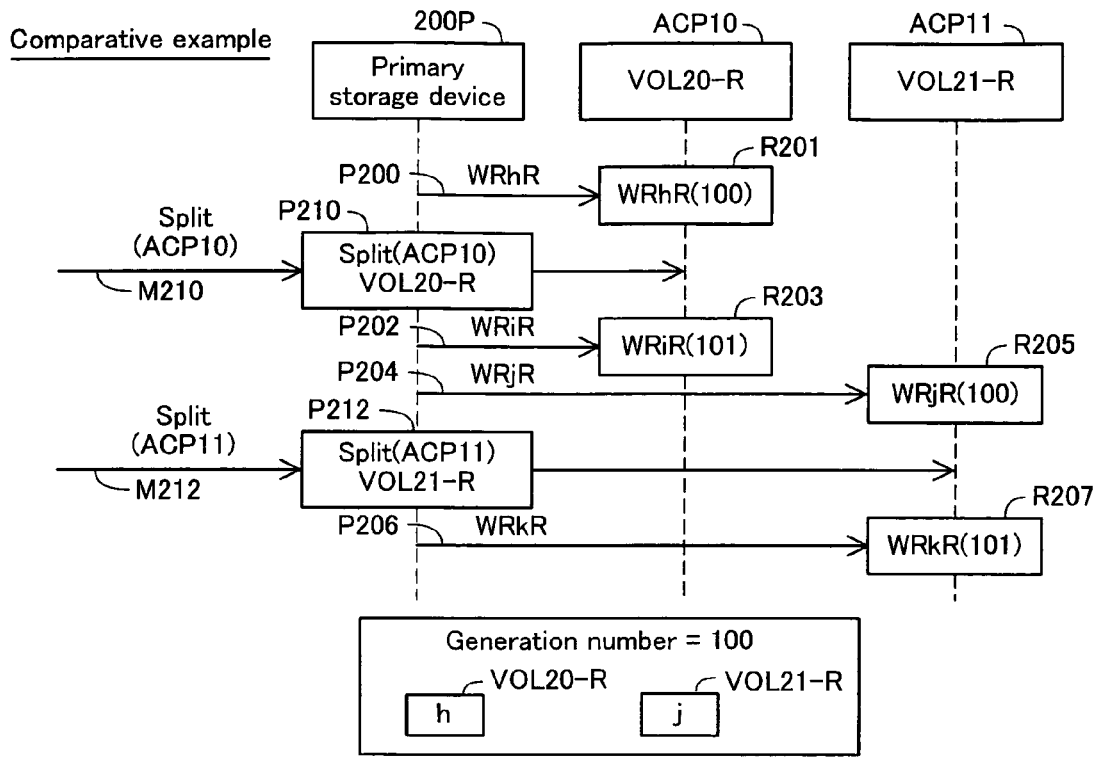
FIG. 42 is a sequence drawing showing the comparative example of the data write process.

FIG. 42 is a sequence drawing showing a comparative example of data write processing. This sequence drawing shows part of the data write process by the data processing system 10c, and shows the part executed by the split of the two asynchronous copy pairs ACP10 and ACP11. With this comparative example, the splitting of the two asynchronous copy pairs ACP10 and ACP11 is executed at different times. Note that the processing other than the split is the same as the embodiments described above (e.g. the examples in FIG. 10 and FIG. 11 or in FIG. 26, FIG. 27, and FIG. 28). Furthermore, it is assumed that the volume generation is switched from 100 to 101 by this split.

With the example in FIG. 42, the primary device 200P receives the four host requests WRh to WRk in that sequence, and sends to the asynchronous secondary device 200R the asynchronous copy requests WRhR to WRkR according to each request (P200, P202, P204, and P206). The asynchronous secondary device 200R executes the write processing according to the requests (R201, R203, R205, and R207).

Here, the subject of the first two copy requests WRhR and WRiR is the volume VOL20-R (asynchronous copy pair ACP10), and the subject of the latter two copy requests WRjR and WRkR is the volume VOL21-R (asynchronous copy pair ACP11). The reason that the subject volumes are different is that the subject of the first two host requests WRh and WRi is the volume VOL10-P (FIG. 41), and the subject of the latter two host requests WRj and WRk is the volume VOL11-P. Furthermore, it is assumed that changing of the write sequence of these host requests WRh to WRk is prohibited. The prohibition of the write sequence occurs, for example, when a plurality of host requests are destined to a plurality of volumes which constitute a single database, or when a plurality of host requests are destined to a plurality of volumes which constitute a single data file.

The management module 116aP (FIG. 41) references the consistency group information 118, and sends to the primary device 200P the split instructions of all the asynchronous copy pairs (ACP10, ACP11) included in the first consistency group CG1. However, with this comparative example, the split instructions of each copy pair are sent at different times to each other (M210, M212). The primary device 200P executes the split (P210) of the asynchronous copy pair ACP10 between steps P200 and P202. Furthermore, the primary device 200P executes the split (P212) of the asynchronous copy pair ACP11 between steps P204 and P206. The generation switches from 100 to 101 with these splits. The numbers in the parentheses added to the write processes of FIG. 42 (R201, R203, R205, R207) indicate the generation numbers.

Here, when a problem occurs with the primary device 200P, by using the asynchronous secondary device 200R, data processing restarts. However, in the two volumes VOL20-R and VOL21-R (or the backup volumes of these) in which all the requests of generation number 100 are reflected do not have the prior host data i stored, but rather have the latter host data j stored. Specifically, the whole of these volumes VOL20-R and VOL21-R (or the backup volumes of these) do not have host consistency. As a result, a problem occurs with restarting of the data processing using the asynchronous secondary device 200R.

Figure 43:
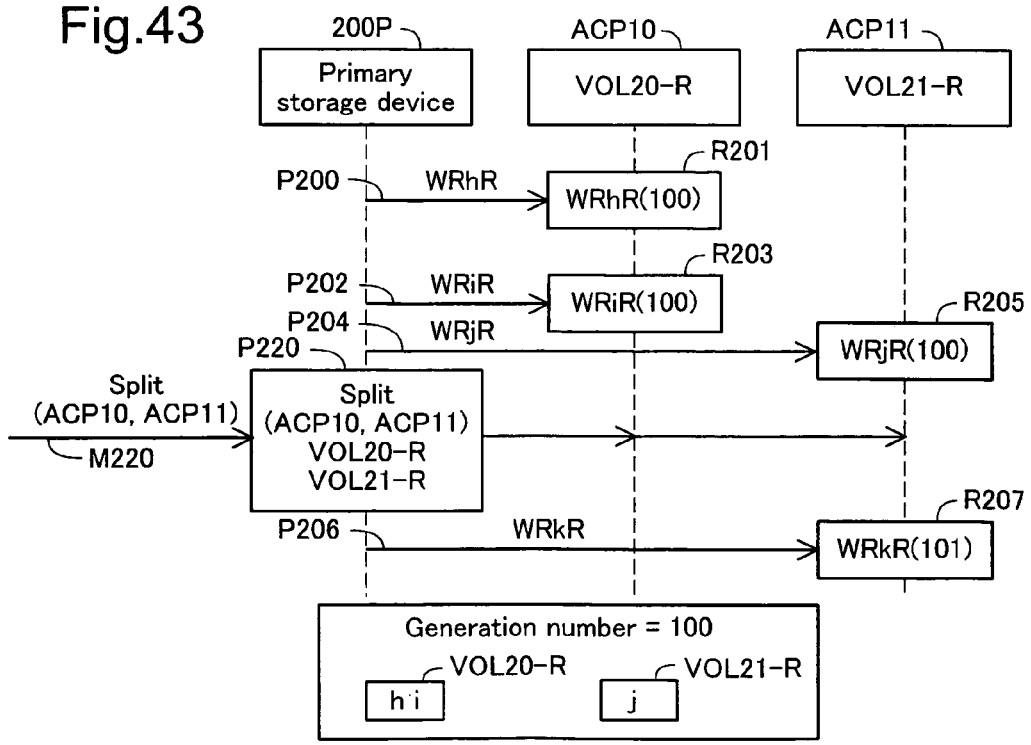
FIG. 43 is a sequence drawing showing the data write process for the sixth embodiment.

FIG. 43 is a sequence drawing showing the data write process for the sixth embodiment. The difference from the comparative example of FIG. 42 is that the splits of the two asynchronous copy pairs ACP10 and ACP11 are performed at the same time. The data write process executed for each of the copy pairs ACP10 and ACP11 is the same as each of the embodiments described above (e.g. the example in FIG. 10 and FIG. 11 or in FIG. 26, FIG., 27, and FIG. 28) for the part other than the split timing. The management module 116aP (FIG. 41) sends (M220) to the primary device 200P instructions to simultaneously execute the split of the first consistency group CG1 (asynchronous copy pairs ACP10 and ACP11). The primary device 200P executes splitting simultaneously (P220) according to the instructions. With the example in FIG. 43, the primary device 200P executes the split between steps P204 and P206. As a result, the two volumes VL20-R and VOL21-R (or the backup volumes of these) for which all the requests of generation number 100 are reflected store the host data h, i, and j. The entirety of these volumes VOL20-R and VOL21-R (or the backup volumes of these) have host consistency. This is also the same in cases when the split is performed at another time. This is also the same when the subject volume of each host request is different from the example in FIG. 43.

As described above, with the fifth embodiment, the management module 116aP sends to the primary device 200P the instruction to split simultaneously for the plurality of copy pairs included in one consistency group. The primary device 200P executes splitting (generation updating) of these plurality of pairs at the same time according to this instruction. As a result, even when a plurality of host data for which changing of the write sequence is not allowed are stored divided into a plurality of volumes, for the entirety of the volumes or the entirety of the backup volumes after splitting, it is possible to prevent the host data write sequence from being changed across the generation. This is also the same when the number of copy pairs is three or more included in one consistency group.

G. Seventh Embodiment

Figure 44:
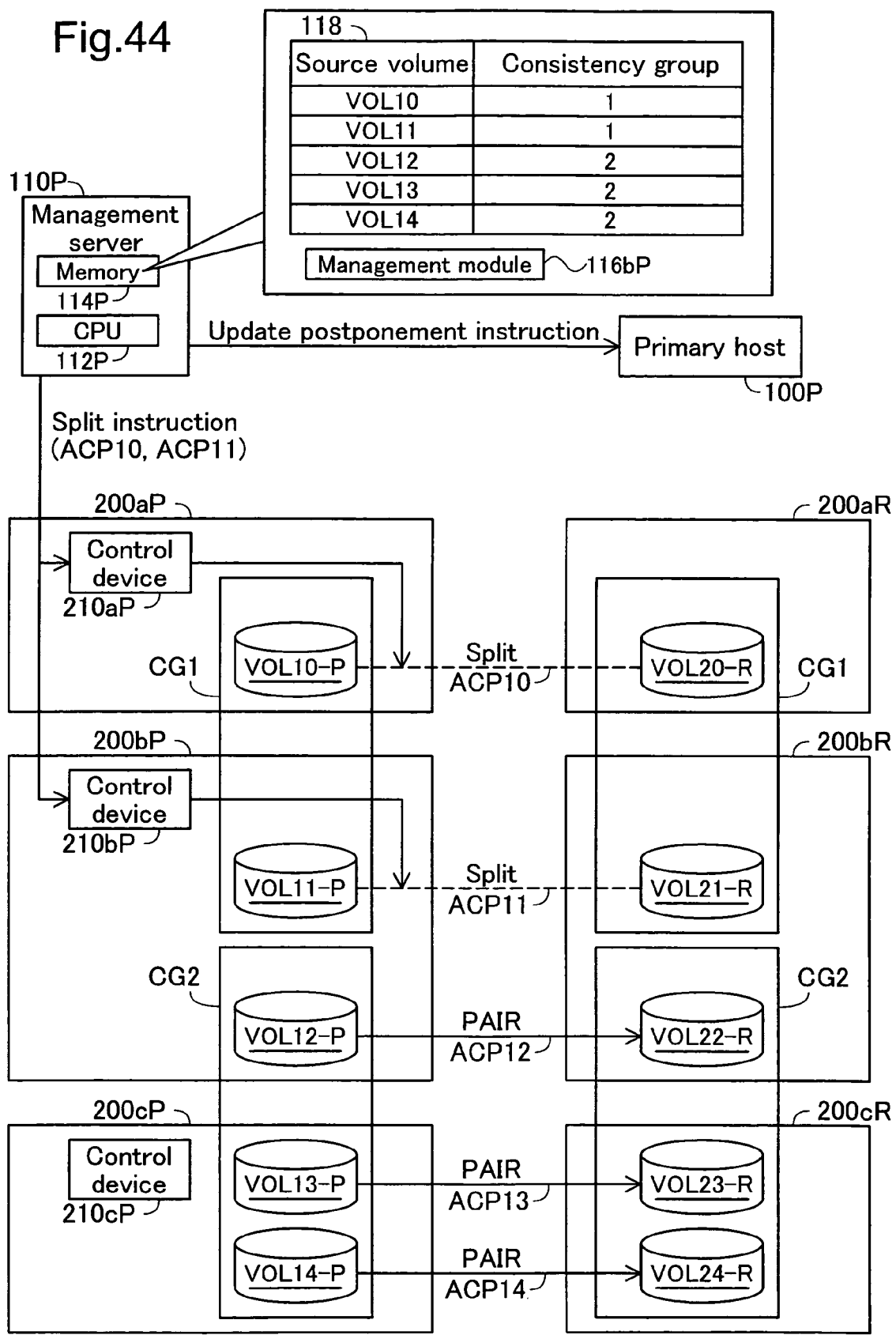
FIG. 44 is an explanatory drawing showing the constitution of the data processing system 10d for the seventh embodiment.

FIG. 44 is an explanatory drawing showing the constitution of the data processing system 10d for the seventh embodiment. The difference from the data processing system 10c shown in FIG. 41 is that the plurality of asynchronous copy pairs of one consistency group is provided divided into the plurality of primary devices 200P and asynchronous secondary devices 200R. This data processing system 10d has a plurality of primary devices 200aP to 200cP and a plurality of asynchronous secondary devices 200aR to 200cR. Regarding the first consistency group CG1, the first asynchronous copy pair ACP10 is formed using the first primary device 200aP and the first asynchronous secondary device 200aR, and the second asynchronous copy pair ACP11 is formed using the second primary device 200b and the second asynchronous secondary device 200bR. For the second consistency group CG2, similarly, the asynchronous copy pair ACP12 is formed using the second primary device 200bP and the second asynchronous secondary device 200bR, and the asynchronous copy pair ACP13 and ACP14 are formed using the third primary device 200cP and the third asynchronous secondary device 200cR. Note that the constitution of each primary device 200aP to 200cP is the same as the constitution of the primary device 200P shown in FIG. 7, and the constitution of each asynchronous secondary device 200aR to 200cR is the same as the constitution of the asynchronous secondary device 200R shown in FIG. 7. The other constitution of the data processing system 10d is the same as that of the data processing system 10a of FIG. 7 (illustration omitted).

Figure 45:
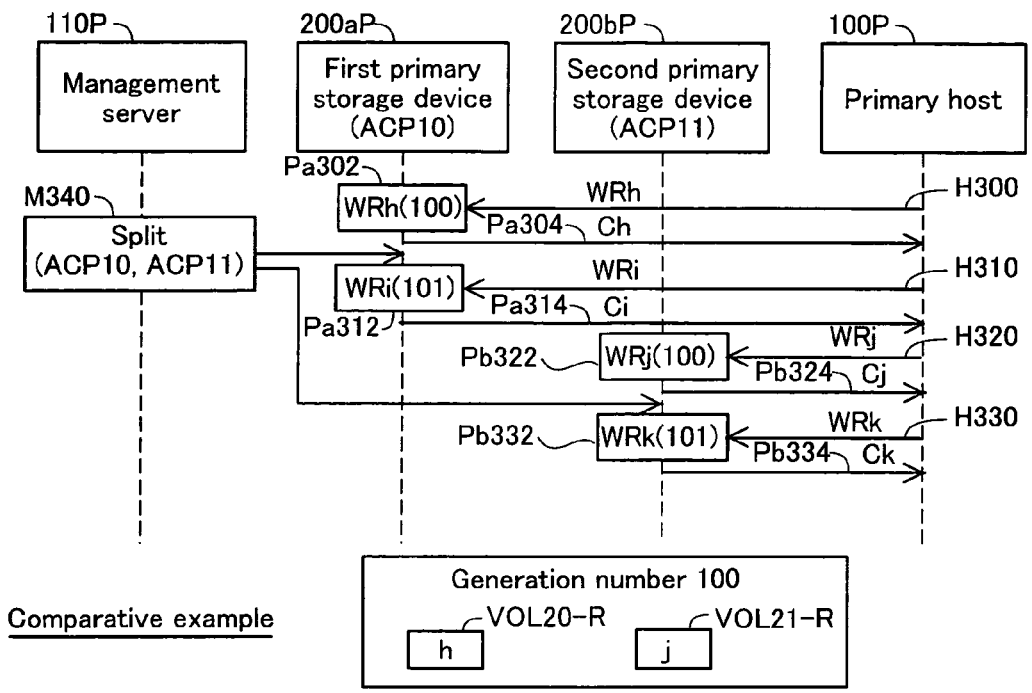
FIG. 45 is a sequence drawing showing the comparative example of the data write process.

FIG. 45 is a sequence drawing showing a comparative example of the data write process. This sequence drawing shows part of the data write process by the data processing system 10d, and shows the part for which the split of the two asynchronous copy pairs ACP10 and ACP11 is executed. Note that the data write process executed for each copy pair ACP10 and ACP11 is the same as the example in FIG. 10 and FIG. 11. Furthermore, it is assumed that the generation of the volume is switched from 100 to 101 by this split.

The primary host 100P sends the four hosts requests WRh to WRk that are the same as the example in FIG. 42 in this sequence (H300, H310, H320, and H330). However, the sending destination of the prior two requests WRh and WRi is the first primary device 200aP, and the sending destination of the latter two requests WRj and WRk is the second primary device 200bP. Each primary device 200aP and 200bP execute the write process (Pa302, Pa312, Pb322, Pb332) according to the received requests, and sends to the primary host 100P a completion notification (Pa304, Pa314, Pb324, and Pb334).

The management module 116bP (FIG. 44) sends the split instructions (M340) simultaneously to the two primary device 200aP and 200bP (control device 210aP and 210bP). However, each primary device 200aP and 200bP receive split instructions at mutually different times. This is because the communication path with the management server 110P is different for each primary device 200aP and 200bP. As a result, the splits of each asynchronous copy pair ACP10 and ACP11 are executed at mutually different times. With the example of FIG. 45, the first primary device 200aP executes the split between steps Pa304 and Pa312. Meanwhile, the second primary device 200bP executes the split between steps Pb324 and Pb332. The number in the parentheses attached to the write process (Pa302, Pa312, Pb322, Pb332) of FIG. 45 indicates the generation number.

Here, the data processing is restarted by using the asynchronous secondary devices 200aR and 200bR. However, the same as with the comparative example in FIG. 42, the entirety of the two volumes VOL20-R and VOL21-R (or the backup volumes) does not have host consistency, so a problem occurs with restarting of the data process using the asynchronous secondary devices 200aR and 200bR.

Figure 46:
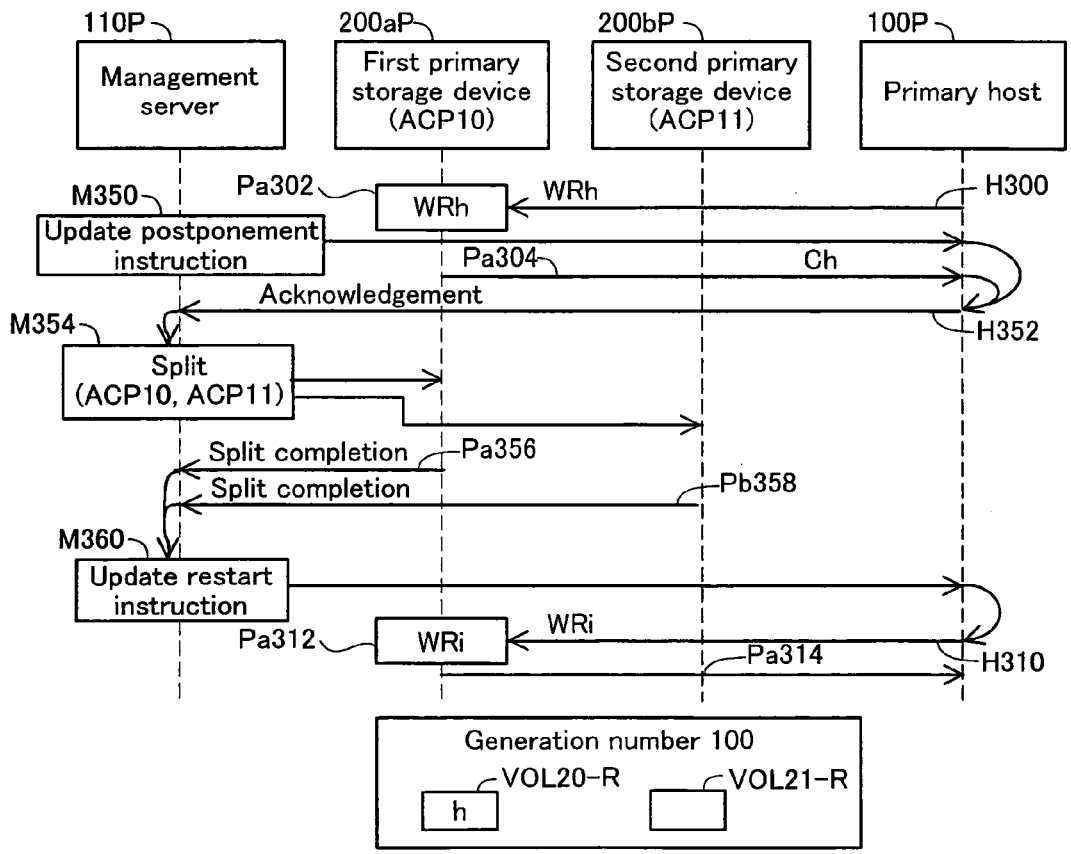
FIG. 46 is a sequence drawing showing the data write process for the seventh embodiment.

FIG. 46 is a sequence drawing showing the data write process for the seventh embodiment. The difference with the comparative example of FIG. 45 is that the management module 116bP (FIG. 44) sends split instructions to the two primary devices 200aP and 200bP during the time in which the data update is postponed by the primary host 100P. The four host requests WRh to WRk are the same as the example in FIG. 45. In specific terms, first, the management server 110P (management module 116bP) sends an instruction for postponing the new data update to the primary host 100P (M350) before sending the split instruction. When this is done, the primary host 100P sends an acknowledgement of the instruction for postponing to the management server 110P (H352) after receiving from the primary devices 200aP, 200bP the completion notifications of all the host requests already sent. With the example in FIG. 46, the primary host 100P receives the postponement instruction after sending of the host request WRh (H300). Therefore, the primary host 100P sends the acknowledgement to the management server 110P (H352) after receiving the completion notification Ch of this request WRh. Thereafter, the primary host 100P postpones the sending of the new host request.

Next, the management server 110P (management module 116bP) sends split instructions (M354) to the two primary devices 200aP and 200bP responsive to receiving of the acknowledgement of the instruction for postponing from the primary host 100P. By doing this, each primary device 200aP and 200bP respectively executes the split according to instructions, and sends the split completion notification to the management server 110P (Pa356, Pb358). The copy module 232P of each primary device 200aP and 200bP, respectively, sends these completion notifications responsive to the generation update and to the receiving of the completion notification of all the copy requests of the asynchronous copy of the generation before the update.

The management server 110P sends to the primary host 100P (M360) instructions for restarting the new data update responsive to receiving the split completion notification from the two primary devices 200aP and 200bP. The primary host 100P sends the next host request WRi (H310) responsive to receiving this instruction. Thereafter, the data processing system 10d executes processing according to each host request WRi, WRj, and WRk (the illustration is omitted for the requests WRj and WRk).

As described above, with the seventh embodiment, the management module 116bP sends instructions for postponing the new data update to the primary host 100P. Then, the management module 116bP sends the split instructions for all the copy pairs included in one consistency group to all the primary storage devices (200aP and 200bP, in specific terms, all the control devices (210aP and 210bP)) which control the pair status of each copy pair during postponing of the data update by the primary host 100P. As a result, even in cases when a plurality of host data for in-order write are stored in a plurality of volumes whose pair status are controlled by different control devices respectively, it is possible to prevent the host data write sequence from being changed across the generation for the whole of the volumes or the whole of the backup volumes after splitting (here, the plurality of host data for in-order write means the plurality of host data for which changing of the write sequence is not allowed). This is also the same in cases when the number of those primary storage devices (control devices) is three or more which controls each pair status of the plurality of copy pairs contained in one consistency group. Also, this aspect of this embodiment can also be applied to the example in FIG. 26, FIG. 27, and FIG. 28 or in FIG. 35 and FIG. 36.

H. Eighth Embodiment

Figure 47:
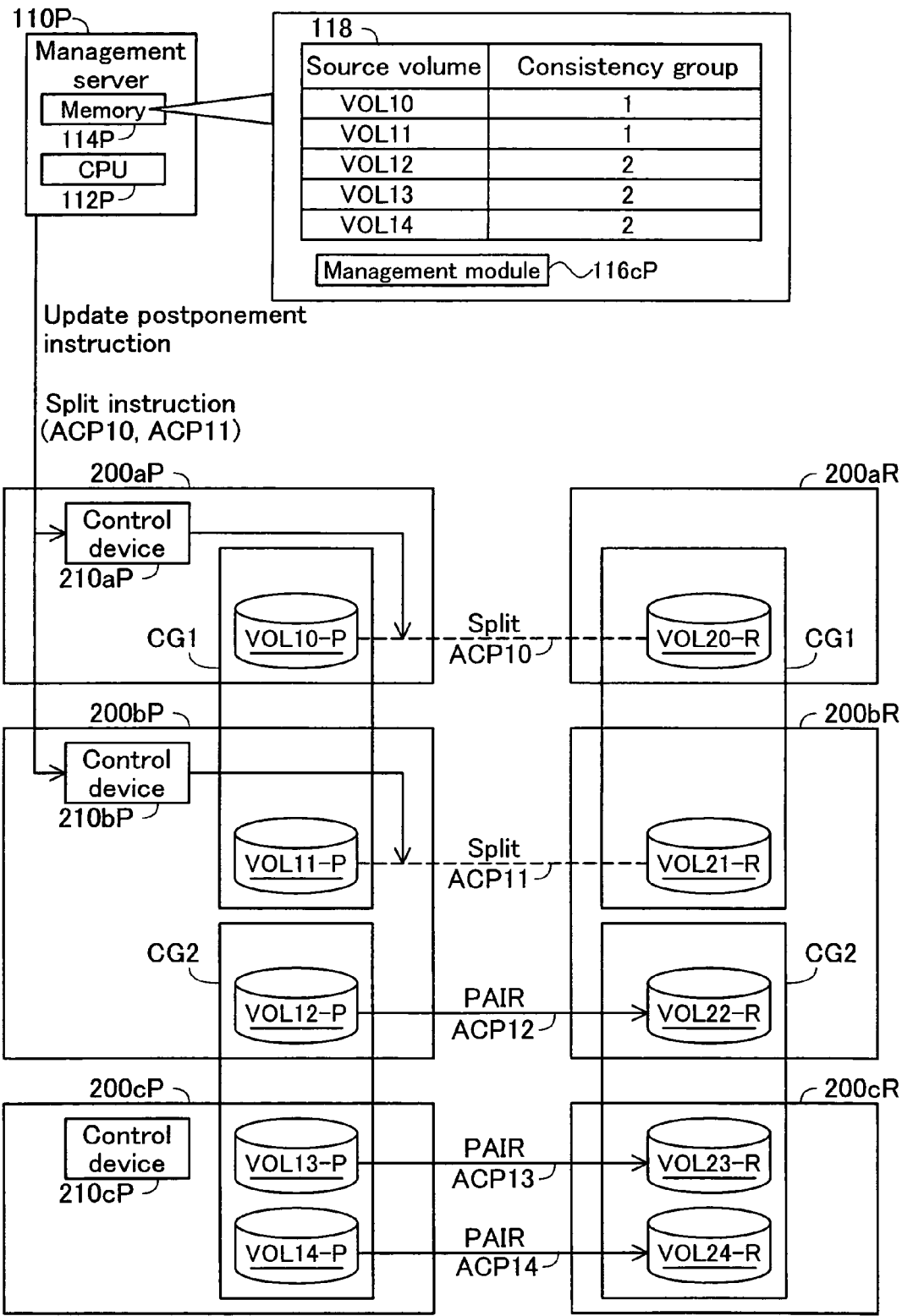
FIG. 47 is an explanatory drawing showing the constitution of the data processing system 10e for the eighth embodiment.

FIG. 47 is an explanatory drawing showing the constitution of the data processing system 10e for the eighth embodiment. The difference with the data processing system 10d shown in FIG. 44 is only that the management module 116cP sends the update postponement instructions to each primary device 200P instead of to the primary host 100P. The other constitution is the same as that of the data processing system 10d shown in FIG. 44.

Figure 48:
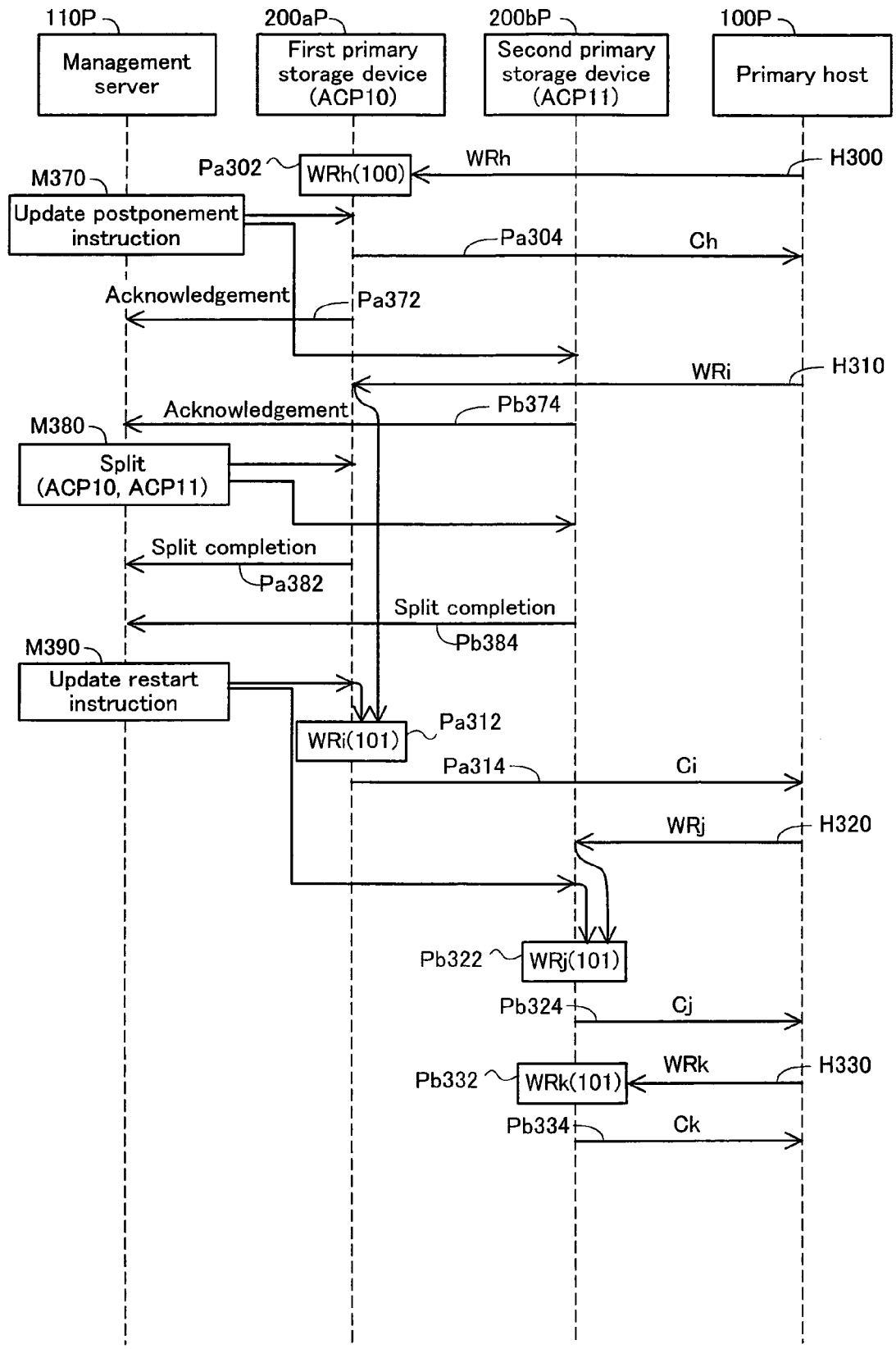
FIG. 48 is a sequence drawing showing the data write process for the eighth embodiment.

FIG. 48 is a sequence drawing showing the data write process for the eighth embodiment. The difference from the example shown in FIG. 46 is that the split instructions are sent to each primary device 200aP and 200bP during postponement of the data update by each primary device 200aP and 200bP. The four host requests WRh to WRk (H300 to H330) and the processes (Pa302 to Pa314 and Pb322 to Pb334) of each primary device 200aP and 200bP according to these requests are the same as those in the example in FIG. 45 and FIG. 46.

First, the management server 110P (management module 116cP) sends instructions for postponing new data updates to the two primary devices 200aP and 200bP (M370). Each of the primary devices 200aP and 200bP sends an acknowledgement of the instructions for postponing to the management server 110P (Pa372, Pb374) after issuing a completion notification of all the host requests which have already been received. With the example in FIG. 48, the first primary device 200aP receives the postponement instructions after receiving the host request WRh (Pa302). Therefore, the first primary device 200aP sends the acknowledgement to the management server 110P (Pa372) after sending the completion notification Ch of this request WRh (Pa304). Thereafter, each primary device 200aP and 200bP postpones the write process without executing the write process even when a new host request is received. For example, with the example in FIG. 48, the first primary device 200aP receives the host request WRi after sending of the acknowledgement (Pa372). However, the first primary device 200aP executes the process according to this request later (described later).

Next, the management server 110P (management module 116cP) sends split instructions (M380) to each primary device 200aP and 200bP responsive to receiving the acknowledgement of the instructions for postponing from each primary device 200aP and 200bP. By dong this, each primary device 200aP and 200bP, the same as with the example in FIG. 46, executes the splitting according to the respective instructions, and sends the split completion notification to the management server 110P (Pa382, Pb384). The management server 110P sends the instruction to restart new data updating to each primary device 200aP and 200bP (M390) responsive to receiving the split completion notification from the two primary devices 200aP and 200bP. Each primary device 200aP and 200bP starts execution of processing according to the new host request responsive to receiving this instruction. For example, with the example in FIG. 48, the first primary device 200aP executes the write process (Pa312) according to the postponed request WRi responsive to receiving the restart instruction. Thereafter, the data processing system 10e executes processing according to the requests WRj and WRk.

As described above, with the eighth embodiment, the management module 116cP sends instructions for postponing the new data update to all the primary storage devices (200aP and 200bP, in specific terms, all the control devices (210aP and 210bP)) for controlling the pair status of each copy pair of all the copy pairs included in one consistency group. Then, the management module 116cP sends to all of these primary storage devices the split instructions for all the copy pairs included in one consistency group during postponement of data update by all of these primary devices. As a result, even in cases when a plurality of host data for in-order write are stored in a plurality of volumes whose pair status are controlled by different control devices respectively, it is possible to prevent the host data write sequence from changing across the generation for the whole of the volumes or the whole of the backup volumes after splitting. This is also the same in cases when the number of those primary storage devices (control devices) is three or more which controls each pair status of the plurality of copy pairs contained in one consistency group. Also, this aspect of this embodiment can also be applied to the example in FIG. 26, FIG. 27, and FIG. 28 or in FIG. 35 and FIG. 36.

I. Variation Examples

Note that within the structural elements for each of the embodiments noted above, the elements other than the elements claimed in independent claims are additional elements, and can be suitably omitted. Also, this invention is not limited to the embodiments or aspects noted above, but can be implemented with various aspects within a scope that does not stray from its key points, and variations such as the following are possible, for example.

Variation Example 1

With the embodiments noted above, it is possible to use various conditions as the condition for selecting the bitmap to be used with the secondary copy processing. For example, instead of the condition shown in FIG. 25(B), it is possible to use any conditions for selecting as the differential bitmap a bitmap of a newer generation than the generation of the consistency volume within the two synchronous bitmaps BMA and BMB. Note that with the example in FIG. 25(B), this kind of differential bitmap is selected based on the generation of the asynchronous bitmap BMC. Therefore, the generation of the asynchronous bitmap BMC corresponds to the "backup generation information" for the present invention.

Here, the secondary copy module 240L (FIG. 7) may also fetch the generation of the backup volume VOL2-R from the backup module 242R. As a method for the backup module 242R to specify the generation of the backup volume VOL2-R, various methods can be used. For example, it is possible to use a method of specifying based on the asynchronous bitmap BMC generation and on the progress status of the backup process. In specific terms, before the update recorded in the asynchronous bitmap BMC is reflected in the backup volume VOL2-R by the backup process, the generation of the backup volume VOL2-R is the generation one prior to the generation of the asynchronous bitmap BMC. Meanwhile, after reflection, the generation of the backup volume VOL2-R is the same as the generation of the asynchronous bitmap BMC. Also, the same as with the copy (write) request shown in FIG. 12, the primary device 200P may also send a copy request to which the generation number GNo is added to the asynchronous secondary device 200R. In this way, the backup module 242R is able to execute specification based on the generation number GNo contained in the copy request and the progress status of the backup process.

Variation Example 2

For the condition shown in FIG. 25(A), the fact that the pair status of the asynchronous copy pair CP2 (VOL1-R) is "split" means that there is establishment of the first timing condition representing that the point of execution of the secondary copy process is during the time from after the completion notification is issued for all the asynchronous copy requests of the old generation until starting of sending the asynchronous copy requests of the new generation. Also, the fact that the pair status of the backup copy pair BCP (VOL2-R) is "split" means that there is establishment of the second timing condition representing that the point of execution of the secondary copy process is during the time from after the backup completion notification is issued until the start of the new backup process. In this way, the pair status of the asynchronous copy pair CP2 and the pair status of the backup copy pair BCP correspond to the "timing condition information." However, with each of the embodiments noted above, normally, when the pair status of the asynchronous copy pair CP2 (VOL1-R) is "not split," the pair status of the backup copy pair BCP (VOL2-R) is "split." Therefore, the secondary copy module 240L is able to judge that the second timing condition is established according to the fact that the pair status of the asynchronous copy pair CP2 is "not split" without using the pair status of the backup copy pair BCP.

For the conditions shown in FIG. 40(A), the fact that the status information 280R indicated "determined" means that there is establishment of the first timing condition representing that the point of execution of the secondary copy process is during the time from after the completion notification is issued for all the synchronous copy requests of the old generation until the start of sending the asynchronous copy requests of the new generation. Also, with the embodiments noted above, normally, when the status information 280R does not indicate "determined," specifically, when the status information 280R indicates "undetermined," the pair status of the backup copy pair BCP is "split." Therefore, the secondary copy module 240L is able to judge that the second timing condition is established according to the fact that the status information 280R is "undetermined" without using the pair status of the backup copy pair BCP (VOL2-R).

Variation Example 3

For the embodiments shown in FIG. 41, FIG. 44, and FIG. 47, it is possible to use various constitutions as the constitution of the synchronous copy destination volume. For example, the plurality of synchronous copy destination volumes (not illustrated) respectively correlated to the source volumes VOL10-P to VOL14-P may also be provided to one unit of the synchronous secondary device 200L. Instead of this, it is also possible for the plurality of destination volumes to be provided divided into a plurality of storage devices. In any case, it is preferable that the respective plurality of destination volumes be specified by mutually different identifiers (device identifiers and volume identifiers). The same is also true for the constitution of the asynchronous copy destination volumes.

Variation Example 4

With each of the embodiments noted above, as a device for sending instructions to a storage device 200 according to the operating status of any of the other storage devices 200, this is not limited to the management server 110P, and it is possible to use various devices. For example, it is possible to have each of the storage devices 200 mutually send instructions to the other storage devices 200 according to its own operation status. In specific terms, the primary device 200P may send the resynchronization (backup) instructions (FIG. 11, M136) to the asynchronous secondary device 200R responsive to receiving the completion notification of all the old generation copy requests based on the asynchronous copy (e.g. FIG. 10, R131) from the asynchronous secondary device 200R. Furthermore, responsive to the completion of the backup process (FIG. 11, R138), the asynchronous secondary device 200R may send the resynchronization instructions (FIG. 11, M144) to the primary device 200P. Also, the control device 210 of any of the storage devices 200 may have the function of the management server 110P.

Variation Example 5

For each of the embodiments noted above, the synchronous secondary device 200L (e.g. the history creation module 238L, FIG. 7) may use various methods as the method of judging whether or not the completion notification has been issued for all the synchronous copy request of a certain generation. For example, it is possible to have the copy module 232P send to the synchronous secondary device 200L the total number of host request of a certain generation. The history creation module 238L is able to judged that all the completion notification of that generation have been issued when the total number of the completion notification of the copy requests of that generation is the same as the total number of host requests of the same generation.

Similarly, it is possible to use various methods as the method for the asynchronous secondary device 200R (e.g. backup module 242R, FIG. 7) to judge whether or not the completion notification of all the asynchronous copy requests of a certain generation have been issued. For example, the same as with the synchronous secondary device 200L, the asynchronous secondary device 200R may also receive copy requests to which the generation number GNo (FIG. 12) has been added. In this way, the asynchronous secondary device 200R is able to judge in the same way as the synchronous secondary device 200L. Also, in this case, the history creation module 238R is able to set the generation of the third bitmap BMC by referencing the generation number GNo added to the copy request.

Variation Example 6

For each of the embodiments noted above, the asynchronous secondary device 200R, the same as with the synchronous secondary device 200L, may also receive copy requests to which are added a sequence number SNo (FIG. 12). Furthermore, it is also possible for the asynchronous secondary device 200R to execute the write processing according to requests in the sequence of this sequence number SNo. In this way, the asynchronous copy destination volume VOL1-R always has host consistency. Therefore, it is possible to omit the backup volume VOL2-R and the backup module 242R. However, as with each of the embodiments noted above, the asynchronous secondary device 200R may write the data of each request to the volume VOL1-R in the sequence in which the copy requests are received. In this way, it is possible to use a simple constitution of the asynchronous secondary device 200R. These are also the same for the synchronous secondary device 200L.

Variation Example 7

For each of the embodiments noted above, the secondary copy module 240L, the same as with the copy module 232, preferably has the instruction module and the access module for executing data copying. In this way, it is possible to reduce the effort by the user required for setting the copy destination storage area of the secondary copy process.

Variation Example 8

For each of the embodiments noted above, it is also possible to replace with hardware the parts of the constitution realized using software, and conversely, to replace with hardware the parts of the constitution realized using hardware. For example, the functions of the read/write module 235 (FIG. 2) may be realized by a hardware circuit having logic circuits.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A storage system for providing a host computer with a data storage area, comprising:
   a primary storage device connected to the host computer and having a primary storage area for the host computer;
   a first secondary storage device connected to the primary storage device and having a first secondary storage area; and
   a second secondary storage device connected to the primary storage device and having a second secondary storage area,
   the primary storage device comprising:
      a virtualization unit configured to set a correlation between the second secondary storage area and a virtual identifier used to identify the second secondary storage area as a virtual storage area within the primary storage device;
      a primary writing unit configured to execute a primary write process, the primary write process including a process of receiving from the host computer a host request which is a data write request of host data, and a process of writing the host data to the primary storage area; and a copy control unit configured to send a first and second copy request to the first and second secondary storage devices, respectively, to store copy data in the first and second secondary storage areas, the copy data being a copy of the host data, the first and second copy request containing the copy data, wherein the copy control unit, regardless of whether or not receiving a completion notification of the second copy request from the second secondary storage device, sends a completion notification of the host request to the host computer responsive to receiving a completion notification of the first copy request from the first secondary storage device, and the copy control unit identifies the second secondary storage area using the virtual identifier in the second copy request;

wherein the copy control unit comprises:

a copy instruction unit configured to create the first and second copy request, the copy instruction unit creating the second copy request identifying the second secondary storage area using the virtual identifier; and an access control unit configured to send the first and second copy requests to the first and second secondary storage devices, respectively, wherein, the access control unit, by referencing the correlation set by the virtualization unit, replaces the virtual identifier within the second copy request with an actual identifier of the second secondary storage area, and sends the second copy request after the replacement to the second secondary storage device.

2. A storage system recited in claim 1, wherein the first secondary storage device and the second secondary storage device are connected to each other, and the primary storage device further comprises:

a generation setting unit configured to allocate a generation to the host request and to update the generation according to specified conditions, the generation representing a time range in which the primary write process is executed; and a generation information sending unit configured to send first generation information to the first secondary storage device, the first generation information representing the generation of the host request that is a source of the first copy request, the first secondary storage device further comprises:

a first history creation unit configured to create first history information for each generation of host requests which are sources of the first copy requests by using the first generation information, the first history information representing a write history according to the first copy requests; and a secondary copy unit configured to execute a secondary copy process of copying data between a storage area within the first secondary storage device and a storage area within the second secondary storage device to match data stored in each storage area which is a subject of the copying, wherein, responsive to generation update by the generation setting unit, the copy control unit postpones sending of the second copy request corresponding to the host request belonging to a new generation, and sends to the second secondary storage device all the second copy requests corresponding to the host requests belonging to the old generation which is one generation previous to the new generation, and the secondary copy unit has a first secondary copy mode including:

specifying a different part where data is different between the first secondary storage area and the second secondary storage area by using only the newest first history information representing the history of the new generation; and copying only differential data to match data respectively stored in the first secondary storage area and the second secondary storage area, the differential data being data of the different part.

3. A storage system recited in claim 2, wherein the second secondary storage device further comprises:

a backup storage area; and a backup copy unit configured to copy data stored in the second secondary storage area into the backup storage area to backup the second secondary storage area in the backup storage area, wherein, the backup copy unit executes the backup after completion notification is issued of all the second copy requests corresponding to the old generation, and sends backup completion notification to the an external device, the copy control unit starts sending the second copy requests corresponding to the new generation after the backup completion notification is issued, the secondary copy unit has a second secondary copy mode including:

specifying a different part where data is different between the first secondary storage area and the backup storage area by using history information including at least the newest first history information out of the newest first history information and old first history information representing the history of the generation just one older than the newest first history information; and copying only differential data to match data respectively stored in the first secondary storage area and the backup storage area, the differential data being data of the different part.

4. A storage system recited in claim 3, wherein the backup copy unit is able to send backup generation information to the first secondary storage device responsive to a request, the backup generation information being related to the generation corresponding to the second copy request already reflected in the backup storage area, the secondary copy unit, for the second secondary copy mode, receives the backup generation information from the backup copy unit, and specifies the different part by using only history information whose generation is newer than the generation corresponding to the second copy request already reflected in the backup storage area selected from among the two first history information.

5. A storage system recited in claim 3, wherein when specified first mode conditions are established, the secondary copy unit executes the secondary copy process in the first secondary copy mode, the specified first mode conditions including a first timing condition representing that a point of execution of the secondary copy process is during time from after the completion notification is issued for all the second copy requests corresponding to the old generation and until the start of sending the second copy requests belonging to the new generation, and when specified second mode conditions are established, the secondary copy unit executes the secondary copy process in the second secondary copy mode, the specified second mode conditions including a second timing condition representing that a point of execution of the secondary copy process is during time from after the backup completion notification is issued and until the start of the new backup process.

6. A storage system recited in claim 5, wherein
the second secondary storage device further comprises
a second history creation unit configured to create second history information representing a write history according to the second copy requests,
the secondary copy unit has a third secondary copy mode including:
  selecting the second secondary storage area when the first timing condition is established;
  selecting the backup storage area when the second timing condition is established;
  specifying a different part where data is different between the selected storage area and the first secondary storage area by using at least the second history information; and
  copying only differential data to match data respectively stored in the selected storage area and the first secondary storage area, the differential data being data of the different part,
when the first mode conditions and the second mode conditions are not established, the secondary copy unit executes the secondary copy process in the third secondary copy mode.

7. A storage system recited in claim 5, wherein
the second secondary storage device has a status storage area configured to store area status information representing a status of the second secondary storage area,
the copy control unit executes
  sending a first status write request for the status storage area to the second secondary storage device responsive to issuing of all the completion notification for the second copy requests corresponding to the old generation, the first status write request including area status information representing that the first timing condition is established, and
  sending a second status write request for the status storage area to the second secondary storage device after sending the first status write request and before starting sending of the second copy request belonging to the new generation, the second status write request including area status information representing that the first timing condition is not established,
the secondary copy unit judges whether either the first timing condition and the second timing condition is established by referencing the area status information when executing the secondary copy process.

8. A storage system recited in claim 5, wherein
the copy control unit executes
  sending a first notification to the second secondary storage device after issuing of all the completion notification for the second copy requests corresponding to the old generation, the first notification representing that the first timing condition is established,
  sending a second notification to the second secondary storage device before starting sending of the second copy requests belonging to the new generation, the second notification representing that the first timing condition is not established,
the secondary copy unit, when executing the secondary copy process, makes a request to the second secondary storage device for timing condition information which is information relating to which of the first timing condition and the second timing condition is established,
the backup copy unit sends to the primary storage device the timing condition information based on the notification received last among the first notification and the second notification and on an execution status of the backup process.

9. A storage system recited in claim 2, wherein
the primary storage device has a plurality of primary storage areas identified by mutually different identifiers,
the plurality of primary storage areas constitutes a consistency group which are managed with a common generation,
the generation setting unit simultaneously updates the generation relating to the plurality of primary storage areas contained in the consistency group.

10. A storage system recited in claim 2, further comprising:
a plurality of the primary storage devices; and
a management device connected to the host computer and to each of the plurality of the primary storage devices,
wherein, the plurality of the primary storage devices have a plurality of the primary storage areas, respectively, which are identified by mutually different identifiers,
the plurality of the primary storage areas constitute a consistency group which are managed with a common generation,
the management device executes
  sending to the host computer an instruction for postponing sending of a new host request,
  responsive to receiving an acknowledgement of the postponing instruction from the host computer, sending instructions to update the generation relating to each of the primary storage areas included in the consistency group to the plurality of the primary storage devices, respectively, and
  responsive to receiving completion notifications of the generation update instruction from the plurality of primary storage devices respectively, sending to the host computer an instruction to restart sending of the new host request.

11. A storage system recited in claim 2, further comprising:
a plurality of the primary storage devices; and
a management device connected to the host computer and to each of the plurality of the primary storage devices,
wherein, the plurality of the primary storage devices have a plurality of the primary storage areas, respectively, which are identified by mutually different identifiers,
the plurality of the primary storage areas constitute a consistency group which are managed with a common generation,
the management device executes
  sending respectively to the plurality of the primary storage devices instructions for postponing execution of the primary write process and the first and second copy request sending process according to a new host request relating respectively to each of the primary storage areas included in the consistency group,
  responsive to receiving acknowledgements of the postponing instructions from the plurality of primary storage devices respectively, sending instructions to update the generation relating to each of the primary storage areas included in the consistency group to the plurality of the primary storage devices respectively, and responsive to receiving completion notifications of the update instructions from the plurality of primary storage devices respectively, sending respectively to the plurality of the primary storage devices instructions for restarting execution of each of the processes according to the new host request relating respectively to each of the primary storage areas included in the consistency group.

12. A method of controlling a storage system comprising a primary storage device connected to a host computer and having a primary storage area for the host computer, a first secondary storage device connected to the primary storage device and having a first secondary storage area, and a second secondary storage device connected to the primary storage device and having a second secondary storage area, the method comprising the steps of:

(A) setting a correlation between the second secondary storage area and a virtual identifier used to identify the second secondary storage area as a virtual storage area within the primary storage device using the primary storage device;

(B) executing a primary write process using the primary storage device, the primary write process including a process of receiving from the host computer a host request which is a data write request of host data, and a process of writing the host data to the primary storage area;

(C) sending a first and second copy request to the first and second secondary storage devices, respectively, using the primary storage device to store copy data in the first and second secondary storage areas, the copy data being a copy of the host data, the first and second copy request containing the copy data; and (D) sending a completion notification of the host request to the host computer responsive to receiving a completion notification of the first copy request from the first secondary storage device using the primary storage device, regardless of whether or not receiving a completion notification of the second copy request from the second secondary storage device, wherein the step (C) includes identifying the second secondary storage area using the virtual identifier in the second copy request, using the primary storage device;

wherein the step (C) includes the steps of:

(C1-1) creating the first copy request using the primary storage device;

(C1-2) creating the second copy request identifying the second secondary storage area by using the virtual identifier using the primary storage device; and (C2) sending the first and second copy requests to the first and second secondary storage devices, respectively, using the primary storage device, wherein the step (C2) includes the steps of:

replacing the virtual identifier within the second copy request with an actual identifier of the second secondary storage area by referencing the correlation set by the step (A) using the primary storage device; and wherein said sending the second copy request to the second secondary storage device using the primary storage device is performed after the replacement.

13. A method recited in claim 12, wherein
the first secondary storage device and the second secondary storage device are connected to each other, and
the method further comprises the steps of:

(E) allocating a generation to the host request and updating the generation according to specified conditions using the primary storage device, the generation representing a time range in which the primary write process is executed;

(F) sending first generation information to the first secondary storage device using the primary storage device, the first generation information representing the generation of the host request that is a source of the first copy request;

(G) creating first history information for each generation of host requests which are sources of the first copy requests by using the first generation information using the first secondary storage device, the first history information representing a write history according to the first copy requests;

(H) executing a secondary copy process of copying data between a storage area within the first secondary storage device and a storage area within the second secondary storage device to match data stored in each storage area which is a subject of the copying using the first secondary storage device;

(I) responsive to generation update by the step (E):

postponing sending of the second copy request corresponding to the host request belonging to a new generation using the primary storage device; and sending to the second secondary storage device all the second copy requests corresponding to the host requests belonging to the old generation which is one generation previous to the new generation using the primary storage device, wherein the step (H) includes executing a secondary copy process in a first secondary copy mode including:

(H1-1) specifying a different part where data is different between the first secondary storage area and the second secondary storage area by using only the newest first history information representing the history of the new generation using the first secondary storage device; and (H1-2) copying only differential data to match data respectively stored in the first secondary storage area and the second secondary storage area using the first secondary storage device, the differential data being data of the different part.

14. A method recited in claim 13, wherein
the second secondary storage device further comprises a backup storage area, and
the method further comprises the steps of:

(J) executing a backup process of copying data stored in the second secondary storage area into the backup storage area to backup the second secondary storage area in the backup storage area after completion notification is issued of all the second copy requests corresponding to the old generation, and sending backup completion notification to the an external device using the second secondary storage device; and (K) starting sending the second copy requests corresponding to the new generation after the backup completion notification is issued using the primary storage device, wherein the step (H) includes executing a secondary copy process in a second secondary copy mode including:

(H2-1) specifying a different part where data is different between the first secondary storage area and the backup storage area by using history information including at least the newest first history information out of the newest first history information and old first history information representing the history of the generation just one older than the newest first history information using the first secondary storage device; and (H2-2) copying only differential data to match data respectively stored in the first secondary storage area and the backup storage area using the first secondary storage device, the differential data being data of the different part.

15. A method recited in claim 14, wherein
the step (H2-1) includes the steps of:
receiving backup generation information from the second secondary storage device using the first secondary storage device, the backup generation information being related to the generation corresponding to the second copy request already reflected in the backup storage area; and
specifying the different part by using only history information whose generation is newer than the generation corresponding to the second copy request already reflected in the backup storage area selected from among the two first history information using the first secondary storage device.

16. A method recited in claim 14, wherein
the step (H) includes the steps of:
executing the secondary copy process in the first secondary copy mode using the first secondary storage device when specified first mode conditions are established, the specified first mode conditions including a first timing condition representing that a point of execution of the secondary copy process is during time from after the completion notification is issued for all the second copy requests corresponding to the old generation and until the start of sending the second copy requests belonging to the new generation; and
executing the secondary copy process in the second secondary copy mode using the first secondary storage device, when specified second mode conditions are established, the specified second mode conditions including a second timing condition representing that a point of execution of the secondary copy process is during time from after the backup completion notification is issued and until the start of the new backup process.

17. A method recited in claim 16, further comprising
(L) creating second history information representing a write history according to the second copy requests using the second secondary storage device, wherein
the step (H) includes
when the first mode conditions and the second mode conditions are not established, executing a secondary copy process in a third secondary copy mode including:
(H3-1) selecting the second secondary storage area when the first timing condition is established using the first secondary storage device;
(H3-2) selecting the backup storage area when the second timing condition is established using the first secondary storage device;
(H3-3) specifying a different part where data is different between the selected storage area and the first secondary storage area by using at least the second history information using the first secondary storage device; and
(H3-4) copying only differential data to match data respectively stored in the selected storage area and the first secondary storage area using the first secondary storage device, the differential data being data of the different part.

18. A method recited in claim 16, wherein
the second secondary storage device has a status storage area configured to store area status information representing a status of the second secondary storage area,
the method further comprises the steps of:
(M) responsive to issuing of all the completion notification for the second copy requests corresponding to the old generation, sending a first status write request for the status storage area to the second secondary storage device using the primary storage device, the first status write request including area status information representing that the first timing condition is established;
(N) sending a second status write request for the status storage area to the second secondary storage device using the primary storage device after sending the first status write request and before starting sending of the second copy request belonging to the new generation, the second status write request including area status information representing that the first timing condition is not established; and
(O) judging whether either the first timing condition and the second timing condition is established by referencing the area status information using the first secondary storage device when executing the secondary copy process.

19. A method recited in claim 16, further comprising the steps of:
(M) sending a first notification to the second secondary storage device using the primary storage device after issuing of all the completion notification for the second copy requests corresponding to the old generation, the first notification representing that the first timing condition is established;
(N) sending a second notification to the second secondary storage device using the primary storage device before starting sending of the second copy requests belonging to the new generation, the second notification representing that the first timing condition is not established;
(O) making a request to the second secondary storage device for timing condition information using the first secondary storage device when executing the secondary copy process, the timing condition information relating to which of the first timing condition and the second timing condition is established; and
(P) sending to the primary storage device the timing condition information based on the notification received last among the first notification and the second notification and on an execution status of the backup process using the second secondary storage device.

20. A method recited in claim 13, wherein
the primary storage device has a plurality of primary storage areas identified by mutually different identifiers,
the plurality of primary storage areas constitutes a consistency group which are managed with a common generation,
the method further comprises the step of
(Q) updating, simultaneously, the generation relating to the plurality of primary storage areas contained in the consistency group using the primary storage device.

21. A method recited in claim 13, wherein
the storage system further comprises:
a plurality of the primary storage devices; and
a management device connected to the host computer and to each of the plurality of the primary storage devices,
wherein, the plurality of the primary storage devices have a plurality of the primary storage areas, respectively, which are identified by mutually different identifiers,
the plurality of the primary storage areas constitute a consistency group which are managed with a common generation,
the method further comprises the steps of
 (Q) sending to the host computer an instruction for postponing sending of a new host request using the management device;
 (R) responsive to receiving an acknowledgement of the postponing instruction from the host computer, sending instructions to update the generation relating to each of the primary storage areas included in the consistency group to the plurality of the primary storage devices, respectively using the management device; and
 (S) responsive to receiving completion notifications of the generation update instruction from the plurality of primary storage devices respectively, sending to the host computer an instruction to restart sending of the new host request using the management device.

22. A method recited in claim 13, wherein
the storage system further comprises:
a plurality of the primary storage devices; and
a management device connected to the host computer and to each of the plurality of the primary storage devices,
wherein, the plurality of the primary storage devices have a plurality of the primary storage areas, respectively, which are identified by mutually different identifiers,
the plurality of the primary storage areas constitute a consistency group which are managed with a common generation,
the method further comprises the steps of:
 (Q) sending respectively to the plurality of the primary storage devices instructions for postponing execution of the primary write process and the first and second copy request sending process according to a new host request relating respectively to each of the primary storage areas included in the consistency group using the management device;
 (R) responsive to receiving acknowledgements of the postponing instructions from the plurality of primary storage devices respectively, sending instructions to update the generation relating to each of the primary storage areas included in the consistency group to the plurality of the primary storage devices respectively using the management device; and
 (S) responsive to receiving completion notifications of the update instructions from the plurality of primary storage devices respectively, sending respectively to the plurality of the primary storage devices instructions for restarting execution of each of the processes according to the new host request relating respectively to each of the primary storage areas included in the consistency group using the management device.

* * * * *